(12) United States Patent
Dalton et al.

(10) Patent No.: US 12,255,353 B2
(45) Date of Patent: Mar. 18, 2025

(54) ELECTRODE ASSEMBLY, SECONDARY BATTERY, AND METHOD OF MANUFACTURE

(71) Applicant: Enovix Corporation, Fremont, CA (US)

(72) Inventors: Jeremie J. Dalton, San Jose, CA (US); Robert S. Busacca, San Francisco, CA (US); Ashok Lahiri, Cupertino, CA (US); Murali Ramasubramanian, Fremont, CA (US); Bruno A. Valdes, Sunnyvale, CA (US); Kim Han Lee, Pleasanton, CA (US); Anthony Calcaterra, Milpitas, CA (US); Benjamin L. Cardozo, Palo Alto, CA (US)

(73) Assignee: Enovix Corporation, Fremont, CA (US)

( * ) Notice: Subject to any disclaimer, the term of this patent is extended or adjusted under 35 U.S.C. 154(b) by 470 days.

(21) Appl. No.: 17/525,397

(22) Filed: Nov. 12, 2021

(65) Prior Publication Data

US 2022/0069421 A1    Mar. 3, 2022

Related U.S. Application Data

(63) Continuation of application No. PCT/US2020/033038, filed on May 15, 2020.

(Continued)

(51) Int. Cl.
*H01M 50/474* (2021.01)
*H01M 10/0585* (2010.01)
*H01M 10/0587* (2010.01)

(52) U.S. Cl.
CPC ...... *H01M 50/474* (2021.01); *H01M 10/0585* (2013.01); *H01M 10/0587* (2013.01)

(58) Field of Classification Search
CPC ........... H01M 50/474; H01M 10/0585; H01M 10/0587; H01M 10/0525; H01M 10/054; H01M 4/13; H01M 4/70
See application file for complete search history.

(56) References Cited

U.S. PATENT DOCUMENTS

| | | | |
|---|---|---|---|
| 4,396,689 | A | 8/1983 | Grimes et al. |
| 8,865,345 | B1 | 10/2014 | Ramasubramanian et al. |

(Continued)

FOREIGN PATENT DOCUMENTS

| | | | |
|---|---|---|---|
| CN | 105529426 A | 4/2016 | |
| CN | 105552303 A | 5/2016 | |

(Continued)

OTHER PUBLICATIONS

Extended European Search Report for 21208850.4 dated Apr. 20, 2022, 8 pages.

(Continued)

*Primary Examiner* — Matthew T Martin
*Assistant Examiner* — Bartholomew A Hornsby
(74) *Attorney, Agent, or Firm* — Haley Guiliano LLP; Ronit Buller

(57) ABSTRACT

Secondary batteries and methods of manufacture thereof are provided. A secondary battery can comprise an electrode layer comprising a population of spacer structures comprising a material other than the electrode active material, wherein (a) the spacer population occupies a total volume within the electrode layer within the range of about 0.1% to about 35% of the volume, $V_E$, of the electrode layer, and (b) a member of the spacer population is located within each subvolume of the electrode layer comprising (i) at least 25% of the volume, $V_E$, of the electrode layer, and (ii) bounded on all sides by (aa) the unit cell portion of the electrode current collector, (bb) the separator layer, (cc) the top (Continued)

surface of the electrode layer, (dd) the bottom surface of the electrode layer, (ee) the first end surface of the electrode layer, and (ff) the second end surface of the electrode layer.

20 Claims, 14 Drawing Sheets

Related U.S. Application Data

(60) Provisional application No. 62/849,071, filed on May 16, 2019.

(56) References Cited

U.S. PATENT DOCUMENTS

| | | | |
|---|---|---|---|
| 9,660,292 | B2 | 5/2017 | Rust, III et al. |
| 9,991,490 | B2 | 6/2018 | Ramasubramanian et al. |
| 10,256,507 | B1 | 4/2019 | Busacca et al. |
| 10,283,807 | B2 | 5/2019 | Busacca et al. |
| 11,081,718 | B2 | 8/2021 | Busacca et al. |
| 11,128,020 | B2 | 9/2021 | Busacca et al. |
| 2005/0074671 | A1 | 4/2005 | Sugiyama et al. |
| 2013/0022867 | A1 | 1/2013 | Suzuki |
| 2014/0023930 | A1 | 1/2014 | Shin et al. |
| 2015/0372339 | A1 | 12/2015 | Pytlik et al. |
| 2016/0111701 | A1 | 4/2016 | Schumann et al. |
| 2019/0296334 | A1 | 9/2019 | Goto et al. |
| 2020/0119333 | A1* | 4/2020 | Masuzawa ........ H01M 10/0525 |
| 2020/0212493 | A1 | 7/2020 | Busacca et al. |
| 2020/0350633 | A1 | 11/2020 | Busacca et al. |

FOREIGN PATENT DOCUMENTS

| | | |
|---|---|---|
| JP | 1012279 | 1/1998 |
| JP | 2004-134175 A | 4/2004 |
| JP | 2005347195 | 12/2005 |
| JP | 2009-266467 A | 11/2009 |
| JP | 2010-176980 A | 8/2010 |
| JP | 2010-218849 A | 9/2010 |
| JP | 2011-008929 A | 1/2011 |
| JP | 2011-129451 A | 6/2011 |
| JP | 201618772 | 2/2016 |
| JP | 2016085978 | 5/2016 |
| JP | 2016139610 | 8/2016 |
| JP | 2017-076476 A | 4/2017 |
| JP | 2018-166084 A | 10/2018 |
| JP | 2019-061943 A | 4/2019 |
| KR | 10-2018-0026046 A | 3/2018 |
| KR | 102102101 | 4/2020 |
| WO | 2019089492 | 5/2019 |
| WO | 2020066254 | 4/2020 |
| WO | 2020232324 | 11/2020 |

OTHER PUBLICATIONS

Patent Cooperation Treaty, International Search Report for PCT/US2021/059597, 3 pages Feb. 28, 2022.

Patent Cooperation Treaty, International Search Report for PCT/US2020/033038, 5 pages Sep. 10, 2020.

* cited by examiner

ELECTRODE ASSEMBLY, SECONDARY BATTERY, AND METHOD OF MANUFACTURE

CROSS-REFERENCE TO RELATED APPLICATIONS

The present application is a continuation of PCT Application PCT/US2020/033038, filed May 15, 2020, which claims priority to U.S. provisional application No. 62/849,071, filed May 16, 2019. The entire contents of the above patent documents are incorporated by reference as if recited in full herein.

FIELD OF THE INVENTION

This disclosure generally relates to methods of manufacturing electrode assemblies for use in energy storage devices, and to energy storage devices having electrode assemblies manufactured according to methods herein.

BACKGROUND

Rocking chair or insertion secondary batteries are a type of energy storage device in which carrier ions, such as lithium, sodium, potassium, calcium or magnesium ions, move between a positive electrode and a negative electrode through an electrolyte. The secondary battery may comprise a single battery cell, or two or more battery cells that have been electrically coupled to form the battery, with each battery cell comprising a positive electrode, a negative electrode, a microporous separator, and an electrolyte.

In rocking chair battery cells, both the positive and negative electrodes comprise materials into which a carrier ion inserts and extracts. As a cell is discharged, carrier ions are extracted from the negative electrode and inserted into the positive electrode. As a cell is charged, the reverse process occurs: the carrier ion is extracted from the positive and inserted into the negative electrode.

When the carrier ions move between electrodes, one of the persistent challenges resides in the fact that the electrodes tend to expand and contract as the battery is repeatedly charged and discharged. The expansion and contraction during cycling tends to be problematic for reliability and cycle life of the battery because when the electrodes expand, electrical shorts and battery failures occur. Yet another issue that can occur is that mismatch in electrode alignment, for example caused by physical or mechanical stresses on the battery during manufacture, use or transport, can lead to shorting and failure of the battery.

Therefore, there remains a need for controlling the expansion and contraction of electrodes during battery cycling to improve reliability and cycle life of the battery. Furthermore, there remains a need for reliable and effective means of manufacture of such batteries. That is, there is a need for efficient manufacturing methods for providing batteries having electrode assemblies with controlled expansion of the electrode assemblies during cycling of the battery.

SUMMARY

Briefly, therefore, one aspect of this disclosure relates to a secondary battery for cycling between a charged and a discharged state, the secondary battery comprising a battery enclosure, an electrode assembly, carrier ions, a non-aqueous liquid electrolyte within the battery enclosure, wherein the electrode assembly comprises a population of unit cells, each unit cell comprising, in a stacked succession, a unit cell portion of an electrode current collector layer, an electrode layer comprising electrode active material, a separator layer, a counter-electrode layer and a unit cell portion of a counter-electrode current collector layer, the unit cell having a width, $W_{uc}$, measured in a stacking direction of the stacked succession from the unit cell portion of the electrode current collector to the unit cell portion of the counter-electrode current collector, the electrode layer having a width, $W_E$, measured in the stacking direction of the stacked succession, from the unit cell portion of the electrode current collector adjacent the electrode layer to the separator layer adjacent the electrode layer, a height, $H_E$, measured from a top surface to a bottom surface of the electrode layer in a second direction orthogonal to the stacking direction, and a length, $L_E$, measured from a first surface to a second surface in a third direction that is orthogonal to the stacking direction and the height direction, and a volume, $V_E$, bounded by the unit cell portion of the electrode current collector, the separator layer, the top surface of the electrode layer, the bottom surface of the electrode layer, the first end surface of the electrode layer, and the second end surface of the electrode layer. The electrode layer comprises a population of spacer structures comprising a material other than the electrode active material, wherein (a) the spacer population occupies a total volume within the electrode layer within the range of about 0.1% to about 35% of the volume, $V_E$, of the electrode layer, and (b) a member of the spacer population is located within each subvolume of the electrode layer comprising (i) at least 25% of the volume, $V_E$, of the electrode layer, and (ii) bounded on all sides by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Another aspect of the disclosure relates to an electrode assembly for a secondary battery for cycling between a charged and a discharged state, wherein the electrode assembly comprises a population of unit cells, each unit cell comprising, in a stacked succession, a unit cell portion of an electrode current collector layer, an electrode layer comprising electrode active material, a separator layer, a counter-electrode layer and a unit cell portion of a counter-electrode current collector layer, the unit cell having a width, $W_{uc}$, measured in a stacking direction of the stacked succession from the unit cell portion of the electrode current collector to the unit cell portion of the counter-electrode current collector, the electrode layer having a width, $W_e$, measured in the stacking direction, from the unit cell portion of the electrode current collector adjacent the electrode layer to the separator layer adjacent the electrode layer, a height, He, measured from a top surface to a bottom surface of the electrode layer in a second direction orthogonal to the stacking direction, and a length, Le, measured from a first to a second surface in a third direction that is orthogonal to the stacking direction and the height direction, and a volume, $V_E$, bounded by the unit cell portion of the electrode current collector, the separator layer, the top surface of the electrode layer, the bottom surface of the electrode layer, the first end surface of the electrode layer, and the second end surface of the electrode layer. The electrode layer comprises a population of spacer structures, wherein (a) the spacer population occupies a total volume within the electrode layer within the range of about 0.1% to about 35% of the volume, $V_E$, of the electrode layer, and (b) a member of the spacer population is located within each subvolume of the electrode layer comprising (i) at least 25% of the volume, $V_E$, of the electrode layer, and (ii) bounded on all sides by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Yet another aspect of the disclosure relates to a method of formation of a secondary battery for cycling between a charged and a discharged state, the comprising providing an electrode assembly, carrier ions and a non-aqueous liquid electrolyte within a battery enclosure, wherein the electrode assembly comprises a population of unit cells, each unit cell comprising, in a stacked succession, a unit cell portion of an electrode current collector layer, an electrode layer comprising electrode active material, a separator layer, a counter-electrode layer and a unit cell portion of a counter-electrode current collector layer, the unit cell having a width, $W_{uc}$, measured in a stacking direction of the stacked succession from the unit cell portion of the electrode current collector to the unit cell portion of the counter-electrode current collector, the electrode layer having a width, $W_e$, measured in the stacking direction, from the unit cell portion of the electrode current collector adjacent the electrode layer to the separator layer adjacent the electrode layer, a height, $H_E$, measured from a top surface to a bottom surface of the electrode layer in a direction orthogonal to the stacking direction, and a length, Le, measured from a first to a second surface in a direction that is orthogonal to the stacking direction and the height direction, and a volume, Ve, bounded by the unit cell portion of the electrode current collector, the separator layer, the top surface of the electrode layer, the bottom surface of the electrode layer, the first end surface of the electrode layer, and the second end surface of the electrode layer. The electrode layer comprises a population of spacer structures, wherein (a) the spacer population occupies a total volume within the electrode layer within the range of about 0.1% to about 35% of the volume, Ve, of the electrode layer, and (b) a member of the spacer population is located within each subvolume of the electrode layer comprising (i) at least 25% of the volume, Ve, of the electrode layer, and (ii) bounded on all sides by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer. The method further comprises performing a formation process involving charging of the secondary battery from a discharged to a charged state.

Other aspects, features and embodiments of the present disclosure will be, in part, discussed and, in part, apparent in the following description and drawing.

DEFINITIONS

Figure 1A:
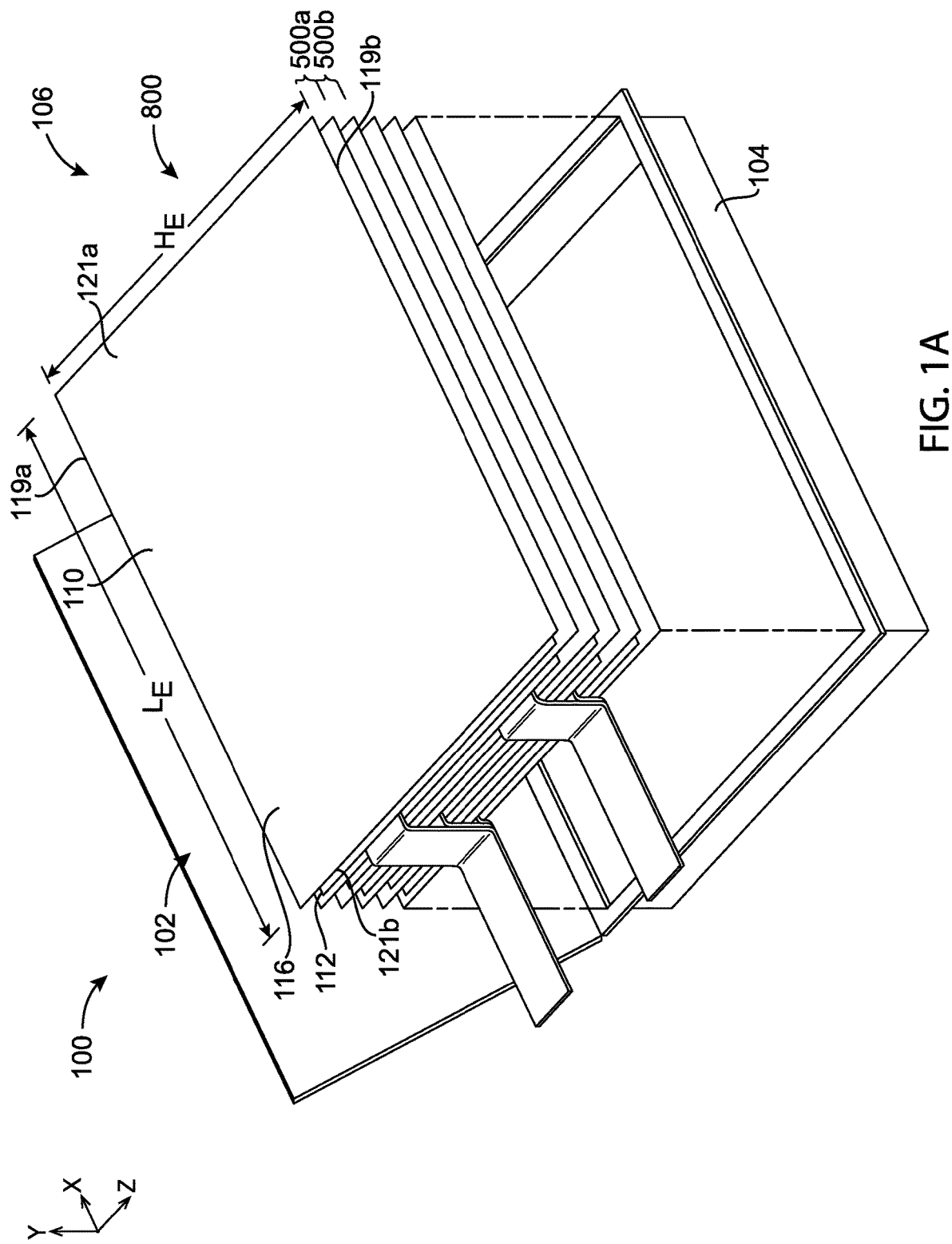
FIG. 1A is a perspective view of one embodiment of a secondary battery comprising an electrode assembly.

"A," "an," and "the" (i.e., singular forms) as used herein refer to plural referents unless the context clearly dictates otherwise. For example, in one instance, reference to "an electrode" includes both a single electrode and a plurality of similar electrodes.

"About" and "approximately" as used herein refers to plus or minus 10%, 5%, or 1% of the value stated. For example, in one instance, about 250 μm would include 225 μm to 275 μm. By way of further example, in one instance, about 1,000 μm would include 900 μm to 1,100 μm. Unless otherwise indicated, all numbers expressing quantities (e.g., measurements, and the like) and so forth used in the specification and claims are to be understood as being modified in all instances by the term "about." Accordingly, unless indicated to the contrary, the numerical parameters set forth in the following specification and attached claims are approximations. Each numerical parameter should at least be construed in light of the number of reported significant digits and by applying ordinary rounding techniques.

"Anode" as used herein in the context of a secondary battery refers to the negative electrode in the secondary battery.

"Anodically active" as used herein means material suitable for use in an anode of a secondary battery.

"Cathode" as used herein in the context of a secondary battery refers to the positive electrode in the secondary battery.

"Cathodically active" as used herein means material suitable for use in a cathode of a secondary battery.

"Charged state" as used herein in the context of the state of a secondary battery refers to a state where the secondary battery is charged to at least 75% of its rated capacity. For example, the battery may be charged to at least 80% of its rated capacity, at least 90% of its rated capacity, and even at least 95% of its rated capacity, such as 100% of its rated capacity.

"C-rate" as used herein refers to a measure of the rate at which a secondary battery is charged or discharged, and is defined as the discharge current divided by the theoretical current draw under which the battery would deliver its nominal rated capacity in one hour. For example, a C-rate of 1 C indicates the discharge current that discharges the battery in one hour, a rate of 2 C indicates the discharge current that discharges the battery in ½ hours, a rate of C/2 indicates the discharge current that discharges the battery in 2 hours, etc.

"Discharged state" as used herein in the context of the state of a secondary battery refers to a state where the secondary battery is discharged to less than 25% of its rated capacity. For example, the battery may be discharged to less than 20% of its rated capacity, such as less than 10% of its rated capacity, and even less than 5% of its rated capacity, such as 0% of its rated capacity.

A "cycle" as used herein in the context of cycling of a secondary battery between charged and discharged states refers to charging and/or discharging a battery to move the battery in a cycle from a first state that is either a charged or discharged state, to a second state that is the opposite of the first state (i.e., a charged state if the first state was discharged, or a discharged state if the first state was charged), and then moving the battery back to the first state to complete the cycle. For example, a single cycle of the secondary battery between charged and discharged states can include, as in a charge cycle, charging the battery from a discharged state to a charged state, and then discharging back to the discharged state, to complete the cycle. The single cycle can also include, as in a discharge cycle, discharging the battery from the charged state to the discharged state, and then charging back to a charged state, to complete the cycle.

"Y axis," "X axis," and "Z axis," as used herein refer to mutually perpendicular axes (i.e., each are orthogonal to one another). For example, the "Y axis," "X axis," and the "Z axis" as used herein are akin to a Cartesian coordinate system used to define three-dimensional aspects or orientations. As such, the descriptions of elements of the inventive subject matter herein are not limited to the particular axis or axes used to describe three-dimensional orientations of the elements. Alternatively stated, the axes may be interchangeable when referring to three-dimensional aspects of the inventive subject matter.

"Y direction," "X direction," and "Z direction," as used herein, refer to mutually perpendicular directions (i.e., each are orthogonal to one another). For example, the "Y direction," "X direction," and the "Z direction" as used herein may be generally parallel to the Y axis, X axis and Z axis, respectively, of a Cartesian coordinate system used to define three-dimensional aspects or orientations.

"Repeated cycling" as used herein in the context of cycling between charged and discharged states of the secondary battery refers to cycling more than once from a discharged state to a charged state, or from a charged state to a discharged state. For example, repeated cycling between charged and discharged states can including cycling at least 2 times from a discharged to a charged state, such as in charging from a discharged state to a charged state, discharging back to a discharged state, charging again to a charged state and finally discharging back to the discharged state. As yet another example, repeated cycling between charged and discharged states at least 2 times can include discharging from a charged state to a discharged state, charging back up to a charged state, discharging again to a discharged state and finally charging back up to the charged state By way of further example, repeated cycling between charged and discharged states can include cycling at least 5 times, and even cycling at least 10 times from a discharged to a charged state. By way of further example, the repeated cycling between charged and discharged states can include cycling at least 25, 50, 100, 300, 500 and even 1000 times from a discharged to a charged state.

"Rated capacity" as used herein in the context of a secondary battery refers to the capacity of the secondary battery to deliver a specified current over a period of time, as measured under standard temperature conditions (25° C.). For example, the rated capacity may be measured in units of Amp hour, either by determining a current output for a specified time, or by determining for a specified current, the time the current can be output, and taking the product of the current and time. For example, for a battery rated 20 Amp·hr, if the current is specified at 2 amperes for the rating, then the battery can be understood to be one that will provide that current output for 10 hours, and conversely if the time is specified at 10 hours for the rating, then the battery can be understood to be one that will output 2 amperes during the 10 hours. In particular, the rated capacity for a secondary battery may be given as the rated capacity at a specified discharge current, such as the C-rate, where the C-rate is a measure of the rate at which the battery is discharged relative to its capacity. For example, a C-rate of 1 C indicates the discharge current that discharges the battery in one hour, 2 C indicates the discharge current that discharges the battery in ½ hours, C/2 indicates the discharge current that discharges the battery in 2 hours, etc. Thus, for example, a battery rated at 20 Amp·hr at a C-rate of 1 C would give a discharge current of 20 Amp for 1 hour, whereas a battery rated at 20 Amp·hr at a C-rate of 2 C would give a discharge current of 40 Amps for ½ hour, and a battery rated at 20 Amp·hr at a C-rate of C/2 would give a discharge current of 10 Amps over 2 hours.

"Stacking direction" as used herein in the context of an electrode assembly for a secondary battery refers to the direction in which structures in the electrode assembly are stacked with respect to one another. According to certain embodiments, the stacking direction may be generally parallel to a shortest distance between structures in a unit cell of the electrode assembly.

"Stacked succession" as used herein in the context of an electrode assembly for a secondary battery refers to those structures within the unit cell (e.g. unit cell portion of electrode current collector, electrode layer, separator layer, counter-electrode layer and unit cell portion of counter-electrode layer), and/or sections of such structures, that are encountered in traversing the electrode assembly in the stacking direction. According to one embodiment, for a prismatic electrode assembly, the stacked succession of a unit cell includes the structures of the unit cell that are bound by a first end of the unit cell and a second end of the unit cell in the stacking direction. According to another embodiment, for a wound electrode assembly, the stacked succession of the unit cell corresponds to those sections of the unit cell that are bound by the first end of the unit cell and the second end of the unit cell in the stacking direction, which sections are located in a same wind of the electrode assembly.

"Wound electrode assembly" as used herein refers to an electrode assembly where electrode and counter-electrode structures are wound about an interior region of the electrode assembly, such that the electrode assembly comprises a plurality of winds each increasing in diameter with increasing radius from the interior region of the electrode assembly. According to certain embodiments, the wound electrode assembly comprises a stacking direction that is parallel to direction parallel to the radius R from an interior region to an exterior region of the wound electrode assembly, and one or more electrode layers in the wound electrode assembly comprise a width dimension $W_E$ as measured in a first direction parallel to the stacking direction, a height dimension $H_E$ as measured in a second direction orthogonal to the stacking direction, and a length dimension $L_E$ as measured in a third direction orthogonal to the stacking direction and the second direction, from the interior region of the electrode assembly to the exterior region of the electrode assembly. According to one embodiment, stacking direction is generally parallel to the radius R, the second direction is generally parallel to a Z direction (height direction), and third direction is measured along an angular direction A for the total number of winds in the electrode assembly, as measured in Cylindrical coordinates with mutually orthogonal coordinates R (radius), Z (height) and A (azimuth).

"Cylindrical coordinates" as used herein refers to a coordinate system that specifies positions in space by a height (Z) from a chosen origin, serving as a reference axis, a distance R (radius) from the reference axis (Z axis), and the angular position or azimuth A, where R, Z and A are mutually orthogonal coordinates.

"Orthogonal directions" as used herein refers to directions that are mutually perpendicular to one another, in a selected coordinate system. For example, for a Cartesian coordinate system, the orthogonal directions are directions that are parallel to X, Y and Z axis in the coordinate system. As another example, for a Cylindrical coordinate system, the orthogonal directions are directions defined along the mutually perpendicular R (radius), Z (height) and azimuthal (A) coordinates.

"Prismatic electrode assembly" as used herein refers to an electrode assembly having electrode and counter-electrode structures comprising a series of layer sheets alternately stacked in a stacking direction. According to certain embodiments, the prismatic electrode assembly comprises a stacking direction that is parallel to the Y axis, and one or more electrode layers in the wound electrode assembly comprise a width dimension $W_E$ as measured in a first direction parallel to the stacking direction, a height dimension $H_E$ as measured in a second direction that is parallel to the Z axis, and a length dimension $L_E$ as measured in a third direction that is parallel to the X axis, where X, Y and Z comprise mutually orthogonal axis in Cartesian coordinates.

A "Wind" as used herein with respect to a wound electrode assembly comprises a segment of unit cell extending from a starting point to an ending point that is a 360° rotation from the starting point along the azimuthal direction A in Cylindrical coordinates.

DETAILED DESCRIPTION

In general, aspects of the present disclosure are directed to an energy storage device 100, such as a secondary battery 102, as shown for example in FIG. 1A, that cycles between a charged and a discharged state, and a method of manufacture thereof. The secondary battery 102 includes a battery enclosure 104, an electrode assembly 106, and carrier ions, and may also contain an electrolyte such as non-aqueous liquid electrolyte within the battery enclosure.

Further, in certain embodiments, aspects of the present disclosure provide an electrode assembly 106 that may offer particular advantages when incorporated into energy storage devices 100 such as batteries, capacitors, fuel cells, and the like. In one embodiment, the electrode assembly 106 and the secondary battery 102 comprising the electrode assembly 106 have a configuration and/or structure that is selected to accommodate at least one of growth, swelling, and/or expansion of an electrode that can otherwise occur during charging and/or discharging of a secondary battery having the electrode assembly 106. For example, the electrode assembly 106 may be capable of accommodating growth, swelling and/or expansion of an electrode that can occur during an initial formation stage, when a secondary battery 102 is first charged from a discharged state to a charged state. The electrode assembly 106 may also be configured to accommodate growth swelling and/or expansion that can occur during cycling of the secondary battery 102.

According to certain embodiments, in moving from a discharged state to a charged state, carrier ions such as, for example, one or more of lithium, sodium, potassium, calcium and magnesium, move between the positive and negative electrodes in the battery. Upon reaching the electrode, the carrier ions may then intercalate or alloy into the electrode material, thus increasing the size and volume of that electrode. Conversely, reversing to move from the charged state to the discharged state can cause the ions to de-intercalate or de-alloy, thus contracting the electrode. This alloying and/or intercalation and de-alloying and/or de-intercalation can cause significant volume change in the electrode. In yet another embodiment, the transport of carrier ions out of electrodes can increase the size of the electrode, for example by increasing the electrostatic repulsion of the remaining layers of material (e.g., with LCO and some other materials). Other mechanisms that can cause swelling in secondary batteries 102 can include, for example, the formation of SEI on electrodes, the decomposition of electrolyte and other components, and even gas formation. In one embodiment, an electrode can comprise a layer of electrode active material that has the capacity to accept more than one mole of carrier on per mole of electrode active material when the secondary battery is charged from the discharged state to the charged state, where the charged state is at least 75% of a rated capacity of the secondary battery, and the discharged state is less than 25% of the rated capacity of the secondary battery, thus causing swelling of the electrode and/or electrode assembly 106. Thus, the repeated expansion and contraction of the electrodes upon charging and discharging, as well as other swelling mechanisms, can create strain in the electrode assembly 106, which can lead to reduced performance and ultimately even failure of the secondary battery.

Furthermore, in an initial formation process performed to initially form the secondary battery, by an initial charging process that charges the secondary battery from a discharged state to a charged state, similar mechanisms can cause swelling of the electrode assembly, which can create strain in the electrode assembly, and such as due to growth and/or swelling of electrode active materials during the formation process. That is, in the manufacture of a secondary battery 102 having the electrode assembly 106, an initial formation process may be performed that comprises at least one initial charging cycle of the secondary battery 102, which may be performed under carefully controlled conditions including one or more of current, temperature and duration, to promote the formation of the desired structure and contact between components of the secondary battery 102. The initial formation process can comprise only a single initial charging cycle, or may comprise a plurality of charging cycles (e.g., charging and discharging of the secondary battery in one or more cycles), according to the particular battery structure and composition. In one embodiment, the initial formation process can comprises a series of partial charging and/or discharging cycles, such as for example a charging process that at least partially charges the secondary battery (e.g., charges to 10% of full capacity), followed by a subsequent discharging process that at least partially discharges the secondary battery (e.g., discharges by 5% of the full capacity), which can be followed by a further charging process to at least partially and even fully charge the secondary battery, and/or further charging and/or discharging processes, according to the characteristics of the secondary battery that is to be formed. According to one embodiment, the initial formation process can be performed as a final stage in manufacturing to bring the secondary battery 102 to its full power and/or capacity.

Figure 3A:
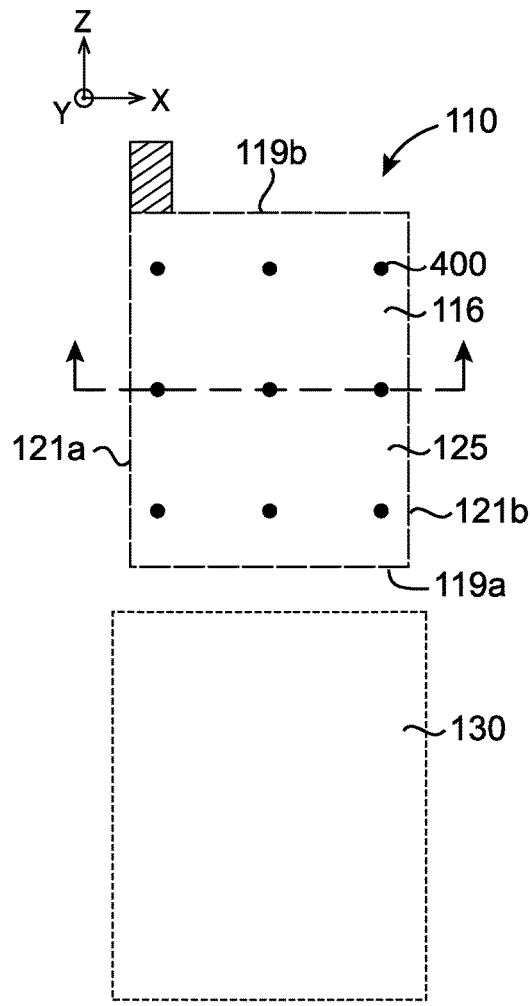
FIG. 3A is an exploded plan view of an embodiment of structures including an electrode structure, counter-electrode structure, and separator layer for an electrode assembly.
Figure 3B:
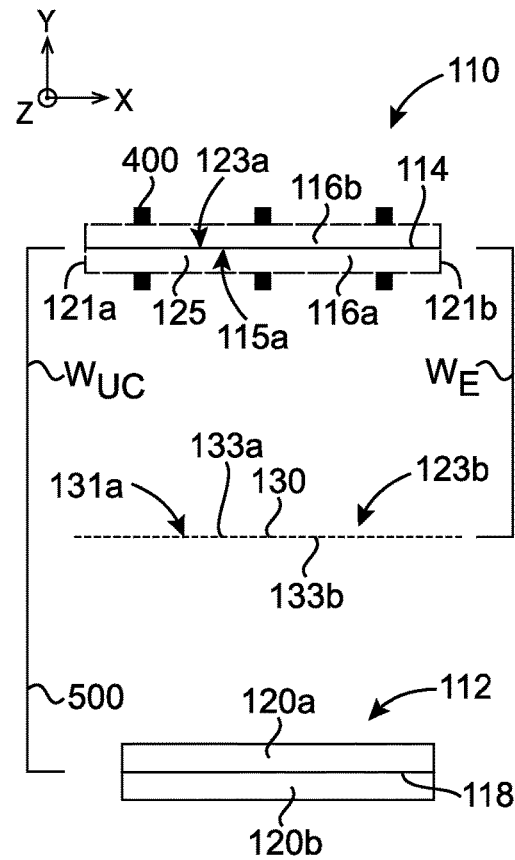
FIG. 3B is an exploded cross-sectional view of the embodiment of the structures for the electrode assembly of FIG. 3A.
Figure 3C:
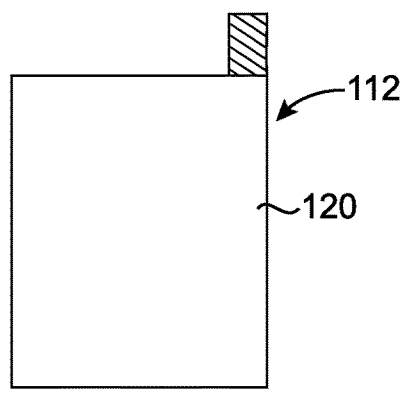
FIG. 3C is a cross-sectional view of the embodiment of the structures for the electrode assembly of FIGS. 3A and 3B in a stacked configuration, and further comprising a set of constraints.

Referring to FIGS. 3A-3C, according to certain embodiments, a population of spacer structures 400 can be provided as a part of the electrode assembly 106 to at least partly accommodate growth of an electrode that can occur during a formation process. According to certain embodiments, the population of spacer structures 400 can be positioned with respect to an expanding electrode active material in an electrode layer 116, such as within and/or about an electrode active material layer 125, to define voids and/or spaces between the electrode active material and an adjacent structure, such as an adjacent separator layer 130. In one embodiment, the voids and/or spaces may provide a volume into which the electrode active material can grow, such as during a formation stage, thereby allowing for expansion of the electrode active material without excessively straining the electrode assembly 106. Accordingly, in certain embodiments, by providing the population of spacer structures 400 within the electrode assembly 106, a secondary battery 102 can be formed that exhibits less strain and/or less deformation of the structures therein due to expansion of the electrode active material that can occur during the formation process, and/or during repeated cycling of the secondary battery 102 between charged and discharged states.

Referring again to FIGS. 1A and 1B, and FIG. 3B, in one embodiment, an electrode assembly 106 includes a population of electrode structures 110, a population of counter-electrode structures 112, and an electrically insulating separator 130 electrically insulating the electrode structures 110 from the counter-electrode structures 112. As shown in these figures, the electrode structures 110, counter-electrode structures 112 and electrically insulating separator 130 can comprise a series of stacked layers in an alternating arrangement. In one embodiment, the population of electrode structures 110 can comprise a population of electrode current collectors 114, and a population of electrode layers 116, which can comprise electrode active material. The population of electrode layers 116 can comprise, for example, first and second electrode layers 116a,116b that are disposed on opposing sides of the electrode current collectors 114. The population of counter-electrode structures 112 can comprise a population of counter-electrode current collectors 118, and a population of counter-electrode layers 120, which can comprise counter-electrode active material. The population of counter-electrode layers 120 can comprise, for example, first and second counter-electrode electrode layers 120a,120b that are disposed on opposing sides of the counter-electrode current collectors 118.

Figure 1B:
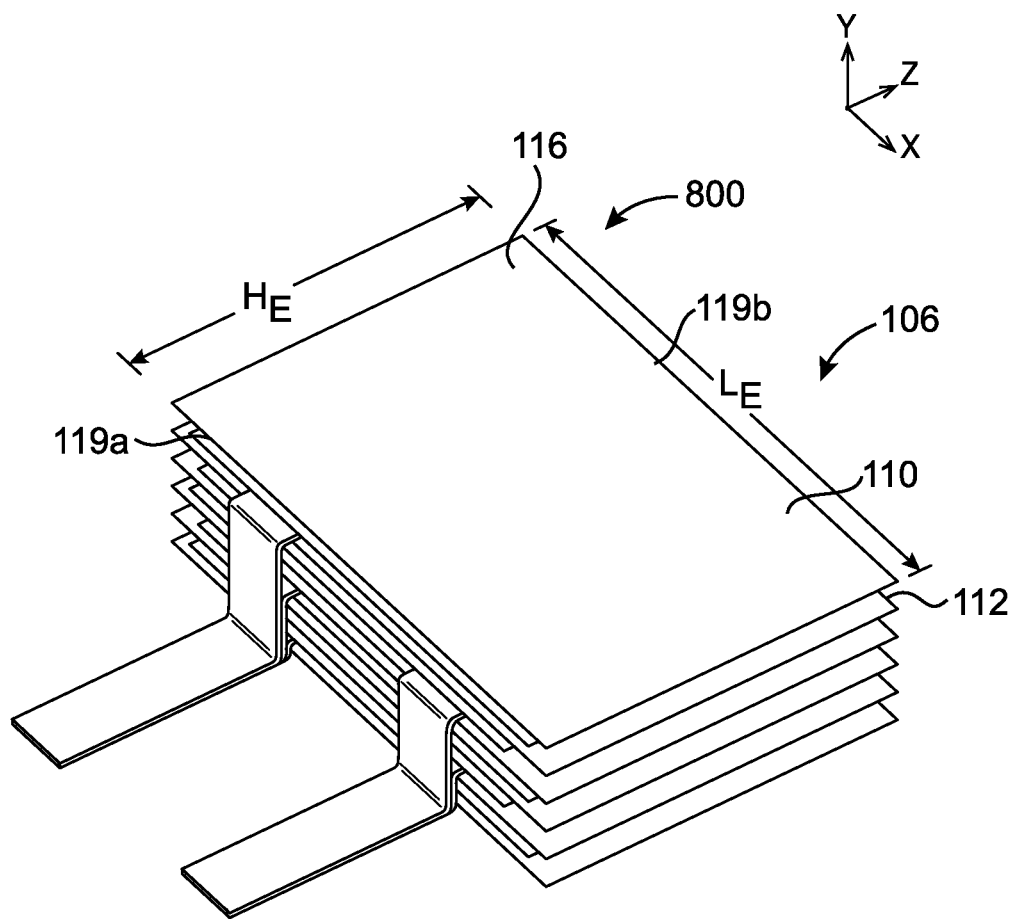
FIG. 1B is a perspective view of another embodiment of a secondary battery comprising an electrode assembly.

According to certain embodiments, the electrode assembly 106 can comprise a plurality of different sizes, shapes, and configurations. For example, referring to FIGS. 1A and 1B, in one embodiment, the electrode assembly comprises a series of electrode and counter-electrode structures 110, 112 comprising a series of stacked sheets that are stacked in a stacking direction that is in a first direction (e.g., parallel to the Y axis). In the embodiment as shown in FIG. 1A, the electrode structures 110 comprising the electrode layers 116 have a height dimension $H_E$ that is measured in a second direction that is orthogonal to the stacking direction (e.g., parallel to the Z axis), and a length dimension $L_E$ that is measured in a third direction that is orthogonal to the stacking direction and the second direction (e.g., parallel to the X axis), and a width dimension $W_E$ that is measured along the stacking direction (e.g., parallel to the Y axis) (see, e.g., FIG. 3B). In the embodiment as shown in FIG. 1B, the electrode structures 110 comprising the electrode layers 116 have a height dimension $H_E$ that is half that of the height of FIG. 1A.

Figure 2A:
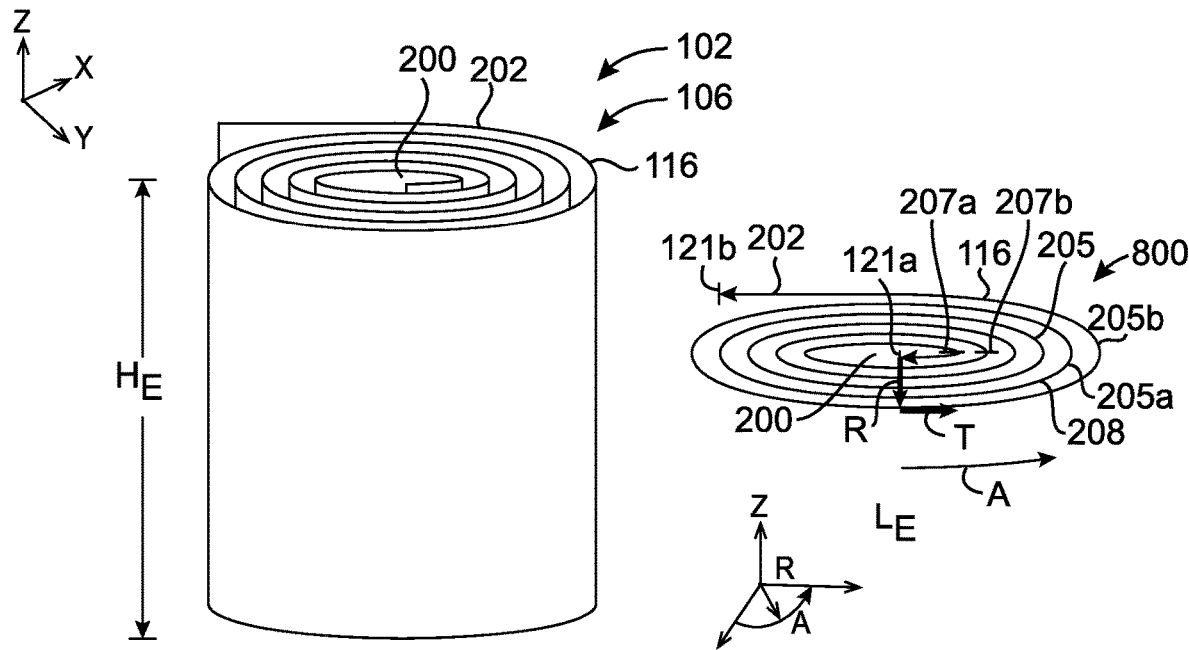
FIGS. 2A-2B are perspective and cross-sectional views of further embodiments of secondary batteries comprising electrode assemblies.
Figure 2B:
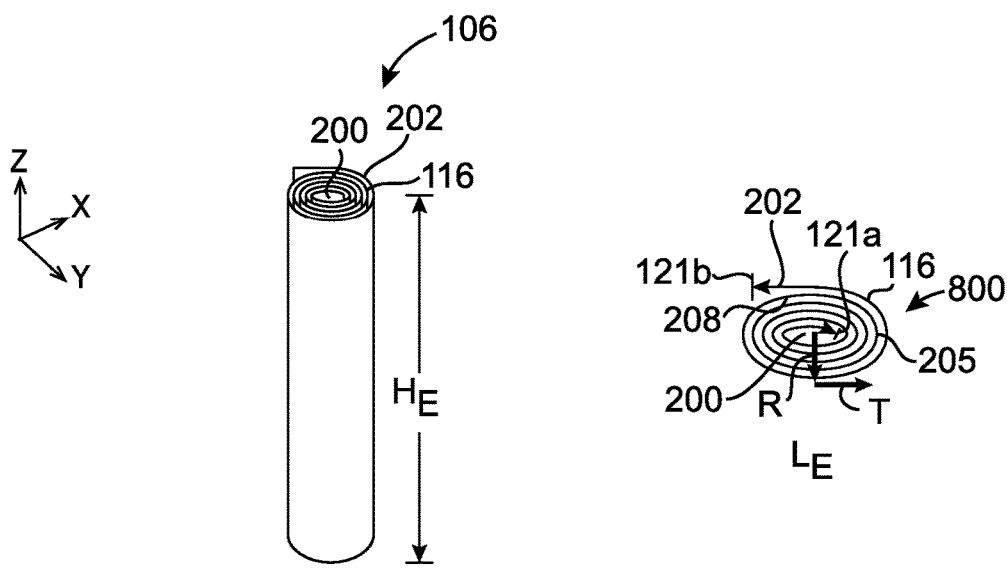

Referring to FIGS. 2A, 2B and 11A-11B, an embodiment of an electrode assembly 106 is shown where the electrode and counter-electrode structures 110, 112 are configured into a wound electrode assembly 106 having a plurality of winds or turns 205, in which the electrode and counter-electrode sheets 110, 112 are wound in a spiral shape from an interior region 200 of the electrode assembly 106 to an exterior region 202 of the electrode assembly 106. Each wind 205 of the wound electrode assembly comprises a segment of unit cell extending from a starting point 207a to an ending point 207b that is a 360° rotation from the starting point along an azimuthal direction A (e.g., in Cylindrical coordinates). According to this embodiment, the electrode structures 110 comprise electrode layers 116 having a height dimension $H_E$ measured that is parallel to the Z axis, and a width dimension $W_E$ that is measured in the stacking direction, which for the wound configuration corresponds to a direction that is generally parallel to a radius R from the interior region 200 of the electrode assembly 106 to the exterior region 202 of the electrode assembly 106, along which the series of winds 205a, 205b are encountered. Furthermore, in the embodiment as shown, the stacking direction along R of the electrode assembly is in a direction that is orthogonal to the Z axis. That is, according to one embodiment, the stacked succession 800 is stacked in the stacking direction R, the height He of the electrode layer 116 is measured in a second direction orthogonal to the stacking direction R (e.g., in the Z direction). According to one embodiment, the length dimension $L_E$ of the wound electrode layer 116 is measured in a third direction orthogonal to the stacking direction and second direction, where the third direction is measured along an angular and/or azimuthal direction A (e.g., in Cylindrical coordinates) for the total number of winds in the electrode assembly, from the interior region of the electrode assembly to the exterior region of the electrode assembly. In one embodiment, the length $L_E$ of the wound electrode layer is the total length of the electrode layer 116 along the spiral path 208 of the wound electrode from the interior region 200 to the exterior region 202, where the direction T of the spiral path is orthogonal to the Z axis and stacking direction R at each point along the spiral path 208. In the embodiment as shown in FIG. 2A, the electrode assembly 106 comprises a cross-section as viewed along the Z-axis that has an oval-type shape. In the embodiment as shown in FIG. 2B, the electrode assembly 106 comprises a cross-section as viewed along the Z-axis that has a circular-type shape.

Referring to FIGS. 1A-1B and 3A-3B, according to one embodiment, the electrode assembly 106 comprises a population of unit cells 500, each unit cell 500 comprising, in a stacked succession 800, a unit cell portion of an electrode current collector layer 114, an electrode layer 116, a separator layer 130, a counter-electrode layer 120 and a unit cell portion of a counter-electrode current collector layer 118. Referring to FIGS. 3A-3C, in one embodiment, the unit cell 500 comprises a unit cell portion of the electrode current collector layer 114 and a unit cell portion of the counter-electrode current collector layer 118, a first electrode layer 116a of the electrode structure 110 that is disposed on one side of the electrode current collector layer 114, and a first counter-electrode layer 120a of a counter-electrode structure 112 that is disposed on a side of the counter-electrode current collector layer 118 facing the electrode current collector layer 114. The electrode and counter-electrode layers in the unit cell may be disposed such that the electrode layer is proximate a first side 133a of the separator 130 and the first counter-electrode material layer is proximate an opposing second side 133b of the separator 130. According to certain embodiments, the separator 130 can electrically isolate the electrode layer 116 from the counter-electrode layer 120 in the unit cell 500, and carrier ions can be primarily exchanged between the electrode layer 116 and the counter-electrode layer 120 via the separator 130 in the unit cell, in the case where the electrode assembly comprising the unit cell is used as a part of a secondary battery during cycling of the battery between the charged and discharged state.

Figure 4A:
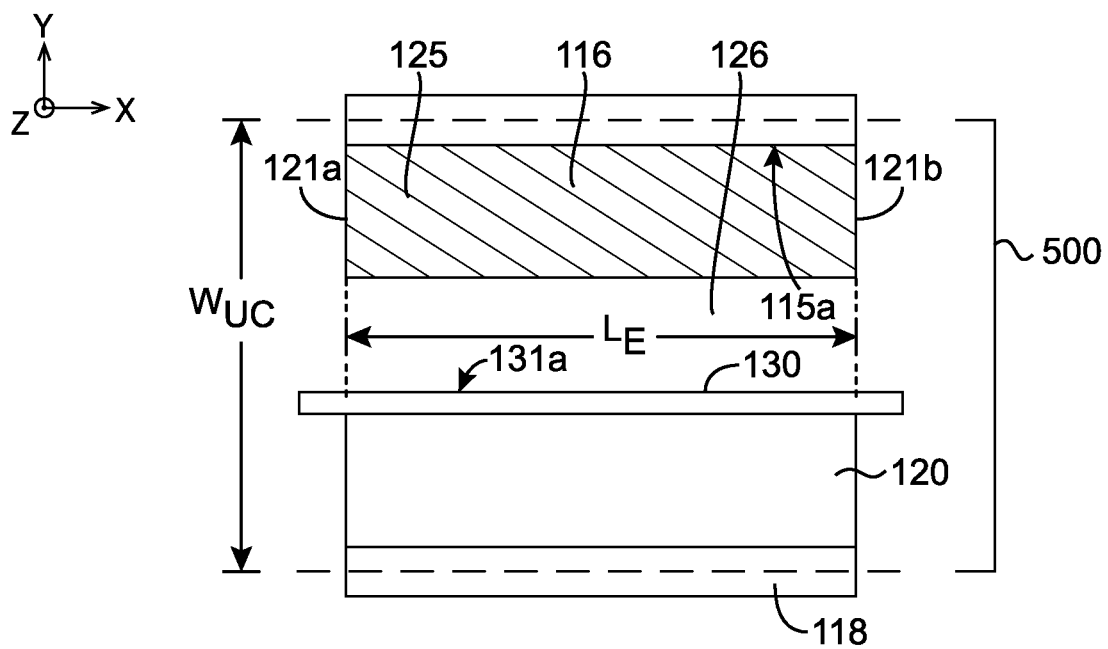
FIG. 4A is a cross-sectional view of an embodiment of structures including an electrode current collector, an electrode layer, a separator layer and a counter-electrode current collector, for an electrode assembly, as viewed in the Y-X plane.

Furthermore, according to certain embodiments, the unit cell portion of the electrode current collector layer and/or counter-electrode current collector layer is the portion thereof that participates in the electrochemical reaction in the unit cell, such as in delivering current therebetween to facilitate transfer of electrons between the unit cell portions of the electrode current collector layer and/or counter-electrode current collector layer. For example, referring to FIG. 1A, the first unit cell 500a comprises the unit cell portion of the electrode current collector 114 that participates in the electrochemical reaction in the unit cell 500a, whereas the adjacent second unit cell 500b comprises that unit cell portion of the shared electrode current collector 114 that participates in the electrochemical reaction in the second unit cell 500b. For example, the unit cell portion of the current collector may be a half of the current collector as divided along an XZ plane in the Y direction in the embodiment as shown in FIG. 4A, or may comprise a different configuration depending on the configuration and other characteristics of the electrode assembly 106

Figure 11A:
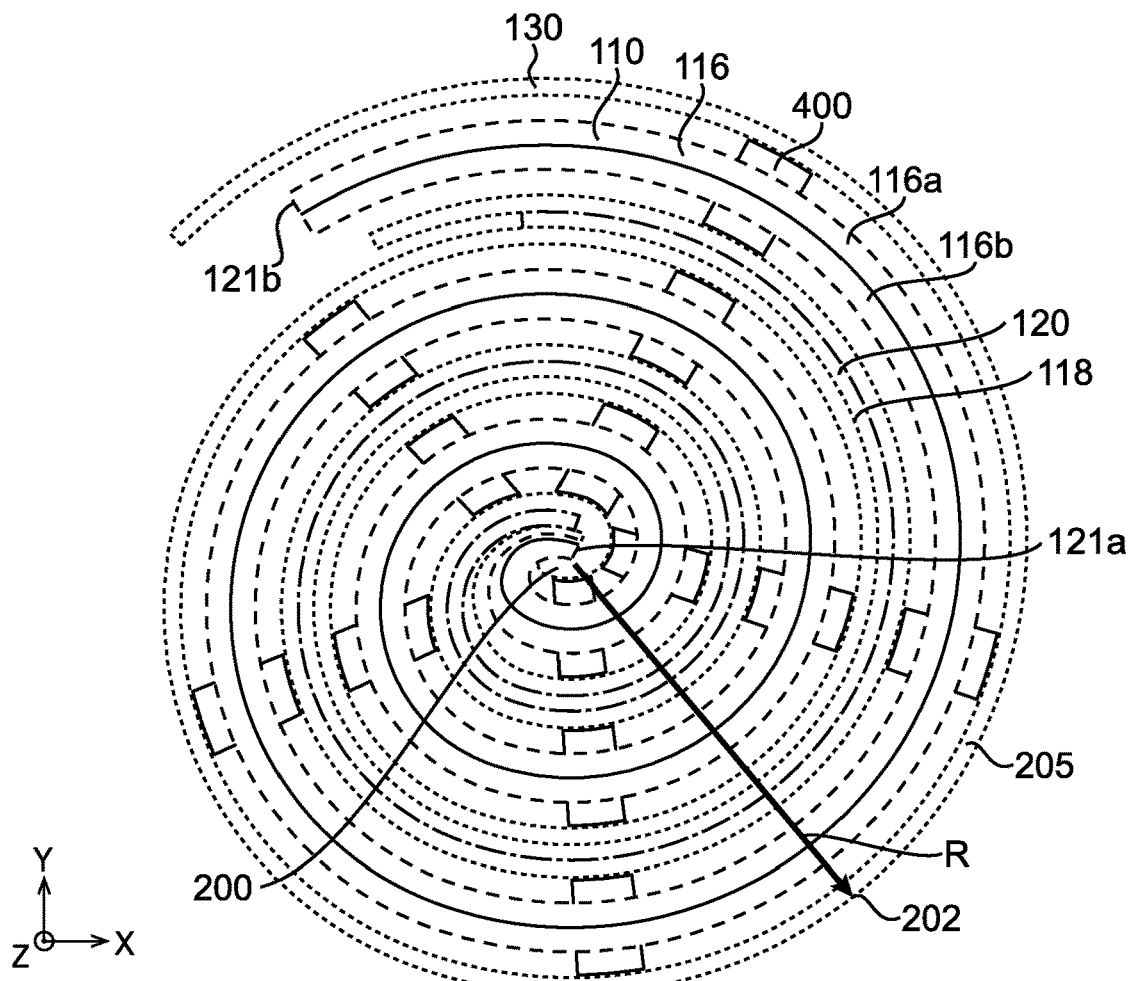
FIGS. 11A-11B are a cross-sectional view of an embodiment of a wound electrode assembly (FIG. 11A), and a close-up section of the wound electrode assembly of FIG. 11A showing sections of first and second unit cells of the wound electrode assembly.
Figure 11B:
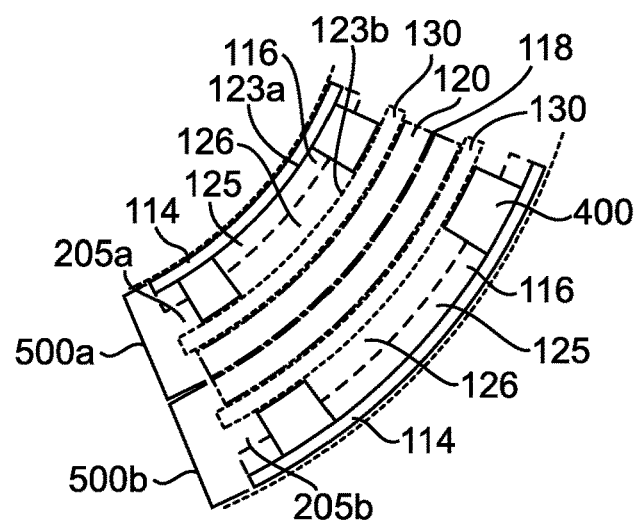
Figure 12:
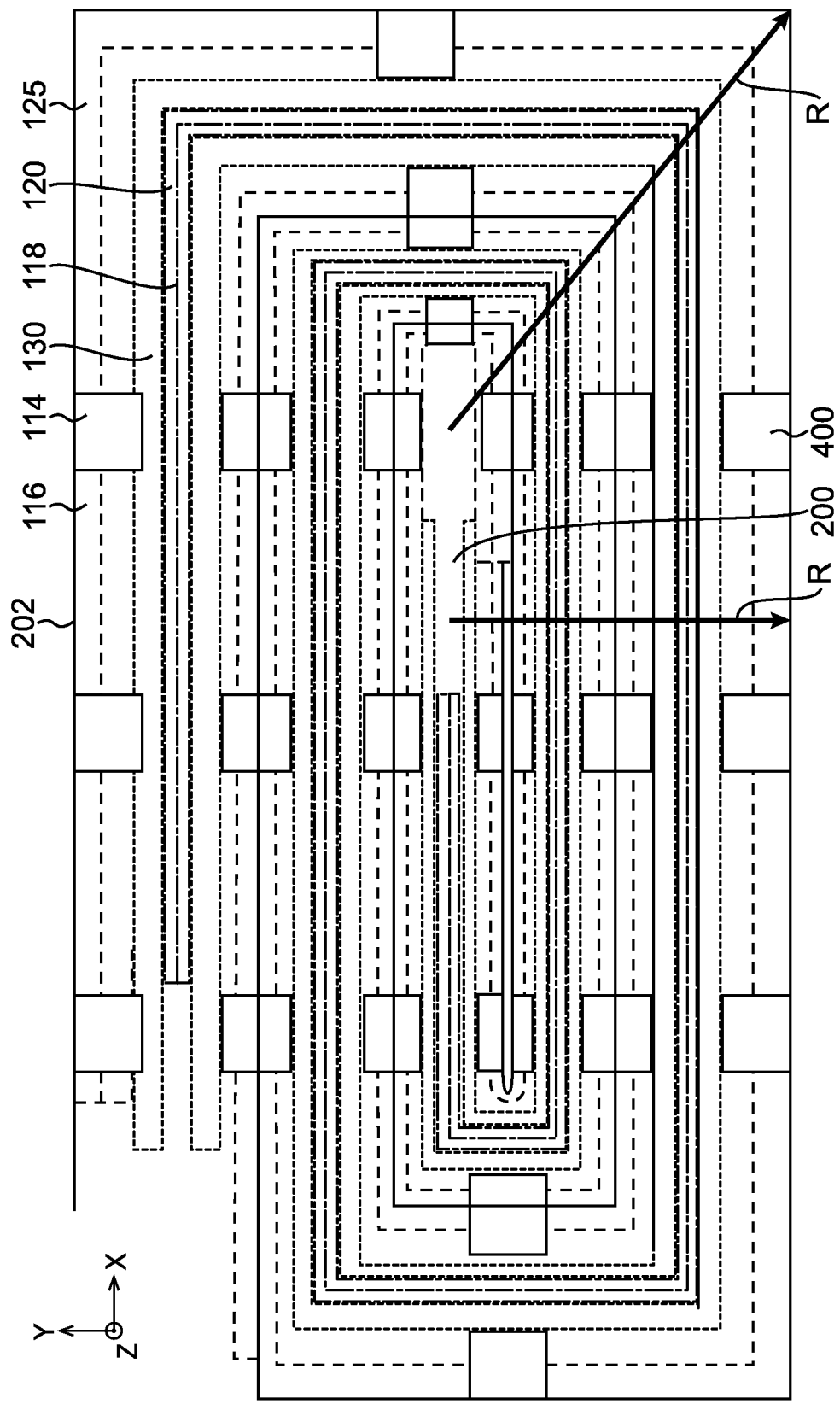
FIG. 12 is a cross-sectional view of another embodiment of a wound electrode assembly.

The stacked succession 800 within the unit cell 500 comprises those structures within the unit cell 500 (e.g. unit cell portion of electrode current collector, electrode layer, separator layer, counter-electrode layer and unit cell portion of counter-electrode layer), and/or sections of such structures, that are encountered in traversing the electrode assembly in the stacking direction. The stacking direction is the direction in which structures in the electrode assembly are stacked with respect to one another. According to certain embodiments, the stacking direction may be generally parallel to a shortest distance between structures in a unit cell of the electrode assembly. For example, for the prismatic electrode assembly in FIGS. 1A and 1B, the stacking direction is parallel to the axis Y, which is the direction along which the electrode layers 116 are stacked with respect to one another, and the stacked succession 800 comprises those members of the unit cell encountered as traveling along the axis Y, namely the unit cell portion of the electrode current collector 114, the electrode layer 116, separator layer 130, counter-electrode layer 120 and unit cell portion of the counter-electrode current collector 118. The stacked succession 800 of the unit cell 500 in this embodiment is thus bounded by the unit cell portion of the electrode current collector 114 and the unit cell portion of the counter-electrode current collector in the Y direction. In the wound electrode assembly embodiments of FIGS. 2A and 2B, and as also shown in FIGS. 11A-11B, the stacking direction is parallel to the direction R from the interior region 200 of the electrode assembly 106 to the exterior region 202 of the electrode assembly 106, which is a direction each outer wind 205b is stacked on top of a more interior wind 205. Accordingly, the stacked succession 800 of the electrode assembly 106 in this embodiment comprises those members of the unit cell encountered as traveling along the direction R, namely the unit cell portion of the electrode current collector 114, the electrode layer 116, separator layer 130, counter-electrode layer 120 and unit cell portion of the counter-electrode current collector 118. The stacked succession 800 of each individual unit cell 500 in this embodiment is thus bounded by a section of the unit cell portion of the electrode current collector 114 and a section of unit cell portion of the counter-electrode current collector, that are along the direction R in the same wind 205 of the electrode assembly.

Figure 5A:
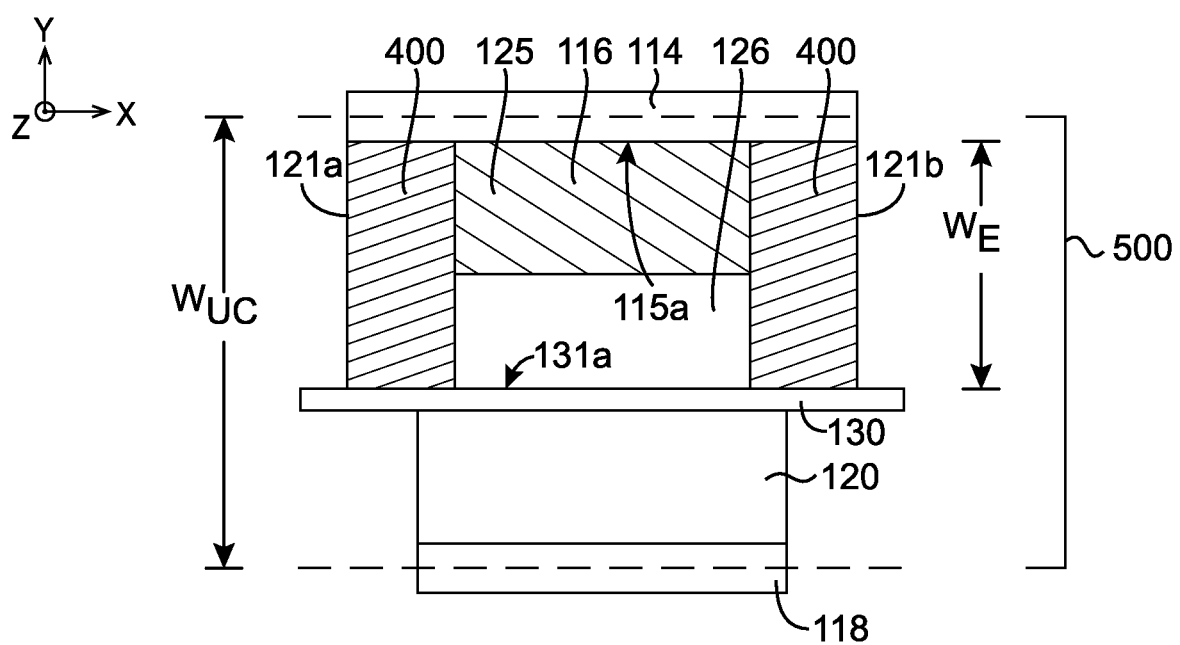
FIG. 5A is a cross-sectional view of another embodiment of structures including an electrode current collector, an electrode layer, a separator layer and a counter-electrode current collector, for an electrode assembly, as viewed in the Y-X plane, and including a population of spacer structures in the electrode layer.
Figure 5B:
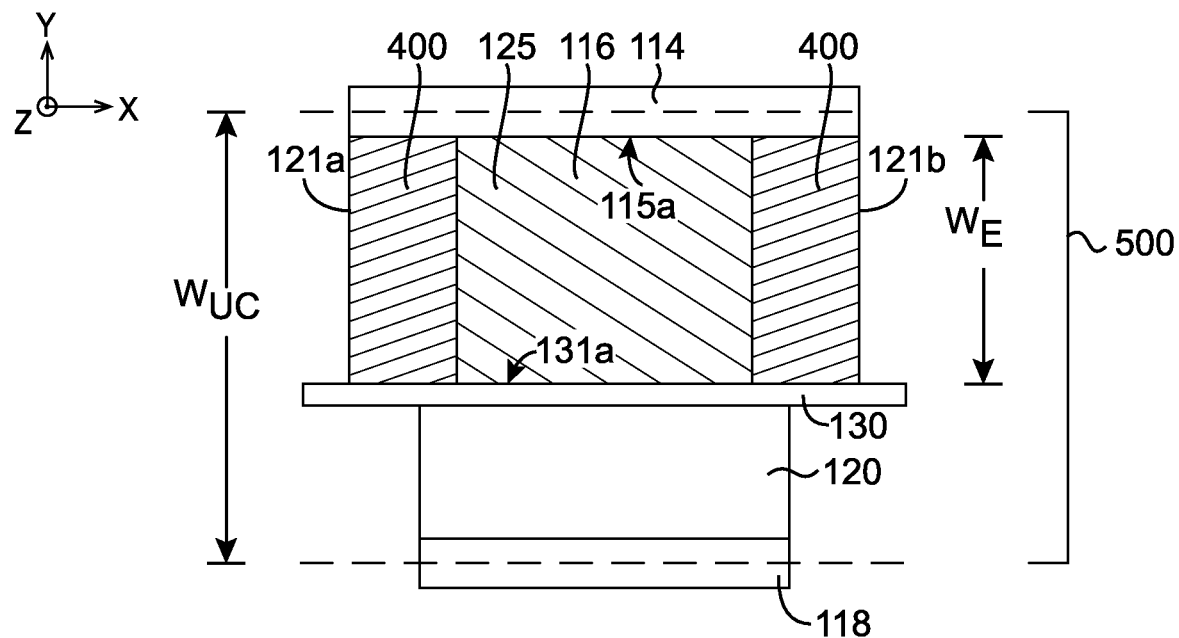
FIG. 5B is a cross-sectional view of the embodiment of the structures for an electrode assembly of FIG. 5A, as viewed in the Y-X plane, in a post-formation stage following a formation process that increases a volume of an electrode active material in the electrode layer.
Figure 5C:
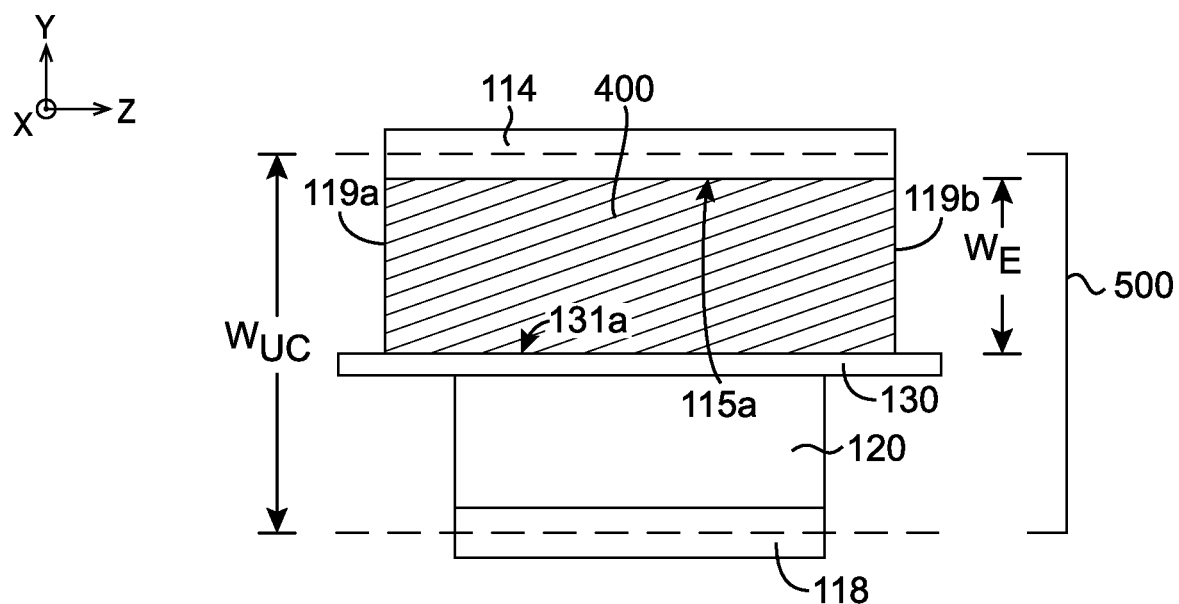
FIG. 5C is a cross-sectional view of the embodiment of the structures for an electrode assembly of FIG. 5A, as viewed in the Y-Z plane.
Figure 5D:
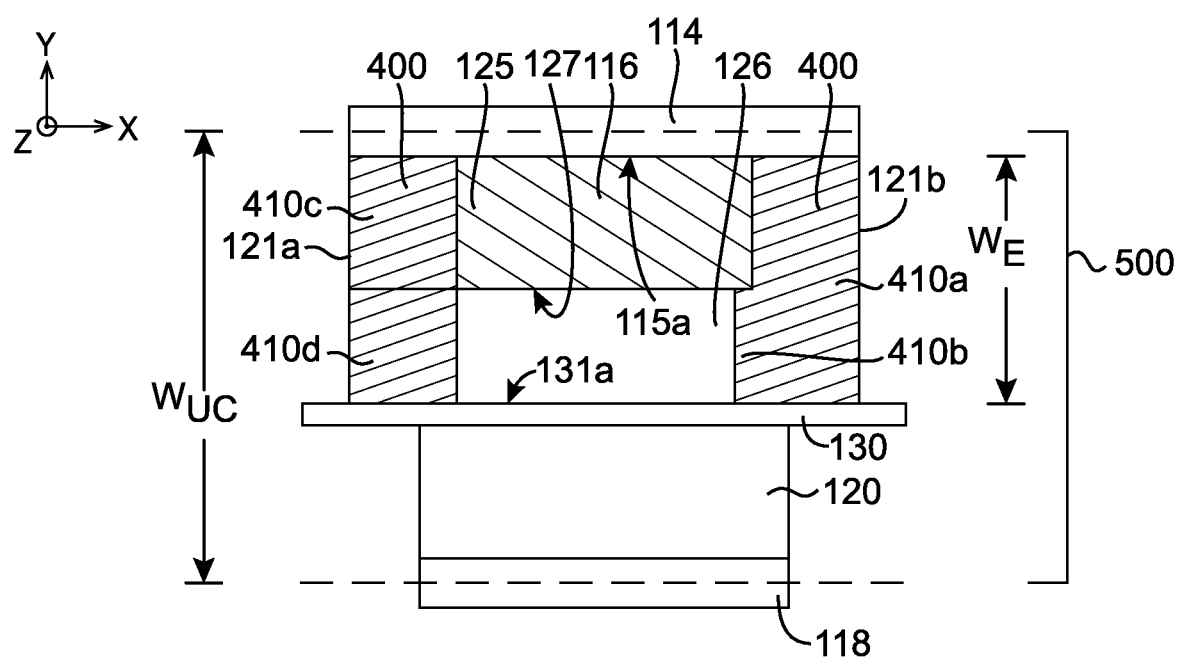
FIG. 5D is a cross-sectional view of another embodiment of structures including an electrode current collector, an electrode layer, a separator layer and a counter-electrode current collector, for an electrode assembly, as viewed in the Y-X plane, and including a population of spacer structures in the electrode layer.
Figure 6:
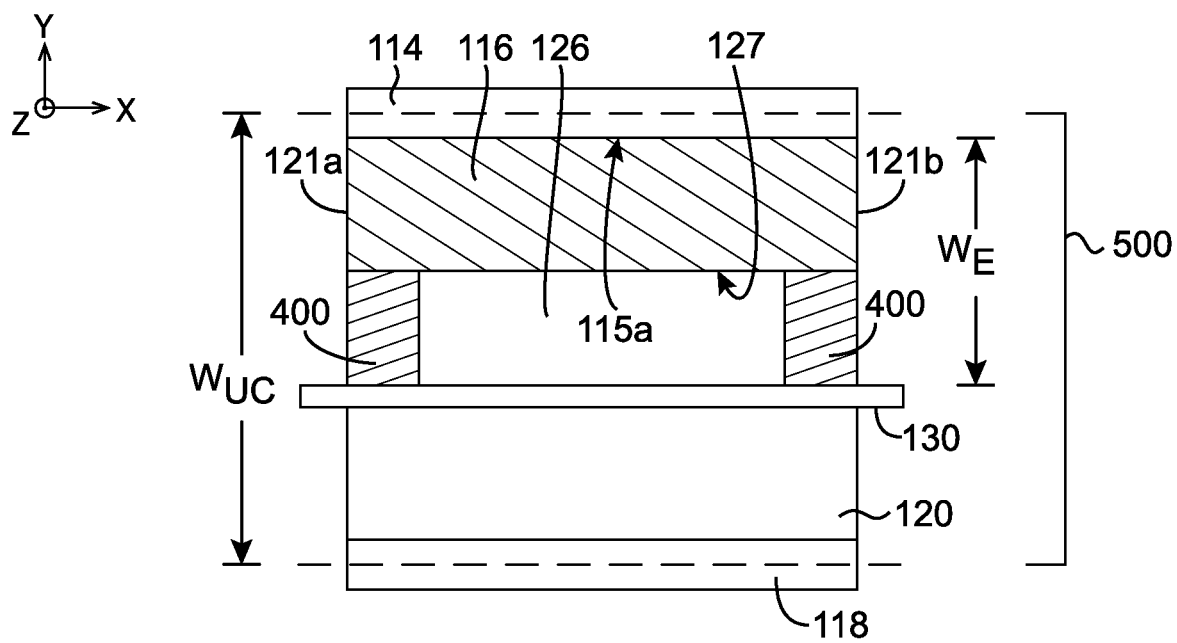
FIG. 6 is a cross-sectional view of another embodiment of structures including an electrode current collector, an electrode layer, a separator layer and a counter-electrode current collector, for an electrode assembly, as viewed in the Y-X plane, and including a population of spacer structures in the electrode layer.

According to one embodiment, the unit cell 500 comprises a width $W_{UC}$ measured in the stacking direction of the stacked succession 800 from the unit cell portion of the electrode current collector 114 to the unit cell portion of the counter-electrode current collector 118, as shown for example in the FIG. 3B as well as FIGS. 4-6, which illustrate embodiments of unit cells 500 in prismatic electrode assemblies. Furthermore, in a case of a spiral wound battery, as shown in FIGS. 11A-11B, the width $W_{UC}$ as measured in any wind 205 of the unit cell 500 along the wound path 208 of the electrode assembly corresponds to the width along the stacking direction R from the unit cell portion of the electrode current collector 114 to the unit cell portion of the counter-electrode current collector 118, as measured for the stacked succession in the unit cell comprising the closest electrode current collector and counter-electrode current collector neighbor sections 502 in the stacking direction (e.g., those sections 502 in the same wind 205 along the stacking direction R of the wound path 208).

According to yet another embodiment, the electrode layer 116 comprises a width, $W_e$, measured in the stacking direction, from the unit cell portion of the electrode current collector 114 adjacent the electrode layer 116 to the separator layer 130 adjacent the electrode layer 116. Referring to the embodiments as shown in FIGS. 3B and 4-6 for prismatic electrode assemblies, the width $W_E$ is as measured between a first surface 115a of the electrode current collector layer 114, and an opposing first surface 131a of the separator layer 130, in the stacking direction. Similarly, in the case of a spiral wound battery, as shown in FIGS. 11A-11B, the width $W_E$ as measured for any wind 205 along the wound path 208 of the electrode assembly corresponds to the width along the stacking direction R from the unit cell portion of the electrode current collector 114 to separator layer 130 adjacent the electrode layer 116, as measured for the stacked succession comprising the closest electrode current collector and separator neighbor sections in the stacking direction (e.g., those sections 502 in the same wind 205 of the wound path 208 of the electrode assembly).

According to embodiments, the electrode layer 116 further comprises a height, He, measured from a top surface 119a to a bottom surface 119b of the electrode layer 116 in a direction orthogonal to the stacking direction. Referring to FIGS. 1A and 1B, which depict embodiments of prismatic electrode assemblies, the height $H_E$ may be the dimension as measured parallel to the Z direction, which is orthogonal to the stacking direction in Y, from the top surface 119a to the bottom surface of the electrode layer 116. As shown in FIGS. 1A and 1B, the height $H_E$ is further orthogonal to the length direction $L_E$, which is measured along the X direction, where in the embodiment depicted in FIG. 1B the length $L_E$ is measured along the longest dimension of the electrode layer 116. Referring to the embodiments of the spiral wound electrode assemblies as shown FIGS. 2A-2B, the height $H_E$ may be the dimension as measured parallel to the Z direction, which is orthogonal to the stacking direction in R.

Figure 4B:
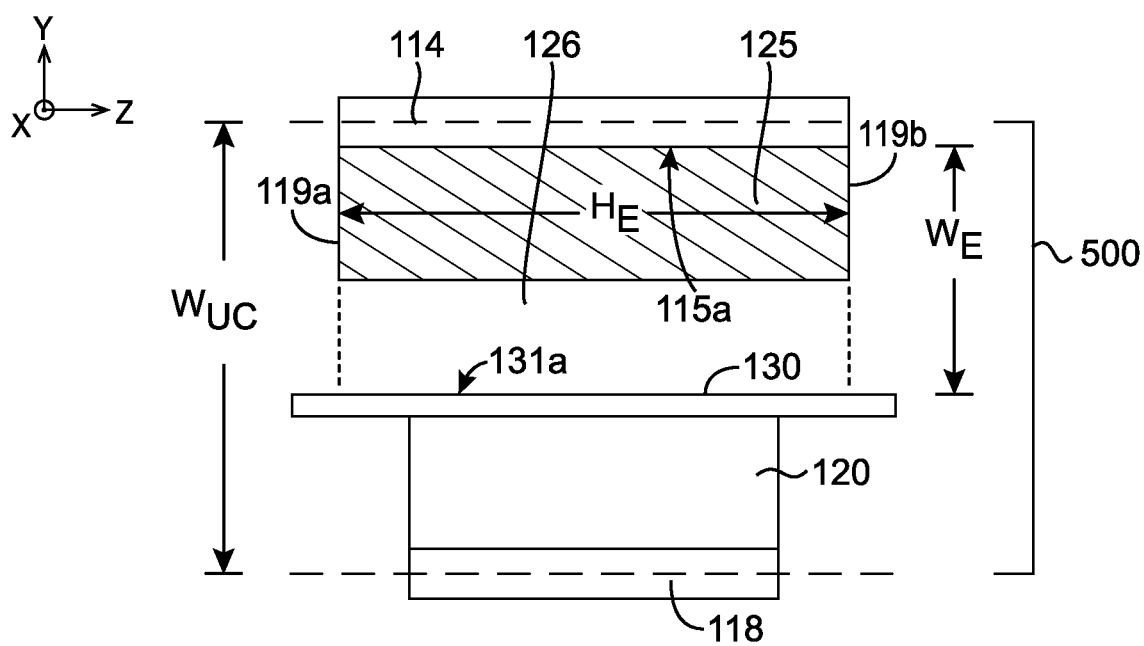
FIG. 4B is a cross-sectional view of the embodiment of the structures for the electrode assembly of FIG. 4A, as viewed in the Y-Z plane.
Figure 4C:
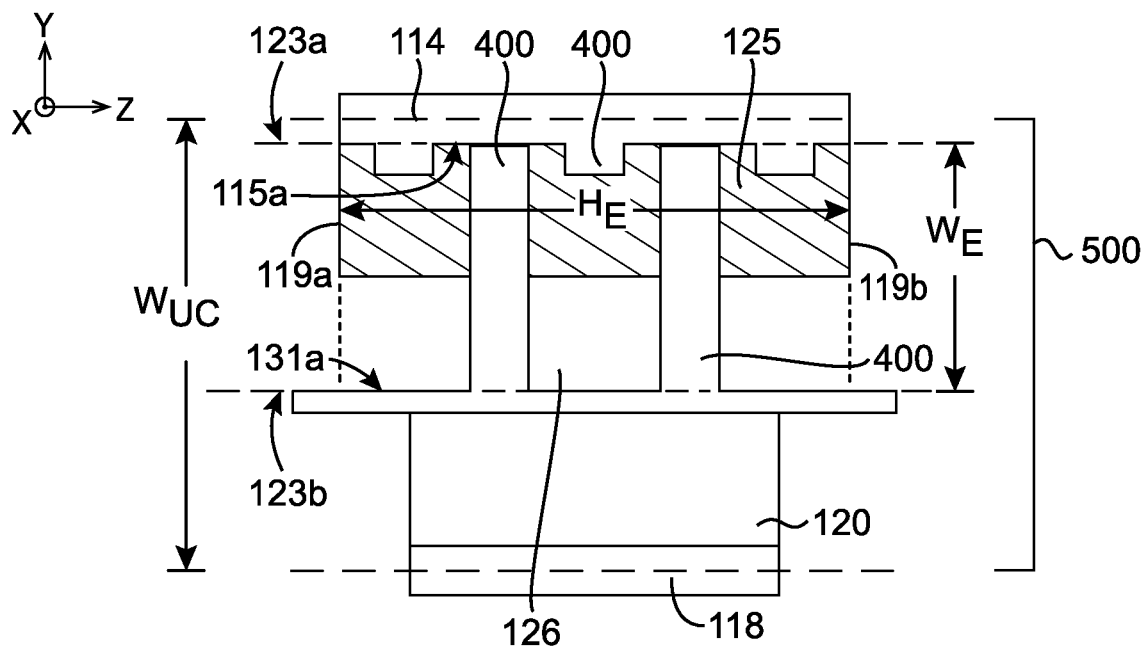
FIG. 4C is a cross-sectional view of another embodiment of structures including an electrode current collector, an electrode layer, a separator layer and a counter-electrode current collector, for an electrode assembly, as viewed in the Y-Z plane, and including a population of spacer structures in the electrode layer.

According to certain embodiments, the top surface 119a and bottom surface 119b of the electrode layer 116 are co-extensive with the surfaces of any physical structure within the width $W_E$ of the electrode structure that are at the ends of the electrode layer in a direction orthogonal to the stacking direction. For example, in one embodiment of a post-formation electrode assembly, the top and bottom surfaces 119a, 119b can comprise the end surfaces of the electrode active material layer 125 in the electrode layer 116, as shown in FIGS. 1A and 1B. As another example, in one embodiment, the top and bottom surfaces 119a, 119b can comprise top and bottom surfaces of spacer structures disposed at respective top and bottom ends of the electrode layer 116, such as in a case where a spacer structure is disposed about a periphery of the electrode layer 116 with the electrode active material layer 125 disposed interior to the peripheral spacer structure(s) (e.g., as shown in FIG. 5C). As yet another example, in a pre-formation electrode assembly, where a void space 126 may exist between an electrode active material layer 125 and separator, as shown for example in FIG. 4B, the top and bottom surfaces 119a, 119b are coextensive with end surfaces of the electrode active material layer 125 in the electrode layer 116. The height $H_E$ is thus the dimension as measured between these top and bottom surfaces 119a, 119b (e.g., as shown in FIG. 4B). Similarly, in one embodiment, the top and bottom surfaces 119a, 119b are coextensive with top and bottom surfaces of spacer structures 400 disposed at respective top and bottom ends of the electrode layer 116, such as in a case where a spacer structure is disposed about a periphery of the electrode layer 116 with the electrode active material layer 125 and void space 126 disposed interior to the peripheral spacer structure(s) (e.g., as shown in FIGS. 5A and 5C).

According to embodiments herein, the electrode layer 116 further comprises a length, Le, measured from a first end surface 121a to a second end surface 121b in a direction that is orthogonal to the stacking direction and the height direction. Referring to FIG. 1A, which depicts an embodiment of a prismatic electrode assembly, the length $L_E$ may be the dimension as measured parallel to the X direction, which is orthogonal to the stacking direction in Y and the height direction Z, from a first end surface 121a to the second end surface 121b of the electrode layer 116. Referring to FIG. 1B, which depicts another embodiment of a prismatic electrode assembly, the length $L_E$ may be the dimension as measured parallel to the Z direction as shown, which is orthogonal to the stacking direction in Y and the X direction, from a first end surface 121a to the second end surface 121b of the electrode layer 116. Referring to the embodiments of the wound electrode assemblies as shown FIGS. 2A-2B, the length $L_E$ may be the total extent of the electrode layer 116 as measured along the spiral path 208 of the wound electrode from the first end surface 121a at the interior region 200 to the second end surface 121b at the exterior region 202 of the electrode assembly 106, where the direction T of the spiral path is orthogonal to the Z axis and stacking direction R at each point along the spiral path. That is, the length $L_E$ of the wound electrode layer 116 according to certain embodiments can be the total extent of the electrode layer 116 as measured along every point in the wound path in the direction T that is orthogonal to the Z axis and stacking direction.

According to one embodiments, the length $L_E$ can correspond to a longest dimension of the electrode layer 116, such as for example the dimension $L_E$ that is parallel to the X axis in FIG. 1B, which, as depicted, has a greater extent than the dimension $W_E$ or $H_E$, and thus is the "longest" dimension. In another embodiment, such as for example as shown in FIG. 1A, where two dimensions of the electrode layer are equal then the length $L_E$ can be selected to be the dimension along the X direction, with the height $H_E$ being measured along the Z direction, although it can be seen from FIG. 1A that the X and Z directions in such an embodiment may be interchangeable where the sides of the electrode layer 116 are equal in size. Finally, in the wound embodiments as shown in FIGS. 2A-2B, the longest dimension would be equivalent to the dimension that is wound along the spiral path in the direction T. For example, if the wound electrode 116 as depicted in FIGS. 2A-2B were unwound into a flattened embodiment, such as that shown in FIGS. 1A-B, the dimension along the spiral path in the direction T would be larger than the height dimension $H_E$ as measured in a direction parallel to the X dimension, or a width dimension $W_E$ of the electrode layer as measured in a direction parallel to the Y axis (e.g. in the direction R when in the wound configuration). Accordingly, the length $L_E$ of the wound electrode 116 in certain embodiments may comprise a longest dimension of the electrode corresponding to the dimension of the electrode layer that is wound up to form the wound electrode assembly 106.

According to one embodiment, the first and second end surfaces 121a, 121b of the electrode layer 116, that may be used to define the length $L_E$ of the electrode layer 116, are co-extensive with the surfaces of any physical structure within the width $W_E$ of the electrode structure that are at the ends of the electrode layer in the length direction Le. For example, in a post-formation electrode assembly, the first and second end surfaces 121a, 121b can comprise the end surfaces of the electrode active material layer 125 in the electrode layer 116. As another example, in one embodiment, the first and second end surfaces 121a,b can comprise end surfaces of spacer structures disposed at respective first and second ends of the electrode layer 116, such as in a case where a spacer structure is disposed about a periphery of the electrode layer 116 with the electrode active material layer 125 disposed interior to the peripheral spacer structure(s) (e.g., as shown in FIG. 5B). As yet another example, in a pre-formation electrode assembly, where a void space 126 may exist between an electrode active material layer 125 and separator, as shown for example in FIG. 4A, the first and second end surfaces 121a, 121b are coextensive with end surfaces of the electrode active material layer 125 in the electrode layer 116. Similarly, in one embodiment, the first and second end surfaces 121a, 121b are coextensive with end surfaces of spacer structures disposed at respective first and second ends of the electrode layer 116, such as in a case where a spacer structure is disposed about a periphery of the electrode layer 116 with the electrode active material layer 125 and void space 126 disposed interior to the peripheral spacer structure(s) (e.g., as shown in FIG. 5A).

According to yet another embodiment, the width $W_E$ of the electrode layer 116 can be determined for an electrode layer 116 having an irregular or jagged interface between the electrode current collector 114 and/or the separator layer 130. Such an irregular interface could exist, for example, in a case where portions of separator material and/or electrode current collector material extend into the electrode layer 116, such as when a portion of the separator material and/or electrode current collector material serve as spacer structures 400, as shown for example in FIG. 4C, or in other configurations. In such an embodiment where a jagged or irregular interface exists, the width $W_E$ can be measured between the unit cell portion of the electrode current collector 114 that is adjacent the electrode layer 116, and the separator layer that is adjacent the electrode layer 116 on the opposing side of the electrode layer from the unit cell portion of the electrode current collector, by setting one or more of first and second boundary planes 123a and 123b that identify the one or more of the electrode current collector and/or separator surfaces 115a, 131a. That is, one of more of the first surface 115a of the electrode current collector 114 and the first surface 131a of the separator layer 130 can be defined according to boundary planes 123a, 123b that identify an interface between the electrode current collector layer 114 and/or separator layer 113 and the electrode layer 116 (e.g., as in FIG. 3B). For example, according to one embodiment, a first boundary plane 123a that is set as the first surface 115a of the unit cell portion of the electrode current collector layer 114 may be defined as a plane where (i) at least 80% of the area in the first boundary plane, and any other plane parallel to the first boundary plane in the stacked succession of the unit cell, and on a second side of the first boundary plane in a direction away from the separator layer 130, includes electrode current collector material, and (ii) an area of any other plane parallel to the first boundary plane on a first side of the first boundary plane towards the separator in the stacked succession of the unit cell, comprises less than 80% of electrode current collector material. That is, the boundary plane (first surface) of the electrode current collector may be set to correspond to that position along the stacking direction in the unit cell, in traveling from the separator to the electrode current collector, where at least 80% of the material encountered in the plane at that position, in directions orthogonal to the stacking direction, is current collector material. As can be understood, in further embodiments, the boundary plane (first surface) can be set where the requirement (i) is at least 90% of the area(s) being current collector material, and/or at least 95% of the area(s) being current collector material and/or at least 98% of the area(s) being current collector material. Accordingly, in a case where an interface between the current collector layer 114 and electrode layer 116 is relatively planar and/or smooth, it may be possible to identify the first surface 115a as equivalent to the boundary plane where 100% of the material in the plane is electrode current collector, whereas any plane on the first side of the boundary plane towards the separator layer comprises little or even no electrode current collector in the boundary plane. That is, according to embodiments herein, the boundary plane as defined herein can be set for structures where an interface between the electrode current collector and electrode layer 116 is relatively jagged and/or uneven, as well as for structures where the interface is more clearly defined.

Similarly, a second boundary plane 123b that is set as the first surface 131a of the separator 130 may be a plane where (i) at least 80% of the area in the second boundary plane, and any other plane parallel to the second boundary plane in the stacked succession of the unit cell, and on a first side of the second boundary plane in a direction away from the electrode current collector 114 in the unit cell, includes separator material, (ii) an area of any other plane parallel to the second boundary plane on a second side of the second boundary plane towards the electrode current collector 114 in the stacked succession of the unit cell, comprises less than 80% of separator material. That is, the boundary plane (first surface) of the separator layer may be set to correspond to that position along the stacking direction in the unit cell, in travelling from the electrode current collector to the separator, where at least 80% of the material encountered in the plane at that position along directions orthogonal to the stacking direction, is separator material. As can be understood, in further embodiments, the boundary plane (first surface) can be set where the requirement (i) is at least 90% of the area(s) being separator material, and/or at least 95% of the area(s) being current separator material and/or at least 98% of the area(s) being separator material. Accordingly, in a case where an interface between the separator layer 130 and electrode layer 116 is relatively planar and/or smooth, it may be possible to identify the first surface 131a as equivalent to the boundary plane where 100% of the material in the plane is separator material, whereas any plane on the second side of the boundary plane towards the electrode current collector layer comprises little or even no separator material in the boundary plane. That is, according to embodiments herein, the boundary plane as defined herein can be set for structures where an interface between the separator layer 130 and electrode layer 116 is relatively jagged and/or uneven, as well as for structures where the interface is more clearly defined.

Furthermore, according to certain embodiments, while the first and second boundary planes 123a, 123b depicted in FIG. 3B are planar with dimensions along Cartesian coordinates (X, Y and Z), it can be understood that the boundary planes 123a, 123b that delineate the interface between surfaces in the unit cell along the stacking direction may also comprise curved boundary planes or boundary planes having other shapes. For example, referring to the wound electrode assemblies of FIGS. 2A and 2B, as well as FIGS. 11A and 11B, the first and second boundary planes may have a curved shape generally corresponding to the spiral wind of the electrode layer 116. According to certain embodiments, the width $W_E$ of the electrode layer 116 can be measured as the distance between the first and second boundary planes 123a,b of the unit cell portion of the electrode current collector and the separator layer 130 in the stacked succession. According to yet another embodiment, when the first and second surfaces 115a, 131a of the electrode current collector 114 and separator are relatively smooth and/or readily identifiable, this width $W_E$ may simply be equivalent to the distance between the surfaces 115a, 131a. According to yet a further embodiment, the width $W_E$ may be the width between one or more of first and/or second boundary planes set for an electrode current collector and/or separator having a relatively irregular shape, and the surface of the other of the electrode current collector and/or separator that is a relatively smooth and/or readily identifiable. That is, the width $W_E$ can be understood to be the extent of the dimension between the surfaces of the electrode current collector and separator, with the surfaces being set as either the surface of a readily identifiable interface between the structures, and/or a boundary plane set to correspond to the surface and meeting the criteria set forth above.

According to one embodiment, the electrode layer 116 comprises a volume Ve, which is bounded by the unit cell portion of the electrode current collector 114, the separator layer 130, the top surface 119a of the electrode layer 116, the bottom surface 119b of the electrode layer 116, the first end surface 121a of the electrode layer 116, and the second surface 121a of the electrode layer 121a. For example, referring to FIGS. 3A and 3B, the volume Ve is calculated as the length of the electrode layer $L_E$ as measured between the first and second end surfaces 121a, 121b, times the height $H_E$ of the electrode layer 116 as measured between the top and bottom surfaces 119a, 119b, times the width $W_E$ as measured between the first surface 115a of the unit cell portion of the electrode current collector layer 114 and the first surface 131a of the separator layer 130. The width $W_E$ may also be measured by determining the distance between first and second boundary planes 123a, 123b that are set as the first surface 115a of the unit cell portion of the electrode current collector layer 1124 and the first surface 131a of the separator layer, as discussed herein.

Figure 9:
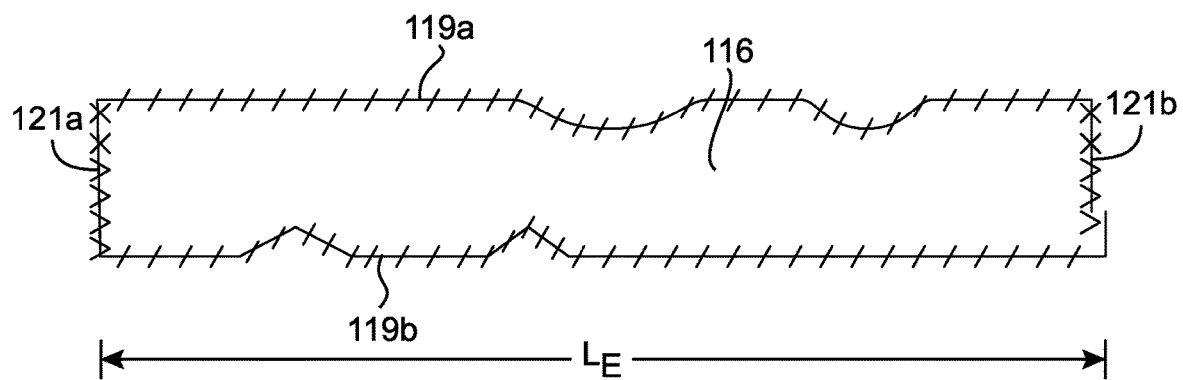
FIGS. 9-10 illustrate schematic views of embodiments of electrode layers 116 including representative dimensions and subvolumes thereof.

Referring to FIG. 9, according to one embodiment, the volume Ve of the electrode layer 116 can be calculated even for an electrode layer having an irregular or uneven shape in the dimensions orthogonal to the width dimension We. For example, as shown in FIG. 9, the electrode layer 116 is viewed in the X-Z plane, as viewed along the stacking direction Y, and the dimension $H_E$ can be seen to vary along the length $L_E$ of the electrode layer 116. Similarly, in other embodiments, the dimension $L_E$ could vary along the height $H_E$ of the electrode layer 116, and other both the dimensions $L_E$ and/or $H_E$ may vary as a function of each other, and/or as a function of width We. Accordingly, in certain embodiments, to determine the volume, the volume integral of the electrode layer 116 can be calculated to determine the volume Ve. The volume integral of the electrode layer 116 can be calculated according to a suitable mathematical method as understood by those of ordinary skill in the art. As an example of calculation of such a volume integral, the width $W_E$ can be set by determining the first and second boundary planes 123a,123b of the unit cell portion of the electrode current collector and separator in the unit cell (e.g. at the surfaces of these structures), and the distances between the first and second end surfaces (Length $L_E$) and top surface and bottom surfaces (height $H_E$) can then be used to calculate the volume of the electrode layer according to the following formula:

$$\text{Volume} = \int H_E(l) \times W_E(l) \times dl \text{ (integrating over } L=0 \text{ to } L=L_E)$$

Other means of determining the volume of the electrode layer 116, as bound by the unit cell portion of the electrode current collector, the separator layer, the top surface of the electrode layer, the bottom surface of the electrode layer, the first surface of the electrode layer, and the second surface of the electrode layer, can also be used. For example, in one embodiment, a plurality of cross sections at various different points along X, Y and Z can be taken along X-Y, Y-Z and X-Z planes, which planes can be used to build a three-dimensional model that closely approximates the 3D structure of the electrode layer, using computational techniques to compute the total volume $V_E$ of the electrode layer.

In the embodiments, as shown in FIGS. 3A-3C and 4-6, the electrode layer 116 comprises a population of spacer structures 400 disposed therein. In one embodiment, the population of spacer structures 400 may be provided as a part of the electrode layer 116, to physically space electrode material away from the separator layer 130 prior to a formation process performed to form a secondary battery. The population of spacers 400 may thus allow for the presence of void space between the electrode material in the layer 116 and the separator 130, so as to reduce any stress than may be caused during a formation process that may result in expansion of components of the electrode assembly 106, such as the electrode material. For example, as shown in the embodiment depicted in FIG. 5A, the electrode layer 116 can comprise an electrode active material layer 125 that extends at least partly along the width $W_E$ of the electrode layer 116, and void space 126 filling the remainder of the electrode layer 116. For example, the void space 126 may be provided in a case where the electrode assembly 106 is a pre-formation stage, prior to performing a formation process to charge and/or form the secondary battery containing the electrode assembly 106. In another embodiment, as shown in FIG. 5B, the electrode assembly 106 in a post-formation stage after performing a formation process comprises an electrode active material layer 125 that has expanded during the formation stage to extend further along with width $W_E$ of the electrode layer 116, and that may even extend to the interface with the separator layer 130.

In one embodiment, the population of spacer structures comprises a plurality of spacer structures disposed within the electrode layer 116, and along a direction of the electrode layer that is orthogonal to the stacking direction. For example, in the embodiment, shown in FIG. 3C, the plurality of spacer structures are disposed along the direction corresponding to the length $L_E$ of the electrode layer 116 (e.g., the X direction), which in certain embodiments may be a longest dimension of the electrode layer 116. As yet another example, as shown in the embodiment depicted in FIG. 11A, the population of spacer structures 400 may be disposed at various points along the direction T of the spiral path of the wound electrode 116, which in certain embodiments may correspond to the longest dimension of the electrode layer. According to yet another embodiment, the population of spacer structures 400 in the electrode layer 116 can comprise only a single spacer structure 400, such as a single spacer structure that extends at least partly along a periphery 404 of the electrode layer, as shown for example in the embodiment depicted in FIG. 8B. The population of spacer structures can be disposed along the electrode layer 116 at and/or adjacent to an interface of the electrode layer 116 with the separator layer 130, such as at and/or adjacent to a surface 131a of the separator layer 130, as shown in the embodiment depicted in FIG. 6. In the embodiment as shown in FIG. 6, members of the population of spacer structures 400 extend only partly through the width $W_E$ of the electrode layer, to the electrode active material layer 125. According to yet another embodiment, the population of spacer structures can be disposed along the electrode layer 116 at and/or adjacent to an interface of the electrode layer 116 with the unit cell portion of the electrode current collector 114, such as at and/or adjacent to a surface 115a of the unit cell portion of the electrode current collector 114, and/or may extend along the width $W_E$ of the electrode layer 116 between the interfaces of the electrode layer 116 with the unit cell portion of the electrode current collector 114 and separator layer 130, as shown in the embodiment depicted in FIG. 5A.

According to yet another embodiment, members of the population of spacer structures 400 can comprise a member having a first portion 410a thereof that extends to the surface 115a of the unit cell portion of the electrode current collector from the surface 131a of the separator layer 130 (e.g., substantially across the width $W_E$ of the electrode layer 116), and a second portion 410b thereof that extends only partly across the width $W_E$ of the electrode layer 116, to a position that is flush with the surface 127 of the electrode active material layer 126 that is disposed adjacent the unit cell portion of the electrode current collector 114 (see, e.g., FIG. 5D). That is, the same spacer structure member may have different portions 410a, 410b, such as different portions along X or Z directions, that terminate at different points along the width $W_E$ of the electrode layer 116. According to yet another embodiment, one or more members of the population of spacer structures may comprise first and second segments 410c, 410d, optionally comprising first and second spacer materials. For example, referring again to FIG. 5D, in one embodiment one or more of the spacer structures 400 can comprise a first segment 410c in a section of the structure extending from the current collector surface 115a to a position along $W_E$ of the electrode layer that is flush with the electrode active material layer surface 127, and a second segment 410d that extends from the position along $W_E$ of the electrode layer that is flush with the electrode active material layer surface 127, to the surface 131a of the separator layer 130. The first and second segments 410c, 410d may be, for example, different segments of the spacer structure 400 that are separately manufactured, but that comprise the same spacer materials, and/or may comprise first and second segments each comprising first and second spacer materials, respectively, that are different from one another. According to yet further embodiments, the spacer structures 400 can comprise combinations of the first and second portions 410a,b and first and second segments 410c,d.

In certain embodiments, the electrode active material layer 125 can expand during the formation stage to substantially entirely fill the void space 126 left in the pre-formation stage. In other embodiments, the electrode active material layer 125 expands to only partially fill the void space during the formation process, such that at least some remaining void space 126 is left remaining in the electrode layer 116 post-formation. Such partial filling may be advantageous, for example, to accommodate any further expansion of the electrode active material or other materials that can occur during cycling of the secondary battery having the electrode assembly. According to certain embodiments, the electrode active material layer 125 either pre- and/or post formation may further comprise a porous layer, such that the electrode active material layer 125 can itself comprise void space, independently of any void space imparted by the presence of spacers 400, either before and/or after formation of the secondary battery 102. For example, in one embodiment, the electrode active material layer 125 (in the pre or post formation stage) can comprise at least 10%, at least 25%, and/or at least 50% void space, measured as the percent void volume per volume of the electrode active material layer 125, and may typically comprise less than 70% void space, such as less than 60% void space, less than 50% void space, and/or less than 25% void space, such as a void space in a range of from about 10% to 70% of the volume of the electrode active material layer. Accordingly, including any void space contained in the electrode active material layer 125 itself, in one embodiment, the electrode layer 116 in the post-formation stage comprises less than 60% void space as a percentage of the total volume $V_E$ of the electrode layer, such as less than 50% void space, less than 40%, less than 30%, less than 20% and/or even less than or equal to about 10% void space as a percentage of the total volume $V_E$ of the electrode layer 116. In another embodiment, the electrode layer in the pre-formation stage comprises at least 40% void space as a percentage of the total volume of the electrode layer, such as at least 50% void space, at least 60% void space, at least 75% void space, and/or at least 90% void space as a percentage of the total volume of the electrode layer. That is, the void space in the pre-formation stage electrode layer may up to or equal to 90%, and may decrease down to as little as 10% in the post-formation stage.

In one embodiment, the population of spacer structures 400 comprises a material that is other than the electrode active material in the electrode active material layer 125. For example, in one embodiment, the population of spacer structures 400 can comprise a material that does not substantially increase in volume during a formation process performed to form the secondary battery, and/or during charge cycling of the secondary battery. As another example, the population of spacer structures can comprise a spacer material that increases in volume during formation and/or charge cycling, but that increases in volume by a lesser amount per mole of spacer material than any increase in volume per mole of electrode active material that occurs during a formation process and/or during cycling of the secondary battery. For example, in one embodiment, the population of spacer structures can comprise spacer material having a capacity to accept carrier ions of less than one mole of carrier ion per mole of spacer material, when the secondary battery 102 comprising the electrode assembly 106 is charged from the discharged state to the charged state. The spacer material may thus exhibit less expansion than an electrode active material used in electrode layer, such as for example in a case where the layer of electrode active material has the capacity to accept more than one mole of carrier on per mole of electrode active material when the secondary battery is charged from the discharged state to the charged state. The charged state of the secondary battery is at least 75% of a rated capacity of the secondary battery, and the discharged state is less than 25% of the rated capacity of the secondary battery. In one embodiment, the population of spacer structures 400 comprises any one or more of materials suitable for use in the separator layer, and/or materials that are suitable for use as electrode and/or counter-electrode materials, such as any described elsewhere herein. According to another embodiment, the population of spacer structures 400 can comprise electrode active material, such as any electrode active materials described elsewhere herein. According to one embodiment, the population of spacer structures comprises materials that are relatively inert and/or unreactive in the operation and storage of in a battery environment, such as inert and/or unreactive in the electrochemical reactions that occur in the secondary battery 102. For example, in one embodiment, the population of spacer structures can comprise a polymer material, such as any of the polymeric materials described elsewhere herein that would be suitable for the separator layer 130. In one embodiment, the population of spacer structures 400 can comprise a non-porous spacer material. In another embodiment, the population of spacer structures 400 can comprise a porous spacer material, for example, the population of spacer structures 400 can comprise a porous spacer material that imparts a porosity to the structures of at least 10%, at least 25%, at least 50%, at least 75%, and even at least 90%. In one embodiment, the population of spacer structures 400 comprises spacer material that is capable of providing adequate mechanical strength to withstand pressures that may be exerted during a formation process and/or during repeated cycling of the secondary battery, such as in substantially maintaining a predetermined size and shape during a formation process and/or during repeated cycling of the secondary battery 102.

According to yet another embodiment, the population of spacer structures 400 can comprise spacer material with relatively low conductivity, such that an overall conductance of all of the of spacer structures 400 in the electrode layer is less than that of the conductance of either and/or both of the electrode current collector layer and counter-electrode current collector, and may even be less than a total conductance of electrode active material in the electrode layer 116. For example, according to one embodiment, wherein a ratio of the electrical conductance of the electrode active material in the electrode layer to a total electrical conductance of all members of the spacer population in the electrode layer is at least 2:1, at least 5:1, and/or at least 50:1.

In one embodiment, the population of spacer structures can comprise spacer material that is the same material as that of the separator layer 130. For example, in one embodiment, one or more spacer structures can be provided that extend from the separator layer 130 (such as from a second boundary plane 123b defined for the separator layer) at least partly along $W_E$ defined for the width of the electrode layer. In yet another embodiment, the population of spacer structures can comprise spacer material that is the same material as that of the electrode current collector layer. For example, in one embodiment, spacer structures can be provided that extend from the unit cell portion of the current collector layer 114 (such as from the first boundary plane 123a defined for the unit cell portion of the current collector layer layer) at least partly along $W_E$ defined for the width of the electrode layer 116. In one embodiment the spacer structures comprising separator material can be fabricated as a unitary piece with the separator layer, or the separator structures may be formed separately from the separator layer, and provided in the electrode layer 116. In yet another embodiment, the population of spacer structures can comprise spacer material that is the same as that of the electrode active material. According to yet another embodiment, the population of spacer structures can comprise spacer material that has the capacity to act as electrode active material (e.g., capacity to accept carrier ions) even if it is not the same as the electrode active material of the electrode active material layer 125. In one embodiment, the spacer material can comprise any electrode active materials described elsewhere herein, including one or more of lithium spacer structures (e.g., fora lithium secondary battery comprising a lithium sheet electrode), lithium titanium oxide, graphene, tin, germanium and transition metal oxides, as well as sulfides, phosphides and nitrides thereof.

According to certain embodiments, the population of spacer structures 400 is provided in the electrode layer 116, in a configuration and distribution such that the population of spacer structures occupies a total volume within the electrode layer 116 that is within a range of from about 0.1% to about 35% of the volume, $V_E$, of the electrode layer 116. That is, according to certain embodiments, the population of spacer structures 400 comprises a total volume in the electrode layer 116 that is sufficient to impart the void space 126 in the pre-formation electrode assembly. Furthermore, according to certain embodiments, the population of spacer structures 400 comprises total a volume in the electrode layer 116 that is sufficiently small such that the presence of any spacer structures post-formation does not significantly adversely affect cycling of the secondary battery between charged and discharged states. Accordingly, in one embodiment, the population of spacer structures occupies a total volume within the electrode layer that is at least 0.1%, such as at least 0.25%, at least 0.5%, at least 0.75%, and/or at least 1% of the volume $V_E$ of the electrode layer. In another embodiment, the population of spacer structures occupies a total volume within the electrode layer 116 that is less than 35%, such as less than 25%, less than 10%, less than 5% and/or less than 2% of the volume $V_E$ of the electrode layer. For example, the population of spacer structures can occupy a total volume within the electrode layer 116 that is in a range of from 0.25% to 25%% of the volume $V_E$ of the electrode layer, such as a range of from 0.5% to 10% of the volume $V_E$ electrode layer.

According to another embodiment, the volume of solid electrode active material layer 125 as percent of the total volume $V_E$ of the electrode layer 116 increases following the formation process, due to growth and/or expansion of the electrode active material layer. According to one embodiment, the electrode layer 116 comprises a first volume of solid electrode active material prior to the formation process, and a second volume of solid electrode active material after the formation process that is greater than the first volume. That is, according to certain embodiments, the formation process can be performed to increase the volume of the solid electrode active material in the electrode layer to the second volume that is at least 3%, at least 5%, at least 10%, at least 25%, at least 50%, at least 75% and/or at least 100% greater than the first volume of the solid electrode active material in the electrode layer. Furthermore, the increase in volume of the solid electrode active material can occur while a change in the unit cell width $W_{UC}$ that is exhibited post formation as compared to the unit cell width $W_{UC}$ pre-formation may, in some embodiments, be less than 1%, less than 0.5%, less than 0.25% and/or less than 0.1%, and/or the unit cell width $W_{UC}$ both pre and post-formation may be substantially the same, such that the width of the unit cell 500 substantially does not change during the formation process.

Figure 10:
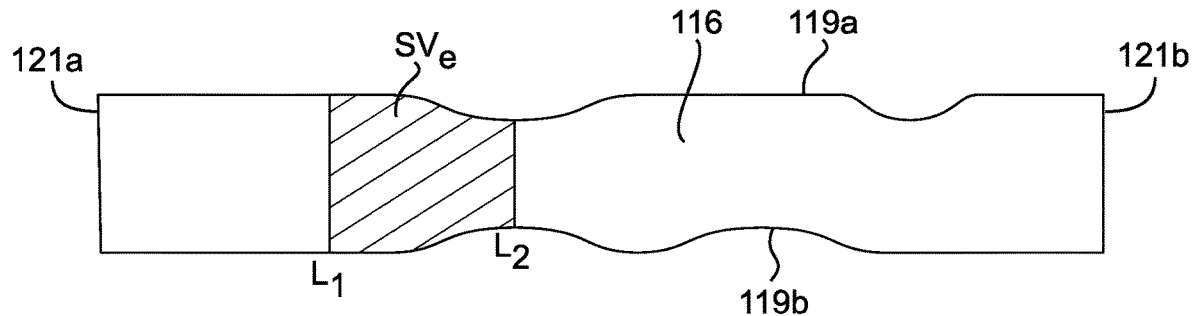

According to yet another embodiment, the population of spacer structures 400 are distributed and/or provided within the electrode layer 116, such that at least one member of the population is located within each subvolume of the electrode layer 116 that comprises (i) at least 25% of the volume, $V_E$, of the electrode layer 116, and is (ii) bounded on all sides by (aa) the until cell portion of the current collector 114, (bb) the separator layer 130, (cc) the top surface of the electrode layer, (dd) the bottom surface of the electrode layer, (ee) the first end surface of the electrode layer, and (ff) the second end surface of the electrode layer. The Subvolume $SV_E$ in the total volume $V_E$ of the electrode layer 116 can be calculated by suitable mathematical methods, as understood by those of ordinary skill in the art. Referring to FIG. 10, according to one example, a subvolume $SV_E$ can be calculated between any two point along the length $L_E$ of the electrode layer 116, according to the following formula:

Subvolume $SV_E = \int H_E(l) \times W_E(l) \times dl$ (integrating over $L=L_1$ to $L=L_2$)

Accordingly, for any subvolume as defined above that is equivalent to 10% or more of the total volume $V_E$ of the electrode layer 116, the population of spacer structures distributed in the electrode layer 116 is such that at least one member of the population is located within the subvolume. According to one embodiment, the spacer structures are distributed in the electrode layer 116 with a distribution that provides sufficient support for the unit cell structures in the electrode assembly in the stacking direction (width direction $W_E$), such that integrity of the unit cell structures in the electrode assembly can be maintained. According to one embodiment, the spacer structures are distributed to provide sufficient structural support such that excessively large gaps or void spaces that could lead to collapse or failure of the unit cells in the stacked succession of the electrode assembly is avoided. In one embodiment, the population of spacer structures is distributed such that at least one member is located within each subvolume of the electrode assembly that comprises at least 20% of the volume $V_E$ of the electrode layer and even within each subvolume of the electrode assembly that comprises at least 10% of the volume $V_E$ of the electrode layer, such as within each subvolume of the electrode assembly that comprises at least 5% of the volume $V_E$ of the electrode layer.

Referring to FIGS. 4A-7C, various embodiments of unit cells 500 of electrode assemblies, comprising populations of spacer layers, are shown. Referring to FIG. 4A, a cross-section of a unit cell 500 is shown as taken along an X-Y plane of a unit cell 500 of an electrode assembly, such as that shown in the embodiment of FIGS. 3B-3C. In this embodiment, the unit cell has a width $W_{UC}$ as measured between the unit cell portion of the electrode current collector 114 and the unit cell portion of the counter-electrode current collector 118 in the stacking direction (parallel to the Y axis). The electrode layer 116 comprises an electrode active material layer 125 disposed adjacent the electrode current collector, and a void space 126 between the electrode active material layer 125 and the surface of the separator, with a width $W_E$ of the electrode layer being defined between the electrode current collector 114 and the separator as shown and as discussed elsewhere herein, where both the electrode active material layer 125 and void space 126 are contained within the width $W_E$ of the electrode layer 116. According to one embodiment, the unit cell 500 may be in a pre-formation stage, prior to performing a formation process to fully form the secondary battery comprising the unit cell 500, whereas the same unit cell 500 in a post-formation stage can comprise an electrode active material layer 125 that fills a significantly greater portion, and even substantially all, of the void space 126. Furthermore, as shown, the cross-section is taken for an X-Y plane at a position in Z where no spacer exists, although the full unit cell in three dimensions would comprise spacer structures in other planes along Z. The electrode layer 116 comprises first and second end surfaces 121a, 121b, which comprise the ends of the electrode active material layer 125.

Referring to FIG. 4B, a cross-section of a unit cell 500 is shown as taken along an Y-Z plane a unit cell 500 of an electrode assembly 106, such as the embodiment as shown in FIGS. 3B-3C. In this embodiment, the unit cell has a width $W_{UC}$ as measured between the unit cell portion of the electrode current collector 114 and the unit cell portion of the counter-electrode current collector 118 in the stacking direction (parallel to the Y axis). The electrode layer 116 comprises an electrode active material layer 125 disposed adjacent the electrode current collector, and a void space 126 between the electrode active material layer 125 and the surface of the separator, with a width $W_E$ of the electrode layer being defined between the electrode current collector 114 and the separator as shown and as discussed elsewhere herein, where both the electrode active material layer 125 and void space 126 are contained within the width $W_E$ of the electrode layer 116. According to one embodiment, the unit cell 500 may be in a pre-formation stage, prior to performing a formation process to fully form a secondary battery comprising the unit cell 500, whereas the same unit cell 500 in a post-formation stage can comprise an electrode active material layer 125 that fills a significantly greater portion of the void space 126, and even substantially all of the void space 126. Furthermore, as shown, the cross-section is taken for a Y-Z plane at a position in X where no spacer exists, although the full unit cell in three dimensions could comprise spacer structures in other planes along Z. The electrode layer 116 comprises top and bottom surfaces 119a, 119b, which comprise the ends of the electrode active material layer 125.

Referring to FIG. 5A, a cross-section of another embodiment of a unit cell 500 is shown as taken along a Y-Z plane, at a position in Z where spacer structures 400 can be seen. In this embodiment, the unit cell has a width $W_{UC}$ as measured between the unit cell portion of the electrode current collector 114 and the unit cell portion of the counter-electrode current collector 118 in the stacking direction (parallel to the Y axis). The cross-section of the electrode layer 116 comprises an electrode active material layer 125 disposed adjacent the electrode current collector, spacer structures 400 on either side of the electrode active material layer 125, and a void space 126 between the electrode active material layer 125 and the surface 131a of the separator 130. The width $W_E$ of the electrode layer can be defined between the electrode current collector 114 and the separator 130 as shown and as discussed elsewhere herein, where the electrode active material layer 125, spacer structures 400, and void space 126 are contained within the width $W_E$ of the electrode layer 116. According to one embodiment, the unit cell 500 may be in a pre-formation stage, prior to performing a formation process to fully form a secondary battery comprising the unit cell 500, whereas the same unit cell 500 in a post-formation stage can comprise an electrode active material layer 125 that fills a significantly greater portion of the void space 126, and even substantially the entire void space 126. The two spacer structures 400 are disposed at either ends of the electrode active material layer 125, and extend from the unit cell portion of the electrode current collector along the width $W_E$ to the separator 130. Furthermore, as shown, the cross-section is taken for a Y-X plane at a position in Z where spacer exists, and the full unit cell in three dimensions could comprise further spacer structures in other planes along Z, according to the desired spacing characteristics. The electrode layer 116 comprises first and second end surfaces 121a, 121b, which in the embodiment as shown comprise the ends of each of the respective spacer structures in the length dimension, and which define the length dimension $L_E$ of the electrode layer 116. FIG. 5B is an embodiment depicting the unit cell of FIG. 5A in a post-formation stage, following a formation process where the electrode active material layer 125 has expanded to at least partially and even substantially entirely fill the void space 126.

FIG. 5C depicts the unit cell of FIG. 5A in a cross-section taken in a Y-Z plane, and at a position in X where a spacer structure 400 can be seen. In this embodiment, the unit cell has a width $W_{UC}$ as measured between the unit cell portion of the electrode current collector 114 and the unit cell portion of the counter-electrode current collector 118 in the stacking direction (parallel to the Y axis). The cross-section of the electrode layer 116 comprises the spacer structure 400, with a width $W_E$ of the electrode layer being defined between the electrode current collector 114 and the separator as shown and as discussed elsewhere herein, where the spacer structure 400 is contained within the width $W_E$ of the electrode layer 116. The electrode layer 116 comprises top and bottom surfaces 119a, 119b, which in the embodiment as shown comprise the top and bottom ends of each of the spacer structure 400 in the height dimension (parallel to the Z axis), and define the height $H_E$ of the electrode layer 116. According to further embodiments, the population of spacer structures 400 can comprise a plurality of structures 400 disposed along the length $L_E$ and/or the height $H_E$, as shown for example in the embodiments depicted in FIGS. 8A, 8C, and 8E-8H, and/or can comprise one or more spacer structures 400 that extend substantially across the length $L_E$ and/or height $H_E$ of the electrode layer 116.

FIG. 6 depicts yet another embodiment of a unit cell with spacer structures 400, in a cross-section taken in a Y-X plane, and at a position in Z where spacer structures 400 can be seen, located at a periphery of the electrode layer 116 in the length direction, and extending from an interior surface 127 of the electrode active material layer 125. In this embodiment, the unit cell has a width $W_{UC}$ as measured between the unit cell portion of the electrode current collector 114 and the unit cell portion of the counter-electrode current collector 118 in the stacking direction (parallel to the Y axis). The cross-section of the electrode layer 116 comprises the spacer structures 400 on either side of an electrode active material layer 125, with a width $W_E$ of the electrode layer being defined between the electrode current collector 114 and the separator as shown and as discussed elsewhere herein, where the electrode active material layer 125, void space 126 and spacer structures 400 are contained within the width $W_E$ of the electrode layer 116. The electrode layer 116 comprises first and second end surfaces 121a, 121b, which in the embodiment as shown comprise the ends surfaces of the electrode active material layer 125 and adjoining spacer structures 400 in the length dimension (along the X axis), and define the length $L_E$ of the electrode layer 116 comprising the spacer structures 400 and electrode active material layer 116. In comparison to the embodiment as depicted in FIG. 5A, the spacer structures 400 as depicted in FIG. 6 extend only part of the way of the width $W_E$ of the electrode layer, from an interface with the separator. According to one embodiment, in the pre-formation stage, the spacer structures 400 extend from a surface 127 of the electrode active material layer 125 to the surface 131 of the separator layer 130. In the post-formation stage, in an embodiment where the electrode active material expands to at least partially fill the pre-formation void space 126, the spacer structures may extend from the surface 131a of the separator layer 130 at least partly through the electrode active material layer along the width dimension $W_E$. According to yet another embodiment, the spacer structures 400 may extend from the surface 115a of the electrode current collector 114 at least partly through the electrode active material layer along the width dimension $W_E$. According to one embodiment, members of the population of spacer structures extend across the entire width dimension $W_E$ of the electrode layer (100% of the width $W_E$), or even across at least 75%, at least 85%, and/or at least 90% of the width $W_E$ of the electrode layer, between the opposing surfaces of the electrode current collector and separator layer. According to another embodiment, a median extent of the spacer structures 400 into the electrode layer 116 may be less than 60%, less than 50%, less than 40%, less than 25% and/or less than 15% of the width $W_E$ of the electrode layer 116, for example as measured from the separator layer 130 towards the electrode current collector 114, or vice versa. In one embodiment, a median extent of members of the population of spacer structures in the electrode layer 116 may be at least 2%, at least 3% and/or at least 5% of the width $W_E$ of the electrode layer, for example as measured from the separator layer 130 towards the electrode current collector 114, or vice versa. According to another embodiment, the population of spacer structures can comprise a combination of spacer structures that extend entirely along the width dimension $W_E$ with those that extend only partly along with width dimension $W_E$ of the electrode layer 116 (e.g., a combination of spacer structures depicted in FIGS. 5A and 6). Other suitable spacer structure configurations and arrangements can also be provided.

Figure 7A:
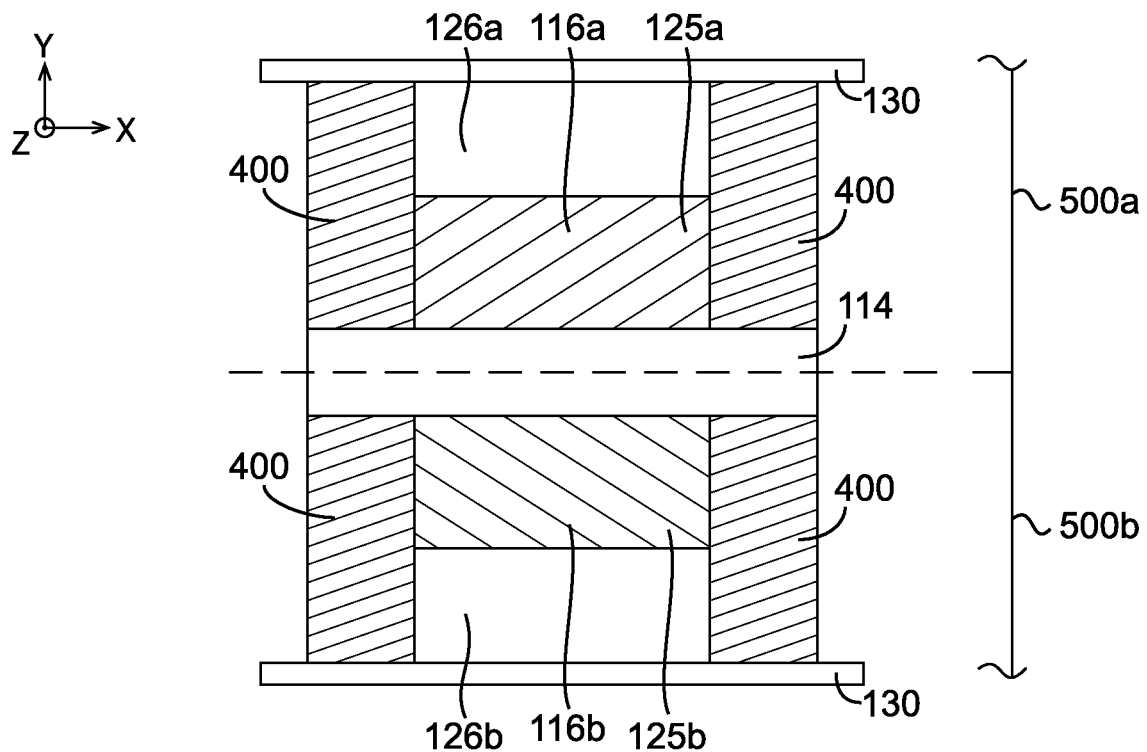
FIG. 7A is a cross-sectional view of another embodiment of structures for an electrode assembly including portions of first and second unit cells, as viewed in the Y-X plane, and including populations of spacer structures in the first and second electrode layers thereof.
Figure 7B:
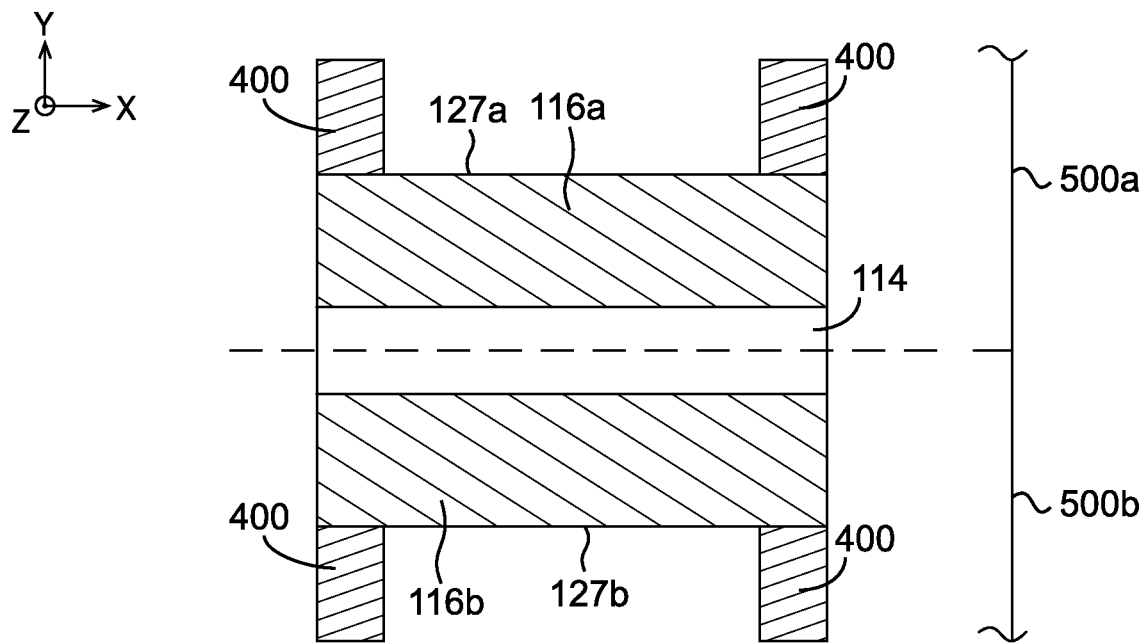
FIG. 7B is a cross-sectional view of another embodiment of structures for an electrode assembly including portions of first and second unit cells, as viewed in the Y-X plane, and including populations of spacer structures in the first and second electrode layers thereof.
Figure 7C:
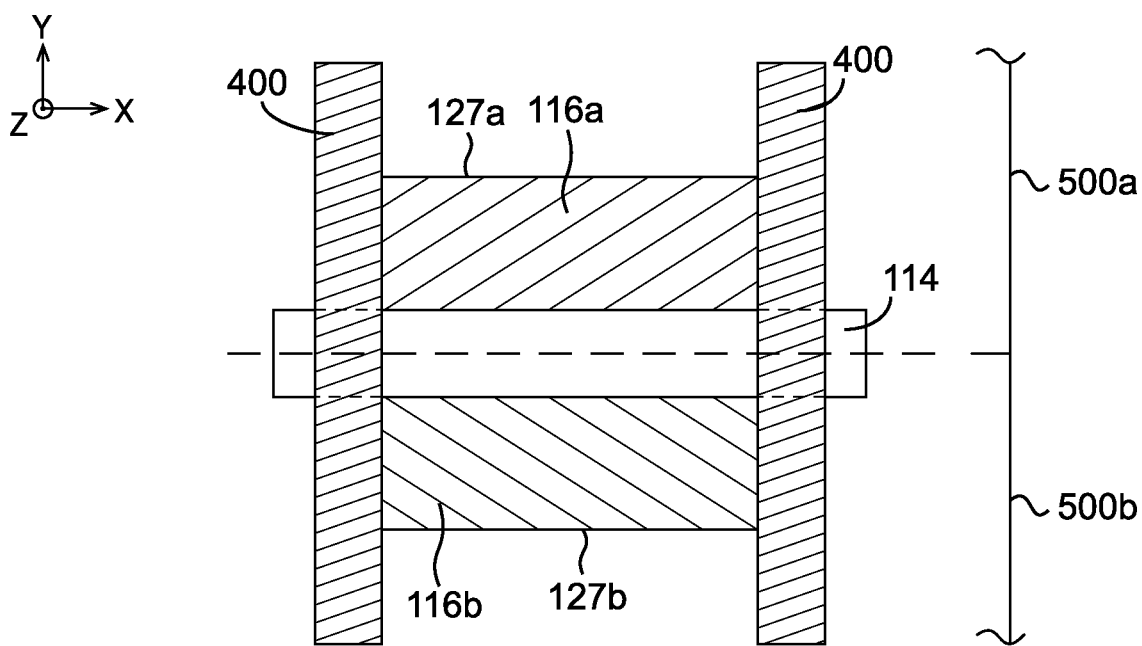
FIG. 7C is a cross-sectional view of another embodiment of structures for an electrode assembly including portions of first and second unit cells, as viewed in the Y-X plane, and including populations of spacer structures in the first and second electrode layers thereof and passing through a shared electrode current collector.

FIGS. 7A-7C depict further embodiments of spacer structures 400 suitable for use with an electrode assembly 106 for a secondary battery 102. In the embodiment shown in FIG. 7A, portions of two adjacent unit cells 500a, 500b are shown, which share a common electrode current collector 114. In the embodiment as shown, the electrode current collector 114 comprises a first electrode layer 116a disposed on a first side of the electrode current collector (in the first unit cell 500a), and a second electrode layer 116b on a second opposing side of the electrode current collector (in the second unit cell 500b). The first electrode layer 116 comprises a first layer of electrode active material layer 125a and a first void space 126a between the first layer of electrode active material 125a and the separator 130 for the first unit cell 500a, with spacer structures 400 extending from the first unit cell portion of the electrode current collector 114 and towards the separator in the stacking direction, and about a periphery of the first electrode active material layer 125a. The second electrode layer 116b comprises a second layer of electrode active material layer 125*b* and a second void space 126*b* between the second layer of electrode active material 125*b* and the separator 130 for the second unit cell 500*b*, with spacer structures 400 extending from the second unit cell portion of the electrode current collector 114 and towards the separator in the stacking direction, and about a periphery of the second electrode active material layer 125*b*. While the embodiment as shown depicts a pre-formation electrode assembly 106 have void spaces 126*a*, 126*b*, in embodiments of a post-formation electrode assembly, the electrode active material can be expanded towards the separator and may substantially fill the void spaces.

FIG. 7B similarly depicts an embodiment where adjacent unit cells 500*a*,500*b* share a common electrode current collector 114, with spacer structures 400 being provided in first and second electrode layers 116*a*, 116*b* of the adjacent unit cells 500*a*, 500*b*. The first electrode layer 116*a* comprises a first layer of electrode active material layer 125*a* and a first void space 126*a* between the first layer of electrode active material 125*a* and the separator 130 for the first unit cell 500*a*. Spacer structures 400 extend from a first interior surface 127*a* of the first electrode active material layer 125 and towards the separator in the stacking direction, and are located at peripheral edges of the first interior surface. The second electrode layer 116*b* comprises a second layer of electrode active material layer 125*b* and a second void space 126*b* between the second layer of electrode active material 125*b* and the separator 130 for the second unit cell 500*b*. Spacer structures 400 extend from a second interior surface 127*b* of the second electrode active material layer 125*b* and towards the separator 130 in the stacking direction, and are located at peripheral edges of the second interior surface 127*b*. According to the embodiment as shown, the spacer structures 400 extend only partly along the width $W_E$ of the electrode layer 116 from the separator 130 to the unit cell portion of the electrode current collector 114.

According to the embodiments as shown in FIGS. 7A and 7B, adjacent first and second unit cells 500*a*, 500*b* can comprise spacer structures 400 disposed in the first and second electrode layers 116*a*, 116*b* thereof, such as adjacent unit cells sharing an electrode current collector 114. Similarly, in a wound structure as shown in FIGS. 2A and 2B, the spacer structures 400 may be provided in adjacent winds of the electrode structure in the stacking direction R. However, in other embodiments, the spacer structures 400 may be provided in alternating unit cells (e.g., every other unit cell), or only in certain unit cells and/or certain unit cell stacked successions along the stacking direction of the electrode assembly. In yet a further embodiment, the spacer structures 400 may be disposed such that they are aligned with one another in the stacking direction. For example, in the embodiment shown in FIG. 7A, the spacer structures 400 are aligned such that the spacers in the first electrode layer 116*a* of the first unit cell 500*a* are aligned in the stacking direction (Y direction) with the spacers in the second electrode layer 116*b* of the second unit cell 500*b*. Such spacing may be advantageous, for example, to provide for substantially uniform void spaces in the unit cells along the stacking direction. Similarly, referring to FIG. 11A, the position of the spacers may be arranged such that at least some of the spacers are aligned with one another along the stacking direction R. Also, while the spacers 400 are illustrated in FIGS. 7A and 7B as being located towards a periphery of the electrode layer 116, the spacers may also be more centrally disposed in the electrode layer 116, and/or may located at the periphery and along an interior region of the electrode layer 116.

FIG. 7C illustrates yet another embodiment of adjacent first and second unit cells 500*a*, 500*b* having spacer structures 400 disposed in the electrode layers 116 thereof. The embodiment of FIG. 7C is similar to that of FIG. 7A, in that the first and second electrode layers 116*a*, 116*b* each comprise electrode active material layers 125*a*, 125*b* with peripherally located spacer structures 400, and the adjacent first and second unit cells 500 share the electrode current collector 400. However, in the embodiment as shown in FIG. 7C, the spacer structures 400 extend through apertures formed in the electrode current collector 114 that is shared by both unit cells 500*a*, 500*b*, such that the same population of spacer structures 400 extends into both the first and second unit cells 500*a*, 500*b*.

According to yet another embodiment, a population of spacer structures 400 may be provided as a part of both the electrode structure 110 as well as the counter-electrode structure 112 in an electrode assembly 106, such as by providing a population of spacer structures 400 in one or more electrode layers 116 as well as in one or more counter-electrode layers 118. For example, a first population of spacer structures 400 can be provided in an electrode layer 116 in the electrode assembly, and a second population of spacer structures 400 can be provided in a counter-electrode layer 120 of the electrode assembly, such layers of the same unit cells and/or in different unit cells in the electrode assembly. According to certain embodiments, the population of spacer structures 400 provided in the one or more counter-electrode layers 120 can be provided in a configuration and/or arrangement corresponding to any described elsewhere herein with respect to the electrode layer 116, such as for example in any of FIGS. 3A-3C, 4A-4C, 5A-5D, 6, 7A-7C, 8A-8H, 9-10 and 11A-11B. That is, an arrangement and/or configuration described elsewhere herein for the population of spacer structures 400 in the electrode layer 116 may, in certain embodiments, be suitable for a population of spacer structures in a counter-electrode layer, where the counter-electrode layer 120, a counter-electrode active material, and/or counter-electrode current collector 118 are substituted for the electrode layer 116, electrode active material, and/or electrode current collector 114 otherwise described herein.

In one embodiment, providing first and second populations of spacer structures in both the electrode layer and counter-electrode layer may be advantageous, for example, in a case where both electrode active material and counter electrode active material are subject to expansion and/or contraction, such as during a formation process and/or during cycling of a secondary battery comprising the electrode and counter-electrode active materials between charged and discharged states. According to one embodiment, the populations of spacer structures may be provided for a configuration comprising electrode active material that expands during charging of the secondary battery and counter-electrode active material that expands during discharging of the secondary battery, and/or both the electrode active material and counter-electrode active material may expand upon charging of the secondary battery, and/or may both expand discharging of the secondary battery. According to yet another embodiment, one or more of the electrode active material and/or counter-electrode active material may also contract upon charging and/or discharging of the secondary battery. In one embodiment, both the electrode active material and counter-electrode active material may expand and contract together (with the same or different magnitudes of expansion) during charging and/or discharging processes. In one embodiment, a population of spacer structures can be provided at an interface between the electrode layer and separator layer, and another population of spacer structures can be provided at an interface between the counter-electrode layer and separator layer, either in the same unit cell and/or in different unit cells, to accommodate expansion (and possibly contraction) that may occur in the electrode active material and counter-electrode active materials during a formation process, and/or during cycling of the secondary battery between a charged and discharged state.

Figure 8A:
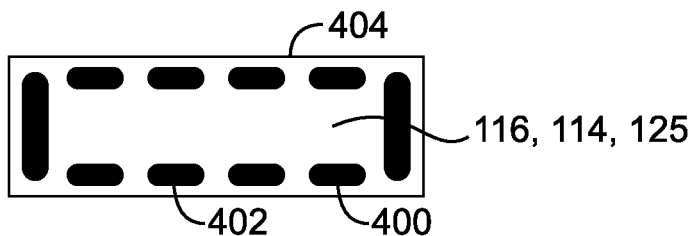
FIGS. 8A-8H are plan views of various embodiments of spacer structures formed on an electrode structure and/or spacer layer for an electrode assembly.
Figure 8B:
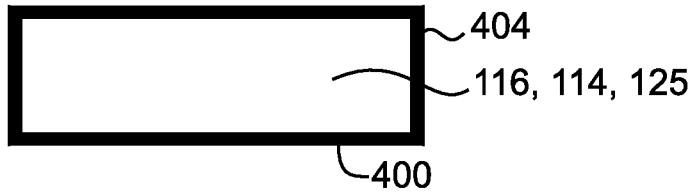

FIGS. 8A-8H depict further embodiments of populations of spacer structures 400 disposed in an electrode layer 116. As shown, the spacer structures 400 can comprise protrusions 402 that may be formed on the surface of an electrode structure, such as a surface of an electrode current collector 114 and/or electrode active material layer 125, and may take a variety of shapes and forms. According to yet another embodiment, the spacer structures 400 can be formed on a surface of one or more of a separator layer 130 and electrode current collector layer 114, as in any of the configurations shown in FIGS. 8A-8H, and then joined to form the unit cells 500 having the electrode layer during assembly of the electrode assembly. In one embodiment, as shown in FIG. 8A, the spacer structures comprise a series of raised bumps positioned about a periphery 404 of the electrode layer 116. By providing the protrusions and/or bumps about the periphery 400, in certain embodiments the structure may stabilize the layers about the void spaces, so that the separator layer and electrode layer 116 remain spaced apart from one another, for example substantially without bending or deformation of the layers into the void space. In the embodiment shown in FIG. 8B, the population of spacer structures comprise a single raised ridge about a periphery 400 of the electrode layer 116.

Figure 8C:
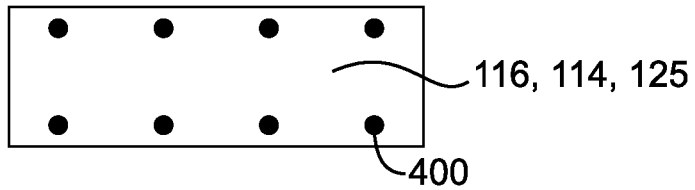

In a further embodiment, as shown in FIG. 8C, the population of spacer structures 400 may comprise a plurality of columns or other raised features that are distributed across different points on the surface of the electrode layer 116. By distributing the protrusions across the surface, bending and/or deformation of the layer 116 having the protrusions may be inhibited, as the protrusions may contact the adjacent layer (i.e., the separator layer 130), to maintain a separation between the layers, even under the pressures of stacking of the electrode layers when placed in the stacked succession.

Figure 8D:
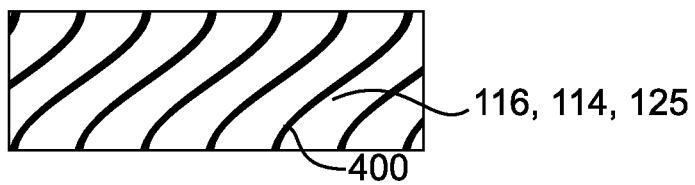
Figure 8E:
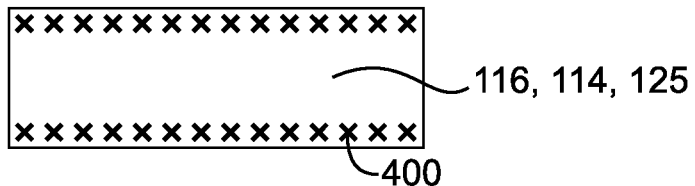
Figure 8F:
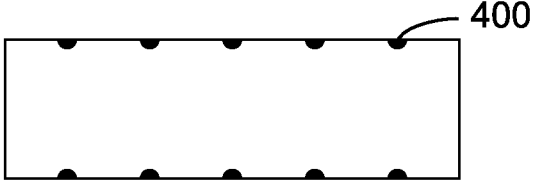
Figure 8G:
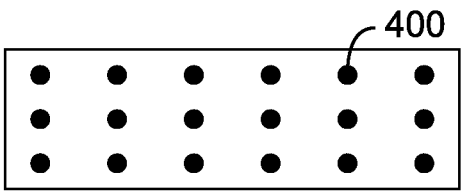
Figure 8H:
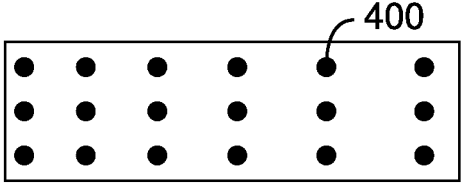

Further embodiments are shown in FIGS. 8D and 8E, which show a population of spacer structures comprising a series of ridges formed on the surface of the layer and extending diagonally across one or more dimensions of the layer (8D), such as across a height and a length of the layer, and a series of cross-shaped protrusions formed about a periphery 404 of the electrode layer 116. FIG. 8F further depicts an embodiment in which the population of spacer structures 400 comprise a series of protrusions distributed about the periphery 404 of the electrode layer 116, and specifically located at the edges of the electrode layer in the height direction (Z dimension). FIGS. 8G and 8H depict further embodiments of the distribution and configuration of the plurality of spacer structures, one in which the spacing between spacer structures decreases along the height direction (Z dimension) of the electrode layer 116 (FIG. 8H), and one in which the spacing between spacer structures is uniform along the height direction (Z dimension) (FIG. 8G).

According to certain embodiments, the distance between spacer structures may be increased and/or decreased along one or more dimensions of the electrode layer 116, and/or may be increased and/or decreased between unit cells and/or winds in a wound electrode. For example, referring to the spiral wound battery embodiments depicted in FIGS. 11A and 11B, in one embodiment, the spacing between the spacer structures increases along the length $L_E$ of the electrode from the interior region of the electrode assembly to the exterior region, such that spacer structures in adjacent winds of the electrode assembly can be aligned with one another in the stacking direction R. That is, the spacing between spacing structures may increase as a function of increasing R, to provide spacers structures that are aligned with one another in the stacking direction R. In one embodiment, members of the population of spacer structures 400 are aligned such that spacer structures 40 disposed in interior winds 205a of the unit cell are aligned in the stacking direction with spacer structures 400 in outer winds 205b of the unit cell. FIG. 11C depicts yet another embodiment of a wound electrode assembly 106, in which the winds 205 comprise rectilinear edges along the wound path 208 of the electrode layer 116.

According to one embodiment, the electrode assembly 106 having the population of spacers 400 in the electrode layer 116 is one that is suitable for use in the secondary battery for cycling between the charged and discharged state. According to certain embodiments, the electrode assembly having the population of spacers may be in the pre-formation stage prior to performing a formation process, as discussed elsewhere herein. That is, the electrode assembly 106 may be one that is suitable for incorporation into a storage device, such as a secondary battery, and subjected to a formation process. Embodiments herein may also contemplate the electrode assembly 106 in a post-formation stage, such as in a case where the electrode assembly forms a part of a secondary battery or other storage device that has been subjected to a formation process.

According to one embodiment, a method of formation of the secondary battery for cycling between the charged and the discharged state comprises providing the electrode assembly, carrier ions and a non-aqueous liquid electrolyte within a battery enclosure, and performing a formation process involving charging of the secondary battery from a discharged to a charged state. In one embodiment, the formation process can be performed to increase the volume of the solid electrode active material in the electrode layer, such that the volume post-formation is at least 3%, at least 5%, at least 10%, at least 25%, at least 50%, at least 75% and/or at least 100% greater than the first volume of the solid electrode active material in the electrode layer. Furthermore, the increase in volume of the solid electrode active material can occur while a change in the unit cell width $W_{UC}$ that is exhibited post formation as compared to the unit cell width $W_{UC}$ pre-formation may, in some embodiments, be less than 1%, less than 0.5%, less than 0.25% and/or less than 0.1%, and/or the unit cell width $W_{UC}$ both pre and post-formation may be substantially the same, such that the width of the unit cell 500 substantially does not change during the formation process.

According to certain embodiments, the formation process can comprise at least one initial charging cycle of the secondary battery 102, which may be performed under carefully controlled conditions including one or more of current, temperature and duration, to promote the formation of the desired structure and contact between components of the secondary battery 102, such as the desired structure and contact between the structures in the unit cells 500. Generally speaking, the formation process may involve one or more initial charging steps that are performed under conditions that re-arrange and/or optimize internal structures and morphologies, such that the secondary battery can be charged up to its rated capacity. The formation process can comprise only a single initial charging cycle, or may comprise a plurality of charging cycles, as described elsewhere herein, according to the particular battery structure and composition, and can be performed as a final stage in manufacturing of the secondary battery to bring the secondary battery 102 to its full power and/or capacity.

In one embodiment, referring to FIG. 3C, a set of electrode constraints 602 are provided to constrain growth of the electrode assembly in the stacking direction and/or maintain alignment of the population of unit cells in the electrode assembly, during the formation process. For example, the set of electrode constraints 602 can comprise first and second constraint members 600a, 600b that are spaced apart along the stacking direction (the Y direction in FIG. 3C), and which may be capable of maintaining an alignment of structures in the electrode assembly in the stacking direction during the formation process, and optionally post-formation. In one embodiment, growth and/or swelling of the electrode active material in the electrode layers 116 can exert a pressure in the stacking direction, and/or can cause the unit cells 500 to come out of alignment with one another. Accordingly, by providing the set of electrode constraints 602, the alignment of the structures in each of the unit cells can be maintained, such that the void space 126 in the unit cells can be effectively utilized to allow the electrode active material to expand therein.

In one embodiment, the set of electrode constraints 602 comprises first and second constraint members 600a, 600b that are spaced apart from one another along the stacking direction, as shown in FIG. 3C. In another embodiment, the set of electrode constraints comprises first and second constraint members 600a, 600b that are spaced apart from each other along another direction that is orthogonal to the stacking direction, such as along one or more of the X direction or Z direction, to constrain in one or more of the X and Z directions, and/or a combination of constraints that constrain along the stacking direction, along with one or more constraints that constrain along a direction orthogonal to the stacking direction, may also be provided. According to one embodiment of a prismatic electrode assembly, the first and second constraint members may be spaced apart along the Y direction corresponding to the stacking direction, as shown in FIG. 3C. According to another embodiment of a wound electrode assembly, the set of constraints 602 may be configured to constrain along the stacking direction R, such as by providing a cylindrical constraint member and/or one or more segments of a cylindrical constraint that extend about the external circumference of the wound electrode assembly. For example the set of constraints for a wound electrode assembly may be a can or other enclosure 104 for the electrode assembly.

In one embodiment, the set of electrode constraints are provided within the battery enclosure 104 (not shown). In another embodiment, the set of electrode constraints 602 are provided outside the battery enclosure (as shown in FIG. 3C). The battery enclosure 104 may be a sealed enclosure that seals the electrolyte used in the secondary battery therein. In a further embodiment, the set of electrode constraints 602 are provided prior to and/or during the formation process, and can be removed from the electrode assembly 106 following formation. According to yet another embodiment, the set of electrode constraints 602 can be provided prior to and/or during the formation process, and are kept as a part of the secondary battery post-formation, such as for example to resist growth and/or swelling of electrode active material during normal cycling of the secondary battery. Without limitation thereto, embodiments of suitable electrode constraints that can be provided to constrain the electrode assembly 106, before, during and/or after a formation process, are described for example in U.S. Pat. No. 10,283,807 to Busacca et al., issued on May 7, 2019, and U.S. Pat. No. 10,177,400 to Busacca et al., issued on Jan. 8, 2019, both of which are incorporated by reference herein in their entireties.

According to one embodiment, at least a portion and even entirely all of the population of spacer structures 400 may no longer be present following the formation process, for example as the spacer structures 400 may blend into the electrode active material in the post-formation stage. Furthermore, according to certain embodiments, the population of spacer structures may merge into the electrode active material layer 125 in the post-formation stage, for example such that the electrode active material layer 125 takes up substantially the entire volume of the post-formation electrode layer. For example, in a case where the spacer structures comprise lithium spacer structures are used in a pre-formation stage, for a secondary battery comprising a lithium electrode, the formation process results in growth of lithium-containing electrode active material such that an interface between the lithium spacer structures and the remainder of the electrode layer may not be discernible in the post-formation stage. According to yet another embodiment, the population of spacers may chemically react following fill of electrolyte into the electrode assembly prior to formation, such that at least a portion and/or all of the population of spacers are no longer discernible post-formation. According to yet another embodiment, at least a portion and/or all of the population of spacers may be removed after assembly of the electrode assembly 106 (e.g., after stacking of the unit cells 500), and either before, during or after a formation process, for example in a case where another method of maintaining the void spaces 126 in the unit cells 500 is provided.

According to various embodiments, the spacer structures 400 may be formed by a variety of different methods. For example, in one embodiment, the spacer structures 400 can be formed by printing spacer materials onto the electrode structure 110 (e.g. electrode current collector and/or electrode active material layer) and/or separator layer, such as by screen printing, stencil printing, inkjet printing, gravimetric printing, and other methods. According to yet another embodiment, the spacer structures can be fabricated by a vapor deposition method, using a shadow mask. According to yet another embodiment, the spacer structures can be fabricated by mechanical interference fitting of pins comprising the spacer materials into the electrode structure 110 and/or separator layer 130. According to yet another embodiment, the spacer structures can be fabricated by co-molding with one or more portions of the separator layer 130 and/or electrode structure 110. According to yet another embodiment, the spacer structures can be fabricated by laying an open mesh between the electrode structure 110 and separator 130 during assembly of the unit cells 500. According to yet another embodiment, the spacer structures can be fabricated by laying wires on top of the electrode structure 110 with glue and pressing to the desired height above the electrode structure. According to certain embodiments, the population of spacer structures 400 can be deposited or otherwise formed simultaneously with the electrode active material of the electrode active material layer 125. For example, in a case where the electrode active material is deposited or otherwise formed on a surface of the electrode current collector 114, the population of spacer materials may be similarly deposited or otherwise formed as a part of this electrode active material layer formation process. According to yet another embodiment, the population of spacer structures can deposited before and/or after an electrode active material has already been deposited or otherwise formed on the electrode current collector 114. According to yet another embodiment, the population of spacer structures can at least partially deposited and/or formed during the electrode active material layer deposition/formation process, and can be completed after the electrode active material layer formation is completed. According to another embodiment, the population of spacer structures can be formed as an additive or subtractive process before and/or after an electrode active material layer is formed. Other methods of fabricating the spacer structures, and/or combinations of the fabrications methods may also be provided.

Furthermore, as used herein, for each embodiment that describes a material or structure using the term "electrode" such as an "electrode structure" or "electrode active material," it is to be understood that such structure and/or material may in certain embodiments correspond that of a "negative electrode", such as a "negative electrode structure" or "negative electrode active material." Similarly, as used herein, for each embodiment that describes a material or structure using the term "counter-electrode" such as a "counter-electrode structure" or "counter-electrode active material," it is to be understood that such structure and/or material may in certain embodiments correspond to that of a "positive electrode," such as a "positive electrode structure" or "positive electrode active material." That is, where suitable, any embodiments described for an electrode and/or counter-electrode may correspond to the same embodiments where the electrode and/or counter-electrode are specifically a negative electrode and/or positive electrode, including their corresponding structures and materials, respectively.

Other Battery Components

Members of the electrode 110 and counter-electrode 112 populations include an electroactive material capable of absorbing and releasing a carrier ion such as lithium, sodium, potassium, calcium, magnesium or aluminum ions. In some embodiments, members of the electrode structure 110 population include an anodically active electroactive material (sometimes referred to as a negative electrode) and members of the counter-electrode structure 112 population include a cathodically active electroactive material (sometimes referred to as a positive electrode). In other embodiments, members of the electrode structure 110 population include a cathodically active electroactive material and members of the counter-electrode structure 112 population comprise an anodically active electroactive material. For example, negative electrode active material may be, for example, a particulate agglomerate electrode, an electrode active material formed from a particulate material, such as by forming a slurry of the particulate material and casting into a layer shape, or a monolithic electrode.

Exemplary anodically active electroactive materials include carbon materials such as graphite and soft or hard carbons, or any of a range of metals, semi-metals, alloys, oxides and compounds capable of forming an alloy with lithium. Specific examples of the metals or semi-metals capable of constituting the anode material include graphite, tin, lead, magnesium, aluminum, boron, gallium, silicon, Si/C composites, Si/graphite blends, SiOx, porous Si, intermetallic Si alloys, indium, zirconium, germanium, bismuth, cadmium, antimony, silver, zinc, arsenic, hafnium, yttrium, lithium, sodium, graphite, carbon, lithium titanate, palladium, and mixtures thereof. In one exemplary embodiment, the anodically active material comprises aluminum, tin, or silicon, or an oxide thereof, a nitride thereof, a fluoride thereof, or other alloy thereof. In another exemplary embodiment, the anodically active material comprises silicon, silicon oxide, or an alloy thereof.

In yet further embodiments, anodically active material can comprise lithium metals, lithium alloys, carbon, petroleum cokes, activated carbon, graphite, silicon compounds, tin compounds, and alloys thereof. In one embodiment, the anodically active material comprises carbon such as non-graphitizable carbon, graphite-based carbon, etc.; a metal complex oxide such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, elements found in Group 1, Group 2 and Group 3 in a periodic table, halogen; $0 < x \leq 1$; $1 \leq y \leq 3$; $1 \leq z \leq 8$), etc.; a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, etc.; a conductive polymer such as polyacetylene, etc.; Li—Co—Ni-based material, etc. In one embodiment, the anodically active material can comprise carbon-based active material include crystalline graphite such as natural graphite, synthetic graphite and the like, and amorphous carbon such as soft carbon, hard carbon and the like. Other examples of carbon material suitable for anodically active material can comprise graphite, Kish graphite, pyrolytic carbon, mesophase pitch-based carbon fibers, meso-carbon microbeads, mesophase pitches, graphitized carbon fiber, and high-temperature sintered carbon such as petroleum or coal tar pitch derived cokes. In one embodiment, the negative electrode active material may comprise tin oxide, titanium nitrate and silicon. In another embodiment, the negative electrode can comprise lithium metal, such as a lithium metal film, or lithium alloy, such as an alloy of lithium and one or more types of metals selected from the group consisting of Na, K, Rb, Cs, Fr, Be, Mg, Ca, Sr, Ba, Ra, Al and Sn. In yet another embodiment, the anodically active material can comprise a metal compound capable of alloying and/or intercalating with lithium, such as Si, Al, C, Pt, Sn, Pb, Ir, Ni, Cu, Ti, Na, K, Rb, Cs, Fr, Be, Ca, Sr, Sb, Ba, Ra, Ge, Zn, Bi, In, Mg, Ga, Cd, a Si alloy, a Sn alloy, an Al alloy or the like; a metal oxide capable of doping and dedoping lithium ions such as $SiO_v$ ($0 < v < 2$), $SnO_2$, vanadium oxide or lithium vanadium oxide; and a composite including the metal compound and the carbon material such as a Si—C composite or a Sn—C composite. For example, in one embodiment, the material capable of alloying/intercalating with lithium may be a metal, such as lithium, indium, tin, aluminum, or silicon, or an alloy thereof; a transition metal oxide, such as $Li_4/3Ti_5/3O_4$ or SnO; and a carbonaceous material, such as artificial graphite, graphite carbon fiber, resin calcination carbon, thermal decomposition vapor growth carbon, corks, mesocarbon microbeads ("MCMB"), furfuryl alcohol resin calcination carbon, polyacene, pitch-based carbon fiber, vapor growth carbon fiber, or natural graphite. In yet another embodiment, the negative electrode active material can comprise a composition suitable for a carrier ion such as sodium or magnesium. For example, in one embodiment, the negative electrode active material can comprise a layered carbonaceous material; and a composition of the formula $Na_xSn_{y-z}M_z$ disposed between layers of the layered carbonaceous material, wherein M is Ti, K, Ge, P, or a combination thereof, and $0 < x \leq 15$, $1 \leq y \leq 5$, and $0 \leq z \leq 1$.

In one embodiment, the negative electrode active material may further comprise a conductive material and/or conductive aid, such as carbon-based materials, carbon black, graphite, graphene, active carbon, carbon fiber, carbon black such as acetylene black, Ketjen black, channel black, furnace black, lamp black, thermal black or the like; a conductive fiber such as carbon fiber, metallic fiber or the like; a conductive tube such as carbon nanotubes or the like; metallic powder such as carbon fluoride powder, aluminum powder, nickel powder or the like; a conductive whisker such as zinc oxide, potassium titanate or the like; a conductive metal oxide such as titanium oxide or the like; or a conductive material such as a polyphenylene derivative or the like. In addition, metallic fibers such as metal mesh; metallic powders such as copper, silver, nickel and aluminum; or organic conductive materials such as polyphenylene derivatives may also be used. In yet another embodiment, a binder may be provided, such as for example one or more of polyethylene, polyethylene oxide, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinyl ether-tetrafluoroethylene copolymer, an ethylene-acrylic acid copolymer and the like may be used either alone or as a mixture.

Exemplary cathodically active materials include any of a wide range of cathode active materials. For example, for a lithium-ion battery, the cathodically active material may comprise a cathode material selected from transition metal oxides, transition metal sulfides, transition metal nitrides, lithium-transition metal oxides, lithium-transition metal sulfides, and lithium-transition metal nitrides may be selectively used. The transition metal elements of these transition metal oxides, transition metal sulfides, and transition metal nitrides can include metal elements having a d-shell or f-shell. Specific examples of such metal element are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pb, Pt, Cu, Ag, and Au. Additional cathode active materials include $LiCoO_2$, $LiNi_{0.5}Mn_{1.5}O_4$, $Li(Ni_xCo_yAl_z)O_2$, $LiFePO_4$, $Li_2MnO_4$, $V_2O_5$, molybdenum oxysulfides, phosphates, silicates, vanadates, sulfur, sulfur compounds, oxygen (air), $Li(Ni_xMn_y\text{-}Co_z)O_2$, and combinations thereof. Furthermore, compounds for the cathodically active material layers can comprise lithium-containing compounds further comprising metal oxides or metal phosphates such as compounds comprising lithium, cobalt and oxygen (e.g., $LiCoO_2$), compounds comprising lithium, manganese and oxygen (e.g., $LiMn_2O_4$) and compound comprising lithium iron and phosphate (e.g., LiFePO). In one embodiment, the cathodically active material comprises at least one of lithium manganese oxide, lithium cobalt oxide, lithium nickel oxide, lithium iron phosphate, or a complex oxide formed from a combination of aforesaid oxides. In another embodiment, the cathodically active material can comprise one or more of lithium cobalt oxide ($LiCoO_2$), lithium nickel oxide ($LiNiO_2$), etc. or a substituted compound with one or more transition metals; lithium manganese oxide such as $Li_{1-x}Mn_{2-x}O_4$ (where, x is 0 to 0.33), $LiMnO_3$, $LiMn_2O_3$, $LiMnO_2$, etc.; lithium copper oxide ($Li_2CuO_2$); vanadium oxide such as $LiV_3O_8$, $LiFe_3O_4$, $V_2O_5$, $Cu_2V_2O_7$ etc.; Ni site-type lithium nickel oxide represented by the chemical formula of $LiNi_{1-x}M_xO_2$ (where, M=Co, Mn, Al, Cu, Fe, Mg, B or Ga, and x=0.01 to 0.3); lithium manganese complex oxide represented by the chemical formula of $LiMn_{2-x}M_xO_2$ (where, M=Co, Ni, Fe, Cr, Zn or Ta, and x=0.01 to 0.1) or $Li_2Mn_3MO_8$ (where, M=Fe, Co, Ni, Cu or Zn), $LiMn_2O_4$ in which a portion of Li is substituted with alkaline earth metal ions; a disulfide compound; $Fe_2(MoO_4)_3$, and the like. In one embodiment, the cathodically active material can comprise a lithium metal phosphate having an olivine crystal structure of Formula 2: $Li_{1+a}Fe_{1-x}M'_x(PO_{4-b})X_b$ wherein M' is at least one selected from Al, Mg, Ni, Co, Mn, Ti, Ga, Cu, V, Nb, Zr, Ce, In, Zn, and Y, X is at least one selected from F, S, and N, $-0.5 \le a \le +0.5$, $0 \le x \le 0.5$, and $0 \le b \le 0.1$, such at least one of $LiFePO_4$, $Li(Fe, Mn)PO_4$, $Li(Fe, Co)PO_4$, $Li(Fe, Ni)PO_4$, or the like. In one embodiment, the cathodically active material comprises at least one of $LiCoO_2$, $LiNiO_2$, $LiMnO_2$, $LiMn_2O_4$, $LiNi_{1-y}Co_yO_2$, $LiCo_{1-y}Mn_yO_2$, $LiNi_{1-y}Mn_yO_2$ ($0 \le y \le 1$), $Li(Ni_aCo_bMn_c)O_4$ ($0<a<2$, $0<b<2$, $0<c<2$, and $a+b+c=2$), $LiMn_{2-z}Ni_zO_4$, $LiMn_{2-z}Co_zO_4$ ($0<z<2$), $LiCoPO_4$ and $LiFePO_4$, or a mixture of two or more thereof.

In yet another embodiment, a cathodically active material can comprise elemental sulfur (S8), sulfur series compounds or mixtures thereof. The sulfur series compound may specifically be $Li_2S_n$ ($n \ge 1$), an organosulfur compound, a carbon-sulfur polymer (($C_2S_x)_n$: x=2.5 to 50, $n \ge 2$) or the like. In yet another embodiment, the cathodically active material can comprise an oxide of lithium and zirconium.

In yet another embodiment, the cathodically active material can comprise at least one composite oxide of lithium and metal, such as cobalt, manganese, nickel, or a combination thereof, may be used, and examples thereof are $Li_aA_{1-b}M_bD_2$ (wherein, $0.90 \le a \le 1$, and $0 \le b \le 0.5$), $Li_aE_{1-b}M_bO_{2-c}D_c$ (wherein, $0.90 \le a \le 1$, $0 \le b \le 0.5$, and $0 \le c \le 0.05$), $LiE_{2-b}M_bO_{4-c}D_c$ (wherein, $0 \le b \le 0.5$, and $0 \le c \le 0.05$), $Li_aNi_{1-b-c}Co_bM_cD_a$ (wherein, $0.90 \le a \le 1$, $0 \le b \le 0.5$, $0 \le c \le 0.05$, and $0<a \le 2$); $Li_aNi_{1-b-c}Co_bM_cO_{2-a}X_a$ (wherein, $0.90 \le a \le 1$, $0 \le b \le 0.5$, $0 \le c \le 0.05$, and $0<a<2$); $Li_aNi_{1-b-c}Co_bM_cO_{2-a}X_2$ (wherein, $0.90 \le a \le 1$, $0 \le b \le 0.5$, $0 \le c \le 0.05$, and $0<a<2$); $Li_aNi_{1-b-c}Mn_bM_cD_a$ (wherein, $0.90 \le a \le 1$, $0 \le b \le 0.5$, $0 \le c \le 0.05$, and $0<a \le 2$), $Li_aNi_{1-b-c}Mn_bM_cO_{2-a}X_a$ (wherein, $0.90 \le a \le 1$, $0 \le c \le 0.05$, and $0<a<2$); $Li_aNi_{1-b-c}Mn_bM_cO_{2-a}X_2$ (wherein, $0.90 \le a \le 1$, $0 \le b \le 0.5$, $0 \le c \le 0.05$, and $0<a<2$); $Li_aNi_bE_cG_dO_2$ (wherein, $0.90 \le a \le 1$, $0 \le b \le 0.9$, $0 \le c \le 0.5$, and $0.001 \le d \le 0.1$), $Li_aNi_bCo_cMn_dGeO_2$ (wherein, $0.90 \le a \le 1$, $0 \le b \le 0.9$, $0 \le c \le 0.5$, $0 \le d \le 0.5$, and $0.001 \le e \le 0.1$); $Li_aNiG_bO_2$ (wherein, $0.90 \le a \le 1$ and $0.001 \le b \le 0.1$), $Li_aCoG_bO_2$ (wherein, $0.90 \le a \le 1$ and $0.001 \le b \le 0.1$), $Li_aMnG_bO_2$ (wherein, $0.90 \le a \le 1$ and $0.001 \le b \le 0.1$), $Li_aMn_2G_bO_4$ (wherein, $0.90 \le a \le 1$ and $0.001 \le b \le 0.1$), $QO_2$, $QS_2$; $LiQS_2$; $V_2O_5$, $LiV_2O_5$; $LiX'O_2$, $LiNiVO_4$; $Li_{(3-f)}J_2(PO_4)_3$ ($0 \le f \le 2$), $Li_{(3-f)}Fe_2(PO_4)_3$ ($0 \le f \le 2$), and $LiFePO_4$. In the formulas above, A is Ni, Co, Mn, or a combination thereof; M is Al, Ni, Co, Mn, Cr, Fe, Mg, Sr, V, a rare-earth element, or a combination thereof; D is O, F, S, P, or a combination thereof; E is Co, Mn, or a combination thereof; X is F, S, P, or a combination thereof; G is Al, Cr, Mn, Fe, Mg, La, Ce, Sr, V, or a combination thereof; Q is Ti, Mo, Mn, or a combination thereof; X' is Cr, V, Fe, Sc, Y, or a combination thereof; and J is V, Cr, Mn, Co, Ni, Cu, or a combination thereof. For example, $LiCOO_2$, $LiMn_xO_{2x}$ (x=1 or 2), $LiNi_{1-x}Mn_xO_{2x}$ ($0<x<1$), $LiNi_{1-x-y}Co_xMn_yO_2$ ($0 \le x \le 0.5$, $0 \le y \le 0.5$), or $FePO_4$ may be used. In one embodiment, the cathodically active material comprises at least one of a lithium compound such as lithium cobalt oxide, lithium nickel oxide, lithium nickel cobalt oxide, lithium nickel cobalt aluminum oxide, lithium nickel cobalt manganese oxide, lithium manganese oxide, or lithium iron phosphate; nickel sulfide; copper sulfide; sulfur; iron oxide; or vanadium oxide.

In one embodiment, the cathodically active material can comprise a sodium containing material, such as at least one of an oxide of the formula $NaM^1_aO_2$ such as $NaFeO_2$, $NaMnO_2$, $NaNiO_2$, or $NaCoO_2$, or an oxide represented by the formula $NaMn_{1-a}M^1_aO_2$, wherein $M^1$ is at least one transition metal element, and $0 \le a < 1$. Representative positive active materials include $Na[Ni_{1/2}Mn_{1/2}]O_2$, $Na_{2/3}[Fe_{1/2}Mn_{1/2}]O_2$, and the like; an oxide represented by $Na_{0.44}Mn_{1-a}M^1_aO_2$, an oxide represented by $Na_{0.7}Mn_{1-a}M^1_aO_{2.05}$ an (wherein $M^1$ is at least one transition metal element, and $0 \le a < 1$), an oxide represented by $Na_bM^2_cSi_{12}O_{30}$ as $Na_6Fe_2Si_{12}O_{30}$ or $Na_2Fe_5Si_{12}O$ (wherein $M^2$ is at least one transition metal element, $2 \le b \le 6$, and $2 \le c \le 5$), an oxide represented by $Na_dM^3_eSi_6O_{18}$ such as $Na_2Fe_2Si_6O_{18}$ or $Na_2MnFeSi_6O_{18}$ (wherein $M^3$ is at least one transition metal element, $3 \le d \le 6$, and $1 \le e \le 2$); an oxide represented by $Na_fM^4_gSi_2O_6$ such as $Na_2FeSiO_6$ (wherein $M^4$ is at least one element selected from transition metal elements, magnesium (Mg) and aluminum (Al), $1 \le f \le 2$ and $1 \le g \le 2$), a phosphate such as $NaFePO_4$, $Na_3Fe_2(PO_4)_3$, $Na_3V_2(PO_4)_3$, $Na_4Co_3(PO_4)_2P_2O_7$ and the like; a borate such as $NaFeBO_4$ or $Na_3Fe_2(BO_4)_3$, a fluoride represented by $Na_hM^5F_6$ such as $Na_3FeF_6$ or $Na_2MnF_6$ (wherein $M^5$ is at least one transition metal element, and $2 \le h \le 3$), a fluorophosphate such as $Na_3V_2(PO_4)_2F_3$, $Na_3V_2(PO_4)_2FO_2$ and the like. The positive active material is not limited to the foregoing and any suitable positive active material that is used in the art can be used. In an embodiment, the positive active material preferably comprises a layered-type oxide cathode material such as $NaMnO_2$, $Na[Ni_{1/2}Mn_{1/2}]O_2$ and $Na_{2/3}[Fe_{1/2}Mns_{1/2}]O_2$, a phosphate cathode such as $Na_3V_2(PO_4)_3$ and $Na_4Co_3(PO_4)_2P_2O_7$, or a fluorophosphate cathode such as $Na_3V_2(PO_4)_2F_3$ and $Na_3V_2(PO_4)_2FO_2$.

In yet another embodiment, the cathodically active material can further comprise one or more of a conductive aid and/or binder, which for example may be any of the conductive aids and/or binders described for the anodically active material herein.

In one embodiment, the electrode current collector 114 can comprise a suitable conductive material, such as a metal material. The electrode current collector 114 can be a negative electrode current collector, and/or may be a positive electrode current collector, according to embodiments herein. According to one embodiment, the electrode current collector is a negative electrode current collector. In one embodiment, the electrode current collector can comprise at least one of copper, nickel, aluminum, stainless steel, titanium, palladium, baked carbon, calcined carbon, indium, iron, magnesium, cobalt, germanium, lithium a surface treated material of copper or stainless steel with carbon, nickel, titanium, silver, an aluminum-cadmium alloy, and/or other alloys thereof. As another example, in one embodiment, the electrode current collector comprises at least one of copper, stainless steel, aluminum, nickel, titanium, baked carbon, a surface treated material of copper or stainless steel with carbon, nickel, titanium, silver, an aluminum-cadmium alloy, and/or other alloys thereof. In one embodiment, the electrode current collector comprises at least one of copper and stainless steel.

In one embodiment, the counter-electrode current collector 118 can comprise a suitable conductive material, such as a metal material. The counter-electrode current collector 114 can be a negative electrode current collector, and/or may be a positive electrode current collector, according to embodiments herein. According to one embodiment, the counter-electrode current collector is a positive electrode current collector. In one embodiment, the counter-electrode current collector comprises at least one of stainless steel, aluminum, nickel, titanium, baked carbon, sintered carbon, a surface treated material of aluminum or stainless steel with carbon, nickel, titanium, silver, and/or an alloy thereof. In one embodiment, the counter-electrode current collector comprises aluminum.

In one embodiment, the anodically active material is microstructured to provide a significant void volume fraction to accommodate volume expansion and contraction as lithium ions (or other carrier ions) are incorporated into or leave the anodically active material during charging and discharging processes. In general, the void volume fraction of the anodically active material is at least 0.1. Typically, however, the void volume fraction of the anodically active material is not greater than 0.8. For example, in one embodiment, the void volume fraction of the negative electrode active material is about 0.15 to about 0.75. By way of the further example, in one embodiment, the void volume fraction of the anodically active material is about 0.2 to about 0.7. By way of the further example, in one embodiment, the void volume fraction of the anodically active material is about 0.25 to about 0.6.

In one embodiment, anodically active material comprises porous aluminum, tin or silicon or an alloy thereof, such as for example in the form of electrode active layers 125 comprising the porous anodically active material. Porous silicon layers may be formed, for example, by anodization, by etching (e.g., by depositing precious metals such as gold, platinum, silver or gold/palladium on the surface of single crystal silicon and etching the surface with a mixture of hydrofluoric acid and hydrogen peroxide), or by other methods known in the art such as patterned chemical etching. Additionally, the porous anodically active material will generally have a porosity fraction of at least about 0.1, but less than 0.8 and have a thickness of about 1 to about 100 micrometers. For example, in one embodiment, electrode active material layers 125 comprise anodically active material comprising porous silicon, have a thickness ($W_E$) of about 5 to about 100 micrometers, and have a porosity fraction of about 0.15 to about 0.75. By way of further example, in one embodiment, electrode active material layers 125 comprise anodically active material comprising porous silicon, have a thickness ($W_E$) of about 10 to about 80 micrometers, and have a porosity fraction of about 0.15 to about 0.7. By way of further example, in one such embodiment, electrode active material layers 125 comprise porous silicon, have a thickness ($W_E$) of about 20 to about 50 micrometers, and have a porosity fraction of about 0.25 to about 0.6. By way of further example, in one embodiment, electrode active material layers 125 comprise a porous silicon alloy (such as nickel silicide), has a thickness ($W_E$) of about 5 to about 100 micrometers, and have a porosity fraction of about 0.15 to about 0.75.

The length ($L_E$) of the members of the population of electrode layers 116 will vary depending upon the energy storage device and its intended use. In one embodiment, however, the members of the population can have a length ($L_E$) in the range of about 5 mm to about 500 mm. For example, in one such embodiment, the members of the population of electrode layers have a length ($L_E$) of about 10 mm to about 250 mm. By way of further example, in one such embodiment the members of the population have a length ($L_E$) of about 25 mm to about 100 mm. By way of further example, in one embodiment corresponding to a wound electrode assembly, members of the population have a length ($L_E$) of at least 50 cm, such at least 75 cm and even at least 90 cm, and could even have lengths of at least about 10 meters and even at least 100 meters. Accordingly, by way of example, in one embodiment of a wound electrode assembly, the members of the population may have a length $L_E$ in a range of from about 50 cm to about 800 meters, such as from 75 cm to about 500 meters, and even from about 75 cm to about 1 meter.

The width ($W_E$) of the population of electrode layers 116 will also vary depending upon the energy storage device and its intended use. In one embodiment, each member of the population of electrode layers 116 can have a width ($W_E$) within the range of about 0.01 mm to 2.5 mm. For example, in one embodiment, the width ($W_E$) of each member of the population will be in the range of about 0.025 mm to about 2 mm. By way of further example, in one embodiment, the width ($W_E$) of each member of the population will be in the range of about 0.05 mm to about 1 mm.

The height ($H_E$) of the population of electrode layers 116 will also vary depending upon the energy storage device and its intended use. In one embodiment, however, members of the population of electrode layers 116 can have a height ($H_E$) within the range of about 0.05 mm to about 10 mm. For example, in one embodiment, the height ($H_E$) of each member of the population will be in the range of about 0.05 mm to about 5 mm. By way of further example, in one embodiment, the height ($H_E$) of each member of the population will be in the range of about 0.1 mm to about 1 mm. By way of further example, in one embodiment of a wound electrode assembly, the height ($H_E$) of each member of the population will be in the range of from about 10 mm to about 500 mm, such as in a range of from about 25 mm to about 100 mm, including a range of from 30 mm to 90 mm, and even in a range of from 50 mm to 500 mm, such as in a range of from 100 mm to 400 mm.

In one embodiment, members of the population of electrode layers 116 have a length ($L_E$) that is substantially greater than each of its width ($W_E$) and its height ($H_E$). For example, in one embodiment, the ratio of $L_E$ to each of $W_E$ and $H_E$ is at least 5:1, respectively (that is, the ratio of $L_E$ to $W_E$ is at least 5:1, respectively and the ratio of $L_E$ to $H_E$ is at least 5:1, respectively), for each member of the population of electrode layers 116. By way of further example, in one embodiment the ratio of $L_E$ to each of $W_E$ and $H_E$ is at least 10:1. By way of further example, in one embodiment, the ratio of $L_E$ to each of $W_E$ and $H_E$ is at least 15:1. By way of further example, in one embodiment, the ratio of $L_E$ to each of $W_E$ and $H_E$ is at least 20:1, for each member of the population.

In one embodiment, the ratio of the height ($H_E$) to the width ($W_E$) of the members of the population of electrode layers 116 is at least 0.4:1, respectively. For example, in one embodiment, the ratio of $H_E$ to $W_E$ will be at least 2:1, respectively, for each member of the population. By way of further example, in one embodiment the ratio of $H_E$ to $W_E$ will be at least 10:1, respectively. By way of further example, in one embodiment the ratio of $H_E$ to $W_E$ will be at least 20:1, respectively. In one embodiment, the ratio of $H_E$ to $W_E$ will generally be less than 1,000:1, respectively. For example, in one embodiment the ratio of $H_E$ to $W_E$ will be less than 500:1, respectively. By way of further example, in one embodiment the ratio of $H_E$ to $W_E$ will be less than 100:1, respectively. By way of further example, in one embodiment the ratio of $H_E$ to $W_E$ will be less than 10:1, respectively. By way of further example, in one embodiment the ratio of $H_E$ to $W_E$ will be in the range of about 2:1 to about 100:1, respectively, for each member of the population.

The width ($W_{CE}$) of the members of the population of counter-electrode layers 120 will also vary depending upon the energy storage device and its intended use. In one embodiment, members of the population of counter-electrode layers can have a width ($W_{CE}$) within the range of about 0.01 mm to 2.5 mm. For example, in one embodiment, the width ($W_{CE}$) of each member of the population will be in the range of about 0.025 mm to about 2 mm. By way of further example, in one embodiment, the width ($W_{CE}$) of each member of the population will be in the range of about 0.05 mm to about 1 mm.

The height ($H_{CE}$) of the members of the population of counter-electrode layers 120 will also vary depending upon the energy storage device and its intended use. In one embodiment, members of the population of counter-electrode layers 120 can have a height ($H_{CE}$) within the range of about 0.05 mm to about 10 mm. For example, in one embodiment, the height ($H_{CE}$) of each member of the population will be in the range of about 0.05 mm to about 5 mm. By way of further example, in one embodiment, the height ($H_{CE}$) of each member of the population will be in the range of about 0.1 mm to about 1 mm.

In one embodiment, each member of the population of counter-electrode layers 120 has a length ($L_{CE}$) that is substantially greater than width ($W_{CE}$) and substantially greater than its height ($H_{CE}$). For example, in one embodiment, the ratio of $L_{CE}$ to each of $W_{CE}$ and $H_{CE}$ is at least 5:1, respectively (that is, the ratio of $L_{CE}$ to $W_{CE}$ is at least 5:1, respectively and the ratio of $L_{CE}$ to $H_{CE}$ is at least 5:1, respectively), for each member of the population. By way of further example, in one embodiment the ratio of $L_{CE}$ to each of $W_{CE}$ and $H_{CE}$ is at least 10:1 for each member of the population. By way of further example, in one embodiment, the ratio of $L_{CE}$ to each of $W_{CE}$ and $H_{CE}$ is at least 15:1 for each member of the population. By way of further example, in one embodiment, the ratio of $L_{CE}$ to each of $W_{CE}$ and $H_{CE}$ is at least 20:1 for each member of the population.

In one embodiment, the ratio of the height ($H_{CE}$) to the width ($W_{CE}$) of the members of the population of counter-electrode layers 120 is at least 0.4:1, respectively. For example, in one embodiment, the ratio of $H_{CE}$ to $W_{CE}$ will be at least 2:1, respectively, for each member of the population of counter-electrode layers 120. By way of further example, in one embodiment the ratio of $H_{CE}$ to $W_{CE}$ will be at least 10:1, respectively, for each member of the population. By way of further example, in one embodiment the ratio of $H_{CE}$ to $W_{CE}$ will be at least 20:1, respectively, for each member of the population. In one embodiment, the ratio of $H_{CE}$ to $W_{CE}$ will generally be less than 1,000:1, respectively, for each member of the population. For example, in one embodiment the ratio of $H_{CE}$ to $W_{CE}$ will be less than 500:1, respectively, for each member of the population. By way of further example, in one embodiment the ratio of $H_{CE}$ to $W_{CE}$ will be less than 100:1, respectively. By way of further example, in one embodiment the ratio of $H_{CE}$ to $W_{CE}$ will be less than 10:1, respectively. By way of further example, in one embodiment the ratio of $H_{CE}$ to $W_{CE}$ will be in the range of about 2:1 to about 100:1, respectively, for each member of the population.

According to one embodiment, one or more of the electrode current collector and counter electrode current collector may comprise a metal such as aluminum, carbon, copper chromium, gold, nickel, NiP, palladium, platinum, rhodium, ruthenium, an alloy of silicon and nickel, titanium, or a combination thereof (see "Current collectors for positive electrodes of lithium-based batteries" by A. H. Whitehead and M. Schreiber, Journal of the Electrochemical Society, 152(11) A2105-A2113 (2005)). By way of further example, in one embodiment, electrode current collector comprises gold aluminum. By way of further example, in one embodiment, counter-electrode current collector comprises copper or an alloy thereof.

Electrically insulating separator layers 130 may electrically isolate each member of the electrode structure 110 population from each member of the counter-electrode structure 112 population. Electrically insulating separator layers 130 can include a microporous separator material that can be permeated with a non-aqueous electrolyte; for example, in one embodiment, the microporous separator material includes pores having a diameter of at least 50 Å, more typically in the range of about 2,500 Å, and a porosity in the range of about 25% to about 75%, more typically in the range of about 35-55%. Additionally, the microporous separator material may be permeated with a non-aqueous electrolyte to permit conduction of carrier ions between adjacent members of the electrode and counter-electrode populations. In certain embodiments, for example, and ignoring the porosity of the microporous separator material, at least 70 vol % of electrically insulating separator material between a member of the electrode structure 110 population and the nearest member(s) of the counter-electrode structure 112 population (i.e., an "adjacent pair" and/or members of the same unit cell 500) for ion exchange during a charging or discharging cycle is a microporous separator material; stated differently, in one embodiment, the microporous separator material constitutes at least 70 vol %, at least 80 vol %, at least 85 vol %, at least 90 vol %, at least 95 vol % and/or at least 99 vol % of the electrically insulating material between a member of the electrode structure 110 population and the nearest member of the counter-electrode 112 structure population.

In one embodiment, the microporous separator material comprises a particulate material and a binder, and has a porosity (void fraction) of at least about 20 vol. % The pores of the microporous separator material will have a diameter of at least 50 Å and will typically fall within the range of about 250 to 2,500 Å. The microporous separator material will typically have a porosity of less than about 75%. In one embodiment, the microporous separator material has a porosity (void fraction) of at least about 25 vol %. In one embodiment, the microporous separator material will have a porosity of about 35-55%.

The binder for the microporous separator material may be selected from a wide range of inorganic or polymeric materials. For example, in one embodiment, the binder is an organic material selected from the group consisting of silicates, phosphates, aluminates, aluminosilicates, and hydroxides such as magnesium hydroxide, calcium hydroxide, etc. For example, in one embodiment, the binder is a fluoropolymer derived from monomers containing vinylidene fluoride, hexafluoropropylene, tetrafluoropropene, and the like. In another embodiment, the binder is a polyolefin such as polyethylene, polypropylene, or polybutene, having any of a range of varying molecular weights and densities. In another embodiment, the binder is selected from the group consisting of ethylene-diene-propene terpolymer, polystyrene, polymethyl methacrylate, polyethylene glycol, polyvinyl acetate, polyvinyl butyral, polyacetal, and polyethyleneglycol diacrylate. In another embodiment, the binder is selected from the group consisting of methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, polyacrylonitrile, polyvinylidene fluoride polyacrylonitrile and polyethylene oxide. In another embodiment, the binder is selected from the group consisting of acrylates, styrenes, epoxies, and silicones. Other suitable binders may be selected from polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymetyl cellulose, acrylonitrile-styrene-butadiene copolymer, polyimide or mixtures thereof. In yet another embodiment, the binder may be selected from any of polyvinylidene fluoride-hexafluoro propylene, polyvinylidene fluoride-trichloroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, polyimide, polyethylene terephthalate, polybutylene terephthalate, polyester, polyacetal, polyamide, polyetheretherketone, polyether sulfone, polyphenylene oxide, polyphenylene sulfide, polyethylene naphthalene, and/or combinations thereof. In another embodiment, the binder is a copolymer or blend of two or more of the aforementioned polymers.

The particulate material comprised by the microporous separator material may also be selected from a wide range of materials. In general, such materials have a relatively low electronic and ionic conductivity at operating temperatures and do not corrode under the operating voltages of the battery electrode or current collector contacting the microporous separator material. For example, in one embodiment, the particulate material has a conductivity for carrier ions (e.g., lithium) of less than $1 \times 10^{-4}$ S/cm. By way of further example, in one embodiment, the particulate material has a conductivity for carrier ions of less than $1 \times 10^{-5}$ S/cm. By way of further example, in one embodiment, the particulate material has a conductivity for carrier ions of less than $1 \times 10^{-6}$ S/cm. Exemplary particulate materials include particulate polyethylene, polypropylene, a $TiO_2$-polymer composite, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or a combination thereof. For example, in one embodiment, the particulate material comprises a particulate oxide or nitride such as $TiO_2$, $SiO_2$, $Al_2O_3$, $GeO_2$, $B_2O_3$, $Bi_2O_3$, $BaO$, $ZnO$, $ZrO_2$, $BN$, $Si_3N_4$, $Ge_3N_4$. See, for example, P. Arora and J. Zhang, "Battery Separators" Chemical Reviews 2004, 104, 4419-4462). Other suitable particles can comprise $BaTiO_3$, $Pb(Zr,Ti)O_3$ (PZT), $Pb_{1-x}La_xZr_{1-y}Ti_yO_3$ (PLZT), $PB(Mg_3Nb_{2/3})O_3$—$PbTiO_3$ (PMN-PT), hafnia ($HfO_2$), $SrTiO_3$, $SnO_2$, $CeO_2$, $MgO$, $NiO$, $CaO$, $ZnO$, $ZrO_2$, $Y_2O_3$, $Al_2O_3$, $TiO_2$, $SiC$ or mixtures thereof. In one embodiment, the particulate material will have an average particle size of about 20 nm to 2 micrometers, more typically 200 nm to 1.5 micrometers. In one embodiment, the particulate material will have an average particle size of about 500 nm to 1 micrometer.

In an alternative embodiment, the particulate material comprised by the microporous separator material may be bound by techniques such as sintering, binding, curing, etc. while maintaining the void fraction desired for electrolyte ingress to provide the ionic conductivity for the functioning of the battery.

Microporous separator materials may be deposited, for example, by electrophoretic deposition of a particulate separator material in which particles are coalesced by surface energy such as electrostatic attraction or van der Waals forces, slurry deposition (including spin or spray coating) of a particulate separator material, screen printing, dip coating, and electrostatic spray deposition. Binders may be included in the deposition process; for example, the particulate material may be slurry deposited with a dissolved binder that precipitates upon solvent evaporation, electrophoretically deposited in the presence of a dissolved binder material, or co-electrophoretically deposited with a binder and insulating particles etc. Alternatively, or additionally, binders may be added after the particles are deposited into or onto the electrode structure; for example, the particulate material may be dispersed in an organic binder solution and dip coated or spray-coated, followed by drying, melting, or cross-linking the binder material to provide adhesion strength.

In an assembled secondary battery 102, the microporous separator material may be permeated with a non-aqueous electrolyte suitable for use as a secondary battery electrolyte. Typically, the non-aqueous electrolyte comprises a lithium salt and/or mixture of salts dissolved in an organic solvent and/or solvent mixture. Exemplary lithium salts include inorganic lithium salts such as $LiClO_4$, $LiBF_4$, $LiPF_6$, $LiAsF_6$, LiCl, and LiBr; and organic lithium salts such as $LiB(C_6H_6)_4$, $LiN(SO_2CF_3)_2$, $LiN(SO_2CF_3)_3$, $LiNSO_2CF_3$, $LiNSO_2CF_5$, $LiNSO_2C_4F_9$, $LiNSO_2C_6F_{11}$, $LiNSO_2C_6F_{13}$, and $LiNSO_2C_7F_{15}$. As yet another example, the electrolyte can comprise sodium ions dissolved therein, such as for example any one or more of $NaClO_4$, $NaPF_6$, $NaBF_4$, $NaCF_3SO_3$, $NaN(CF_3SO_2)_2$, $NaN(C_2F_6SO_2)_2$, and $NaC(CF_3SO_2)_3$ Salts of magnesium and/or potassium can similarly be provided. For example magnesium salts such as magnesium chloride ($MgCl_2$), magnesium bromide $MgBr_2$), or magnesium iodide ($MgI_2$) may be provided, and/or as well as a magnesium salt that may be at least one selected from the group consisting of magnesium perchlorate (Mg $(ClO_4)_2$), magnesium nitrate ($Mg(NO_3)_2$), magnesium sulfate ($MgSO_4$), magnesium tetrafluoroborate ($Mg(BF_4)_2$), magnesium tetraphenylborate ($Mg(B(C_6H_6)_4)_2$), magnesium hexafluorophosphate ($Mg(PF_6)_2$), magnesium hexafluoroarsenate ($Mg(AsF_6)_2$), magnesium perfluoroalkylsulfonate (($Mg(R_{f1}SO_3)_2$), in which $R_{f1}$ is a perfluoroalkyl group), magnesium perfluoroalkylsulfonylimide ($Mg((R_{f2}SO_2)_2N)_2$, in which $R_{f2}$ is a perfluoroalkyl group), and magnesium hexaalkyl disilazide (($Mg(HRDS)_2$), in which R is an alkyl group). Exemplary organic solvents to dissolve the lithium salt include cyclic esters, chain esters, cyclic ethers, and chain ethers. Specific examples of the cyclic esters include propylene carbonate, ethylene carbonate, butylene carbonate, γ-butyrolactone, vinylene carbonate, 2-methyl-γ-butyrolactone, acetyl-γ-butyrolactone, and γ-valerolactone. Specific examples of the chain esters include dimethyl carbonate, diethyl carbonate, dibutyl carbonate, dipropyl carbonate, methyl ethyl carbonate, methyl butyl carbonate, methyl propyl carbonate, ethyl butyl carbonate, ethyl propyl carbonate, butyl propyl carbonate, alkyl propionates, dialkyl malonates, and alkyl acetates. Specific examples of the cyclic ethers include tetrahydrofuran, alkyltetrahydrofurans, dialkyltetrahydrofurans, alkoxytetrahydrofurans, dialkoxytetrahydrofurans, 1,3-dioxolane, alkyl-1,3-dioxolanes, and 1,4-dioxolane. Specific examples of the chain ethers include 1,2-dimethoxyethane, 1,2-diethoxythane, diethyl ether, ethylene glycol dialkyl ethers, diethylene glycol dialkyl ethers, triethylene glycol dialkyl ethers, and tetraethylene glycol dialkyl ethers.

In yet another embodiment, the secondary battery 102 can comprise electrolyte that may be any of an organic liquid electrolyte, an inorganic liquid electrolyte, a solid polymer electrolyte, a gel polymer electrolyte, an inorganic solid electrolyte, a molten-type inorganic electrolyte or the like. In yet another embodiment, where the electrolyte is a solid electrolyte, the solid electrolyte may itself be capable of providing insulation between the electrodes and passage of carrier ions therethrough, such that a separate separator layer may not be required. That is, in certain embodiments, the solid electrolyte may take the place of the separator 130 described in embodiments herein. In one embodiment, a solid polymer electrolyte can comprise any of a polymer formed of polyethylene oxide (PEO)-based, polyvinyl acetate (PVA)-based, polyethyleneimine (PEI)-based, polyvinylidene fluoride (PVDF)-based, polyacrylonitrile (PAN)-based, LiPON, and polymethyl methacrylate (PMMA)-based polymers or copolymers thereof. In another embodiment, a sulfide-based solid electrolyte may be provided, such as a sulfide-based solid electrolyte comprising at least one of lithium and/or phosphorous, such as at least one of $Li_2S$ and $P_2S_5$, and/or other sulfides such as $SiS_2$, $GeS_2$, $Li_3PS_4$, $Li_4P_2S_7$, $Li_4SiS_4$, $Li_2S$—$P_2S_5$, and $50Li_4SiO_4 \cdot 50Li_3BO_3$, and/or $B_2S_3$. Yet other embodiments of solid electrolyte can include nitrides, halides and sulfates of lithium (Li) such as $Li_3N$, LiI, $Li_5NI_2$, $Li_3N$—LiI—LiOH, $LiSiO_4$, $Li_2SiS_3$, $Li_4SiO_4$, $Li_4SiO_4$—LiI—LiOH, and $Li_3PO_4$—$Li_2S$—$SiS_2$.

The present disclosure further includes the following enumerated embodiments.

Embodiment 1. A secondary battery for cycling between a charged and a discharged state, the secondary battery comprising a battery enclosure, an electrode assembly, carrier ions, a non-aqueous liquid electrolyte within the battery enclosure, wherein the electrode assembly comprises a population of unit cells, each unit cell comprising, in a stacked succession, a unit cell portion of an electrode current collector layer, an electrode layer comprising electrode active material, a separator layer, a counter-electrode layer and a unit cell portion of a counter-electrode current collector layer, the unit cell having a width, $W_{uc}$, measured in a stacking direction of the stacked succession from the unit cell portion of the electrode current collector to the unit cell portion of the counter-electrode current collector, the electrode layer having a width, $W_E$, measured in the stacking direction of the stacked succession, from the unit cell portion of the electrode current collector adjacent the electrode layer to the separator layer adjacent the electrode layer, a height, $H_E$, measured from a top surface to a bottom surface of the electrode layer in a second direction orthogonal to the stacking direction, and a length, $L_E$, measured from a first surface to a second surface in a third direction that is orthogonal to the stacking direction and the height direction, and a volume, $V_E$, bounded by the unit cell portion of the electrode current collector, the separator layer, the top surface of the electrode layer, the bottom surface of the electrode layer, the first end surface of the electrode layer, and the second end surface of the electrode layer, and the electrode layer comprises a population of spacer structures comprising a material other than the electrode active material, wherein the spacer population occupies a total volume within the electrode layer within the range of about 0.1% to about 35% of the volume, $V_E$, of the electrode layer.

Embodiment 2. The secondary battery of enumerated Embodiment 1, wherein a member of the spacer population is located within each subvolume of the electrode layer comprising (i) at least 50% of the volume, $V_E$, of the electrode layer, and (ii) bounded by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Embodiment 3. The secondary battery of any preceding enumerated Embodiment, wherein a member of the spacer population is located within each subvolume of the electrode layer comprising (i) at least 40% of the volume, $V_E$, of the electrode layer, and (ii) bounded by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Embodiment 4. The secondary battery of any preceding enumerated Embodiment, wherein a member of the spacer population is located within each subvolume of the electrode layer comprising (i) at least 30% of the volume, $V_E$, of the electrode layer, and (ii) bounded by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Embodiment 5. The secondary battery of any preceding enumerated Embodiment, wherein a member of the spacer population is located within each subvolume of the electrode layer comprising (i) at least 25% of the volume, $V_E$, of the electrode layer, and (ii) bounded by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Embodiment 6. The secondary battery according to any preceding enumerated Embodiment, wherein the electrode layer comprises a layer of electrode active material that has the capacity to accept more than one mole of carrier on per mole of electrode active material when the secondary battery is charged from the discharged state to the charged state, where charged state is at least 75% of a rated capacity of the secondary battery, and the discharged state is less than 25% of the rated capacity of the secondary battery.

Embodiment 7. The secondary battery according to any preceding enumerated Embodiment, wherein the population of spacer structures comprises spacer material that having a capacity to accept carrier ions of less than one mole of carrier ion per mole of spacer material, when the secondary battery is charged from the discharged state to the charged state, and the charged state is at least 75% of a rated capacity of the secondary battery, and the discharged state is less than 25% of the rated capacity of the secondary battery.

Embodiment 8. The secondary battery according to any preceding enumerated Embodiment, wherein the population of spacer structures comprises spacer material comprising any one or more of polymer material, electrode active material, electrode current collector material, counter-electrode current collector material, and separator material.

Embodiment 9. The secondary battery according to any preceding enumerated Embodiment, wherein the population of spacer structures comprises spacer material comprising any one or more of fluoropolymer derived from monomers containing vinylidene fluoride, hexafluoropropylene, tetrafluoropropene, a polyolefin such as polyethylene, polypropylene, or polybutene, ethylene-diene-propene terpolymer, polystyrene, polymethyl methacrylate, polyethylene glycol, polyvinyl acetate, polyvinyl butyral, polyacetal, and polyethyleneglycol diacrylate, methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, polyacrylonitrile, polyvinylidene fluoride polyacrylonitrile, polyethylene oxide, acrylates, styrenes, epoxies, silicones, polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymethyl cellulose, acrylonitrile-styrene-butadiene copolymer, polyimide, polyvinylidene fluoride-hexafluoropropylene, polyvinylidene fluoride-trichloroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, polyimide, polyethylene terephthalate, polybutylene terephthalate, polyester, polyacetal, polyamide, polyetheretherketone, polyether sulfone, polyphenylene oxide, polyphenylene sulfide, polyethylene naphthalene, and/or combinations an copolymers thereof.

Embodiment 10. The secondary battery according to any preceding enumerated Embodiment, wherein the spacer population occupies a total volume of at least 0.1%, at least 0.25%, at least 0.5%, and/or at least 0.75%, and less than 35%, less than 25%, less than 10% and/or less than 5% of the total volume Ve of the electrode layer.

Embodiment 11. The secondary battery according to any preceding enumerated Embodiment, wherein a member of the spacer population is located within each subvolume of the electrode layer comprising (i) at least 20%, at least 10% and/or at least 5% of the volume, $V_E$, of the electrode layer, and (ii) bounded by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Embodiment 12. The secondary battery according to any preceding enumerated Embodiment, wherein the secondary battery comprises a series of stacked sheets comprising the electrode layers and counter-electrode layers, where the stacking direction is in a first direction, the height $H_E$ of the electrode layer is measured in a second direction orthogonal to the stacking direction, and the Length $L_E$ of the electrode layer is measured in a third direction orthogonal to both the second direction and stacking direction.

Embodiment 13. The secondary battery according to any preceding enumerated Embodiment, wherein members of the population of spacer structures in each unit cell of the stacked succession are aligned with other members of the population of spacer structures in the stacking direction.

Embodiment 14. The secondary battery according to any preceding enumerated Embodiment, wherein the secondary battery comprises at least one unit cell that is continuously wound about an interior region, with interior winds of the unit cell having a smaller diameter than outer winds of the unit cell, and where the diameter of the unit cell increases with increasing radius from the interior region.

Embodiment 15. The secondary battery according to preceding enumerated Embodiment 14, wherein the stacked succession is in a first direction, and the height $H_E$ of the electrode layer is measured in a second direction orthogonal to the stacking direction, and the length $L_E$ of the electrode layer is measured along the longest dimension of the electrode layer that corresponds to a wound path of the electrode layer from the central region of the secondary battery to the exterior section of the secondary battery.

Embodiment 16. The secondary battery according to preceding enumerated Embodiment 14, wherein members of the population of spacer structures are aligned such that spacer structures disposed in interior winds of the unit cell are aligned in the stacking direction with spacer structures in outer winds of the unit cell.

Embodiment 17. The secondary battery according to preceding enumerated Embodiment 16, wherein a distance between spacers disposed in the electrode layer along the longest dimension of the electrode layer, increases with increasing radius from the interior region of the secondary battery to the exterior region of the secondary battery.

Embodiment 18. The secondary battery according to any preceding enumerated Embodiment, wherein the population of spacer structures comprises a plurality of spacer structures disposed within the electrode layer along the length $L_E$ of the electrode layer.

Embodiment 19. The secondary battery according to any preceding enumerated Embodiment, wherein the population of spacer structures comprises a single spacer structure located at a periphery of the electrode layer.

Embodiment 20. The secondary battery according to any preceding enumerated Embodiment, wherein the population of spacer structures comprise one or more members of the population that extend through the width $W_E$ of the electrode layer from the electrode current collector to the separator layer.

Embodiment 21. The secondary battery according to any preceding enumerated Embodiment, wherein a median value of the extent that the population of spacer structures extend along the width $W_E$ of the electrode layer from a first surface of the electrode current collector layer to a first surface of the separator layer opposing the first surface of the electrode current collector layer is less than 60%, less than 50%, less than 40%, less than 25% and/or less than 25% of the width $W_E$ of the electrode layer, and is at least 2%, at least 3% and/or at least 5% of the width $W_E$ of the electrode layer.

Embodiment 22. The secondary battery according to any preceding enumerated Embodiment, comprising first and second adjacent unit cells comprising respective first and second electrode layers, and sharing an electrode current collector, and wherein both the first and second adjacent unit cells comprise populations of spacer structures in their respective first and second electrode layers.

Embodiment 23. The secondary battery according to preceding enumerated Embodiment 22, wherein the first and second adjacent unit cells share the same population of spacer structures that extend through the shared electrode current collector into each of the first and second electrode layers.

Embodiment 24. The secondary battery according to any preceding enumerated Embodiment, comprising first and second unit cells comprising respective first and second electrode layers and comprising first and second populations of spacer structures in their respective first and second electrode layers, and wherein a position of the first population of spacer structures in the first electrode layer is aligned in a stacking direction with a position of the second population of spacer structures in the second electrode layer.

Embodiment 25. The secondary battery according to any preceding enumerated Embodiment, wherein the population of spacer structures are disposed at an interface between the electrode layer and the separator layer.

Embodiment 26. The secondary battery according to any preceding enumerated Embodiment, wherein the population of spacer structures are disposed at an interface between the electrode layer and the surface of the current collector layer.

Embodiment 27. The secondary battery according to any preceding enumerated Embodiment, wherein the electrode layer comprises less than 70% void space, less than 60% void space, less than 25% void space and/or less than or equal to 10% void space as a percentage of the total volume $V_E$ of the electrode layer.

Embodiment 28. The secondary battery according to any preceding enumerated Embodiment, wherein a ratio of the electrical conductance of the electrode active material in the electrode layer to a total electrical conductance of all members of the spacer population in the electrode layer is at least 2:1, at least 5:1, and/or at least 50:1.

Embodiment 29. An electrode assembly for a secondary battery for cycling between a charged and a discharged state, wherein the electrode assembly comprises a population of unit cells, each unit cell comprising, in a stacked succession, a unit cell portion of an electrode current collector layer, an electrode layer comprising electrode active material, a separator layer, a counter-electrode layer and a unit cell portion of a counter-electrode current collector layer, the unit cell having a width, $W_{uc}$, measured in a stacking direction of the stacked succession from the unit cell portion of the electrode current collector to the unit cell portion of the counter-electrode current collector, the electrode layer having a width, $W_e$, measured in the stacking direction, from the unit cell portion of the electrode current collector adjacent the electrode layer to the separator layer adjacent the electrode layer, a height, He, measured from a top surface to a bottom surface of the electrode layer in a second direction orthogonal to the stacking direction, and a length, Le, measured from a first to a second surface in a third direction that is orthogonal to the stacking direction and the height direction, and a volume, $V_E$, bounded by the unit cell portion of the electrode current collector, the separator layer, the top surface of the electrode layer, the bottom surface of the electrode layer, the first end surface of the electrode layer, and the second end surface of the electrode layer, and the electrode layer comprises a population of spacer structures, wherein the spacer population occupies a total volume within the electrode layer within the range of about 0.1% to about 35% of the volume, $V_E$, of the electrode layer.

Embodiment 30. The electrode assembly according to preceding enumerated Embodiment 29, wherein a member of the spacer population is located within each subvolume of the electrode layer comprising (i) at least 50% of the volume, $V_E$, of the electrode layer, and (ii) bounded by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Embodiment 31. The electrode assembly according to any of the preceding enumerated Embodiments 29-30, wherein a member of the spacer population is located within each subvolume of the electrode layer comprising (i) at least 40% of the volume, $V_E$, of the electrode layer, and (ii) bounded by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Embodiment 32. The electrode assembly according to any of the preceding enumerated Embodiments 29-31, wherein a member of the spacer population is located within each subvolume of the electrode layer comprising (i) at least 30% of the volume, $V_E$, of the electrode layer, and (ii) bounded by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Embodiment 33. The electrode assembly according to any of the preceding enumerated Embodiments 29-32, wherein a member of the spacer population is located within each subvolume of the electrode layer comprising (i) at least 25% of the volume, $V_E$, of the electrode layer, and (ii) bounded by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Embodiment 34. The electrode assembly according to any of the preceding enumerated Embodiments 29-33, wherein the electrode layer comprises a layer of electrode active material that has the capacity to accept more than one mole of carrier on per mole of electrode active material when the secondary battery is charged from the discharged state to the charged state, where charged state is at least 75% of a rated capacity of the secondary battery, and the discharged state is less than 25% of the rated capacity of the secondary battery.

Embodiment 35. The electrode assembly according to any of the preceding enumerated Embodiments 29-34, wherein the population of spacer structures comprises spacer material that having a capacity to accept carrier ions of less than one mole of carrier ion per mole of spacer material, when the secondary battery is charged from the discharged state to the charged state, and the charged state is at least 75% of a rated capacity of the secondary battery, and the discharged state is less than 25% of the rated capacity of the secondary battery.

Embodiment 36. The electrode assembly according to any of the preceding enumerated Embodiments 29-35, wherein the population of spacer structures comprises spacer material comprising any one or more of polymer material, electrode active material, electrode current collector material, counter-electrode current collector material, and separator material.

Embodiment 37. The electrode assembly according to preceding enumerated Embodiment 36, wherein the population of spacer structures comprises spacer material comprising any one or more of fluoropolymer derived from monomers containing vinylidene fluoride, hexafluoropropylene, tetrafluoropropene, a polyolefin such as polyethylene, polypropylene, or polybutene, ethylene-diene-propene terpolymer, polystyrene, polymethyl methacrylate, polyethylene glycol, polyvinyl acetate, polyvinyl butyral, polyacetal, and polyethyleneglycol diacrylate, methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, polyacrylonitrile, polyvinylidene fluoride polyacrylonitrile, polyethylene oxide, acrylates, styrenes, epoxies, silicones, polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymetyl cellulose, acrylonitrile-styrene-butadiene copolymer, polyimide, polyvinylidene fluoride-hexafluoro propylene, polyvinylidene fluoride-trichloroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, polyimide, polyethylene terephthalate, polybutylene terephthalate, polyester, polyacetal, polyamide, polyetheretherketone, polyether sulfone, polyphenylene oxide, polyphenylene sulfide, polyethylene naphthalene, and/or combinations an copolymers thereof.

Embodiment 38. The electrode assembly according to any of the preceding enumerated Embodiments 29-37, wherein the spacer population occupies a total volume of at least 0.1%, at least 0.25%, at least 0.5%, and/or at least 0.75%, and less than 35%, less than 25%, less than 10% and/or less than 5% of the total volume $V_E$ of the electrode layer.

Embodiment 39. The electrode assembly according to any of the preceding enumerated Embodiments 29-38, wherein a member of the spacer population is located within each subvolume of the electrode layer comprising (i) at least 20%, at least 10% and/or at least 5% of the volume, $V_E$, of the electrode layer, and (ii) bounded by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Embodiment 40. The electrode assembly according to any of the preceding enumerated Embodiments 29-39, wherein the electrode assembly comprises a series of stacked sheets comprising the electrode layers and counter-electrode layers, where the stacking direction is in a first direction, the height $H_E$ of the electrode layer is measured in a second direction orthogonal to the stacking direction, and the Length $L_E$ of the electrode layer is measured in a third direction orthogonal to both the second direction and stacking direction.

Embodiment 41. The electrode assembly according to preceding enumerated Embodiment 40, wherein members of the population of spacer structures in each unit cell of the stacked succession are aligned with other members of the population of spacer structures in the stacking direction.

Embodiment 42. The electrode assembly according to any of the preceding enumerated Embodiments 29-41, wherein the electrode assembly comprises at least one unit cell that is continuously wound about an interior region, with interior winds of the unit cell having a smaller diameter than outer winds of the unit cell, and where the diameter of the unit cell increases with increasing radius from the interior region.

Embodiment 43. The electrode assembly according to preceding enumerated Embodiment 42, wherein the stacked succession is in a first direction, and the height $H_E$ of the electrode layer is measured in a second direction orthogonal to the stacking direction, and the length $L_E$ of the electrode layer is measured along the longest dimension of the electrode layer that corresponds to a wound path of the electrode layer from the central region of the electrode assembly to the exterior section of the electrode assembly.

Embodiment 44. The electrode assembly according to preceding enumerated Embodiment 43, wherein members of the population of spacer structures are aligned such that spacer structures disposed in interior winds of the unit cell are aligned in the stacking direction with spacer structures in outer winds of the unit cell.

Embodiment 45. The electrode assembly according to preceding enumerated Embodiment 44, wherein a distance between spacers disposed in the electrode layer along the longest dimension of the electrode layer, increases with increasing radius from the interior region of the secondary battery to the exterior region of the electrode assembly.

Embodiment 46. The electrode assembly according to any of the preceding enumerated Embodiments 29-45, wherein the population of spacer structures comprises a plurality of spacer structures disposed within the electrode layer along the length $L_E$ of the electrode layer.

Embodiment 47. The electrode assembly according to any of the preceding enumerated Embodiments 29-46, wherein the population of spacer structures comprises a single spacer structure located at a periphery of the electrode layer.

Embodiment 48. The electrode assembly according to any of the preceding enumerated Embodiments 29-47, wherein the population of spacer structures comprise one or more members of the population that extend through the width $W_E$ of the electrode layer from the electrode current collector to the separator layer.

Embodiment 49. The electrode assembly according to any of the preceding enumerated Embodiments 29-48, wherein a median value of the extent that the population of spacer structures extend along the width $W_E$ of the electrode layer from a first surface of the electrode current collector layer to a first surface of the separator layer opposing the first surface of the electrode current collector layer is less than 60%, less than 50%, less than 40%, less than 25% and/or less than 25% of the width $W_E$ of the electrode layer, and is at least 2%, at least 3% and/or at least 5% of the width $W_E$ of the electrode layer.

Embodiment 50. The electrode assembly according to any of the preceding enumerated Embodiments 29-49, comprising first and second adjacent unit cells comprising respective first and second electrode layers, and sharing an electrode current collector, and wherein both the first and second adjacent unit cells comprise populations of spacer structures in their respective first and second electrode layers.

Embodiment 51. The electrode assembly according to preceding enumerated Embodiment 50, wherein the first and second adjacent unit cells share the same population of spacer structures that extend through the shared electrode current collector into each of the first and second electrode layers.

Embodiment 52. The electrode assembly according to any of preceding enumerated Embodiments 29-51, comprising first and second unit cells comprising respective first and second electrode layers and comprising first and second populations of spacer structures in their respective first and second electrode layers, and wherein a position of the first population of spacer structures in the first electrode layer is aligned in a stacking direction with a position of the second population of spacer structures in the second electrode layer.

Embodiment 53. The electrode assembly according to any of preceding enumerated Embodiments 29-52, wherein the population of spacer structures are disposed at an interface between the electrode layer and the separator layer.

Embodiment 54. The electrode assembly according to any of preceding enumerated Embodiments 29-53, wherein the population of spacer structures are disposed at an interface between the electrode layer and the surface of the current collector layer.

Embodiment 55. The electrode assembly according to any of preceding enumerated Embodiments 29-54, wherein the electrode layer comprises at least 40% void space, at least 50% void space, at least 60% void space, at least 75% void space and/or at least 90% void space as a percentage of the total volume $V_E$ of the electrode layer.

Embodiment 56. The electrode assembly according to any of preceding enumerated Embodiments 29-55, wherein a ratio of the electrical conductance of the electrode active material in the electrode layer to a total electrical conductance of all members of the spacer population in the electrode layer is at least 2:1, at least 5:1, and/or at least 50:1.

Embodiment 57. A method of formation of a secondary battery for cycling between a charged and a discharged state, comprising:

providing an electrode assembly, carrier ions and a non-aqueous liquid electrolyte within a battery enclosure, wherein the electrode assembly comprises a population of unit cells, each unit cell comprising, in a stacked succession, a unit cell portion of an electrode current collector layer, an electrode layer comprising electrode active material, a separator layer, a counter-electrode layer and a unit cell portion of a counter-electrode current collector layer, the unit cell having a width, $W_{uc}$, measured in a stacking direction of the stacked succession from the unit cell portion of the electrode current collector to the unit cell portion of the counter-electrode current collector, the electrode layer having a width, $W_e$, measured in the stacking direction, from the unit cell portion of the electrode current collector adjacent the electrode layer to the separator layer adjacent the electrode layer, a height, $H_E$, measured from a top surface to a bottom surface of the electrode layer in a direction orthogonal to the stacking direction, and a length, Le, measured from a first to a second surface in a direction that is orthogonal to the stacking direction and the height direction, and a volume, Ve, bounded by the unit cell portion of the electrode current collector, the separator layer, the top surface of the electrode layer, the bottom surface of the electrode layer, the first end surface of the electrode layer, and the second end surface of the electrode layer, the electrode layer comprises a population of spacer structures, wherein the spacer population occupies a total volume within the electrode layer within the range of about 0.1% to about 35% of the volume, Ve, of the electrode layer, and performing a formation process involving charging of the secondary battery from a discharged to a charged state.

Embodiment 58. The method according to preceding enumerated Embodiment 57, wherein a member of the spacer population is located within each subvolume of the electrode layer comprising (i) at least 50% of the volume, Ve, of the electrode layer, and (ii) bounded by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Embodiment 59. The method according to any of the preceding enumerated Embodiments 57-58, wherein a member of the spacer population is located within each subvolume of the electrode layer comprising (i) at least 40% of the volume, Ve, of the electrode layer, and (ii) bounded by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Embodiment 60. The method according to any of the preceding enumerated Embodiments 57-59, wherein a member of the spacer population is located within each subvolume of the electrode layer comprising (i) at least 30% of the volume, Ve, of the electrode layer, and (ii) bounded by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Embodiment 61. The method according to any of the preceding enumerated Embodiments 57-60, wherein a member of the spacer population is located within each subvolume of the electrode layer comprising (i) at least 25% of the volume, $V_E$, of the electrode layer, and (ii) bounded by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

Embodiment 62. The method according to any of the preceding enumerated Embodiments 57-61, wherein the electrode layer comprises a first volume of solid electrode active material prior to the formation process, and a second volume of solid electrode active material after the formation process that is greater than the first volume, and wherein the method comprises performing the formation process to increase the volume of the solid electrode active material in the electrode layer to the second volume that is at least 3%, at least 5%, at least 10%, at least 25%, at least 50%, at least 75% and/or at least 100% greater than the first volume of the solid electrode active material in the electrode layer, for a change in $W_{UC}$ of the unit cell prior to the formation process to after the formation process that is less than 1%, less than 0.5%, less than 0.25% and/or less than 0.1%.

Embodiment 63. The method according to any of the preceding enumerated Embodiments 57-62, further comprising providing a set of electrode constraints to constrain growth of the electrode assembly in the stacking direction and/or maintain alignment of the population of unit cells in the electrode assembly, during the formation process.

Embodiment 64. The method according to preceding enumerated Embodiment 63, wherein the set of electrode constraints constrain growth in the stacking direction.

Embodiment 65. The method according to any of the preceding enumerated Embodiments 63-64, comprising removing the set of electrode constraints following the formation process.

Embodiment 66. The method according to any of the preceding enumerated Embodiments 63-65, comprising providing the set of electrode constraints within the enclosure of the secondary battery.

Embodiment 67. The method according to any of the preceding enumerated Embodiments 63-66, comprising providing the set of electrode constraints external to the enclosure of the secondary battery.

Embodiment 68. The method according to any of the preceding enumerated Embodiments 63-67, wherein the electrode assembly comprises any of preceding Enumerated Embodiments 29-56, and wherein the secondary battery comprises any of Enumerated Embodiments 1-28.

INCORPORATION BY REFERENCE

All publications and patents mentioned herein, including those items listed below, are hereby incorporated by reference in their entirety for all purposes as if each individual publication or patent was specifically and individually incorporated by reference. In case of conflict, the present application, including any definitions herein, will control.

EQUIVALENTS

While specific embodiments have been discussed, the above specification is illustrative, and not restrictive. Many variations will become apparent to those skilled in the art upon review of this specification. The full scope of the embodiments should be determined by reference to the claims, along with their full scope of equivalents, and the specification, along with such variations.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained.

What is claimed is:

1. A secondary battery for cycling between a charged and a discharged state, the secondary battery comprising: a battery enclosure, an electrode assembly, carrier ions, a non-aqueous liquid electrolyte within the battery enclosure, wherein:

the electrode assembly comprises a population of unit cells, each unit cell of the population of unit cells comprising, in a stacked succession, (a) a first unit cell portion of an electrode current collector layer, (b) an electrode layer comprising electrode active material, the electrode active material comprising silicon, (c) a separator layer, (d) a counter-electrode layer, and (e) a second unit cell portion of a counter-electrode current collector layer, the unit cell having a width, $W_{uc}$, measured in a stacking direction of the stacked succession from the first unit cell portion of the electrode current collector to the second unit cell portion of the counter-electrode current collector, the electrode layer having a width, $W_E$, measured in the stacking direction of the stacked succession from the first unit cell portion of the electrode current collector adjacent the electrode layer to the separator layer adjacent the electrode layer, a height, $H_E$, measured from a top surface to a bottom surface of the electrode layer in a second direction orthogonal to the stacking direction, and a length, $L_E$, measured from a first surface to a second surface in a third direction that is orthogonal to the stacking direction and the height direction, and a volume, $V_E$, bounded by the first unit cell portion of the electrode current collector, the separator layer, the top surface of the electrode layer, the bottom surface of the electrode layer, the first end surface of the electrode layer, and the second end surface of the electrode layer, and the electrode layer comprises a population of spacer structures comprising a material other than the electrode active material, the population of spacer structures being disposed at an interface between the electrode active material and the separator layer, and wherein the electrode layer comprises an electrode active material located between members of the population of spacer structures that are separated from each other in the third direction along the length $L_E$ of the electrode layer, wherein the population of spacer structures occupies a total volume within the electrode layer within the range of from about 0.1% to about 5% of the volume, $V_E$, of the electrode layer.

2. The secondary battery according to claim 1, wherein the electrode layer comprises a layer of electrode active material.

3. The secondary battery according to claim 1, wherein the population of spacer structures comprises spacer material having a capacity to accept carrier ions of less than one mole of carrier ion per mole of spacer material, the capacity being when the secondary battery is charged from the discharged state to the charged state, and the charged state is at least 75% of a rated capacity of the secondary battery, and the discharged state is less than 25% of the rated capacity of the secondary battery.

4. The secondary battery according to claim 1, wherein the population of spacer structures comprises spacer material comprising polymer material, electrode active material, electrode current collector material, counter-electrode current collector material, or separator material; and wherein the spacer structure comprises one or more of any of the spacer material.

5. The secondary battery according to claim 1, wherein the population of spacer structures comprises spacer material comprising fluoropolymer derived from monomers containing vinylidene fluoride, hexafluoropropylene, tetrafluoropropene, a polyolefin at least one of polyethylene, polypropylene, or polybutene, ethylene-diene-propene ter-polymer, polystyrene, polymethyl methacrylate, polyethylene glycol, polyvinyl acetate, polyvinyl butyral, polyacetal, and polyethyleneglycol diacrylate, methyl cellulose, carboxymethyl cellulose, styrene rubber, butadiene rubber, styrene-butadiene rubber, isoprene rubber, polyacrylamide, polyvinyl ether, polyacrylic acid, polymethacrylic acid, polyacrylonitrile, polyvinylidene fluoride polyacrylonitrile, polyethylene oxide, acrylates, styrenes, epoxies, silicones, polyvinylidene fluoride-co-hexafluoropropylene, polyvinylidene fluoride-co-trichloroethylene, polymethylmethacrylate, polyacrylonitrile, polyvinylpyrrolidone, polyvinyl acetate, polyethylene-co-vinyl acetate, polyethylene oxide, cellulose acetate, cellulose acetate butyrate, cellulose acetate propionate, cyanoethylpullulan, cyanoethyl polyvinylalcohol, cyanoethylcellulose, cyanoethylsucrose, pullulan, carboxymethyl cellulose, acrylonitrile-styrene-butadiene copolymer, polyimide, polyvinylidene fluoride-hexafluoro propylene, polyvinylidene fluoride-trichloroethylene, polymethyl methacrylate, polyacrylonitrile, polyvinyl pyrrolidone, polyvinyl acetate, ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, acrylonitrile styrene butadiene copolymer, polyimide, polyethylene terephthalate, polybutylene terephthalate, polyester, polyacetal, polyamide, polyetheretherketone, polyether sulfone, polyphenylene oxide, polyphenylene sulfide, or polyethylene naphthalene; and wherein the spacer structure comprises one or more of any of the spacer material.

6. The secondary battery according to claim 1, wherein the population of spacer structures occupies a total volume of at least 0.25% of the total volume $V_E$ of the electrode layer.

7. The secondary battery according to claim 1, wherein a member of the population of spacer structures is located within each subvolume of the electrode layer comprising at least 5% of the volume, $V_E$, of the electrode layer; and wherein the volume $V_E$ is bounded on all sides by (aa) the unit cell portion of the electrode current collector, (bb) the separator layer, (cc) the top surface of the electrode layer, (dd) the bottom surface of the electrode layer, (ee) the first end surface of the electrode layer, and (ff) the second end surface of the electrode layer.

8. The secondary battery according to claim 1, wherein members of the population of spacer structures in each unit cell of the stacked succession are aligned with other members of the population of spacer structures along the stacking direction.

9. The secondary battery according to claim 1, wherein the secondary battery comprises at least one unit cell that is continuously wound about an interior region, with interior winds of the unit cell having a smaller diameter than outer winds of the unit cell; and wherein the diameter of the unit cell increases with increasing radius from the interior region.

10. The secondary battery according to claim 9, wherein the stacked succession is in a first direction, and the height $H_E$ of the electrode layer is measured in a second direction orthogonal to the stacking direction, and the length $L_E$ of the electrode layer is measured along the longest dimension of the electrode layer that corresponds to a wound path of the electrode layer from the central region of the secondary battery to the exterior section of the secondary battery.

11. The secondary battery according to claim 9, wherein members of the population of spacer structures are aligned such that spacer structures disposed in interior winds of the unit cell are aligned in the stacking direction with spacer structures in outer winds of the unit cell.

12. The secondary battery according to claim 11, wherein a distance between spacers disposed in the electrode layer along the longest dimension of the electrode layer, increases with increasing radius from the interior region of the secondary battery to the exterior region of the secondary battery.

13. The secondary battery according to claim 1, wherein the population of spacer structures comprises a plurality of spacer structures disposed within the electrode layer along the length $L_E$ of the electrode layer.

14. The secondary battery according to claim 1, wherein the population of spacer structures comprises a single spacer structure located at a periphery of the electrode layer.

15. The secondary battery according to claim 1, comprising adjacent unit cells comprising a first adjacent unit cell and a second adjacent unit cell respectively comprising a first electrode layer and a second electrode layer, the adjacent unit cells sharing an electrode current collector; and wherein the first adjacent unit cell and the second adjacent unit cell comprise populations of spacer structures in the first electrode layer and in the second electrode layer, respectively.

16. The secondary battery according to according to claim 1, comprising unit cells comprising a first unit cell and a second unit cell respectively comprising a first electrode layer and a second electrode layer; and wherein the unit cells comprise a first second population of spacer structures and a second population of spacer structures in their first electrode layers and second electrode layer, respectively; and wherein a position of the first population of spacer structures in the first electrode layer is aligned in a stacking direction with a position of the second population of spacer structures in the second electrode layer.

17. The secondary battery according to claim 1, wherein the electrode layer comprises less than 70% void space as a percentage of the total volume $V_E$ of the electrode layer.

18. The secondary battery according to claim 1, wherein a ratio of the electrical conductance of the electrode active material in the electrode layer to a total electrical conductance of all members of the spacer population in the electrode layer, is at least 2:1.

19. The secondary battery according to claim 1, wherein the population of spacer structures occupies a total volume of at least 0.5%, of the total volume $V_E$ of the electrode layer.

20. The secondary battery according to claim 1, wherein the population of spacer structures occupies a total volume of at least 0.75% of the total volume $V_E$ of the electrode layer.

* * * * *